United States Patent
Andoh et al.

(10) Patent No.: US 7,121,268 B2
(45) Date of Patent: Oct. 17, 2006

(54) ELECTRONIC EGR GAS CONTROL SYSTEM

(75) Inventors: Hitoshi Andoh, Chiyoda-ku (JP); Teruhiko Minegishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/921,043

(22) Filed: Aug. 18, 2004

(65) Prior Publication Data

US 2005/0098163 A1 May 12, 2005

(30) Foreign Application Priority Data

Nov. 7, 2003 (JP) .............................. 2003-377677

(51) Int. Cl.
*F02M 25/07* (2006.01)

(52) U.S. Cl. .............................. 123/568.12; 123/568.18

(58) Field of Classification Search ........... 123/568.11, 123/568.12, 568.17, 568.18, 568.19, 568.21, 123/568.23, 568.24

See application file for complete search history.

(56) References Cited

U.S. PATENT DOCUMENTS

| | | | | |
|---|---|---|---|---|
| 1,544,937 A | * | 7/1925 | Quick ..................... | 123/568.18 |
| 4,306,534 A | * | 12/1981 | Wessel et al. ........... | 123/568.18 |
| 5,785,034 A | * | 7/1998 | Moedinger et al. ..... | 123/568.18 |
| 5,975,064 A | * | 11/1999 | Krimmer et al. ....... | 123/568.18 |
| 6,044,827 A | * | 4/2000 | Pfaff et al. .............. | 123/568.18 |
| 6,186,127 B1 | * | 2/2001 | Everingham ........... | 123/568.12 |
| 6,311,678 B1 | * | 11/2001 | Lepoutre ................ | 123/568.12 |
| 6,386,188 B1 | * | 5/2002 | Bender ................... | 123/568.12 |
| 6,439,212 B1 | | 8/2002 | Coleman et al. ........ | 123/568.17 |
| 6,513,507 B1 | * | 2/2003 | Balekai et al. ......... | 123/568.17 |
| 6,647,970 B1 | * | 11/2003 | Hankins ................. | 123/568.12 |
| 6,886,544 B1 | * | 5/2005 | Bui ........................ | 123/568.18 |
| 2003/0136368 A1 | * | 7/2003 | Ausiello et al. ........ | 123/568.12 |

FOREIGN PATENT DOCUMENTS

| | | |
|---|---|---|
| DE | 2232705 A1 | 1/1974 |
| DE | 19811634 | 9/1999 |
| EP | 1020635 A | 7/2000 |
| JP | 10-213019 | 8/1998 |
| WO | WO 00/06885 | 2/2000 |

* cited by examiner

*Primary Examiner*—Willis R. Wolfe, Jr.
(74) *Attorney, Agent, or Firm*—Crowell & Moring LLP

(57) ABSTRACT

A curved passage constituting part of an exhaust gas recirculation passage is installed inside a suction passage in the downstream of an electronic control throttle valve, of which initial position is the fully opened position, and an exhaust gas recirculation flow control valve is installed in the cylindrical portion extending coaxially from the curved passage into a suction passage. The control valve is a butterfly valve driven by a motor via a reduction gear mechanism. In addition, the control valve opening is sensed by a sensor and cooled exhaust gas flow is sensed by a flow sensor at the outlet of an exhaust gas cooler, and the control of the control valve is based on these sensor signals.

17 Claims, 29 Drawing Sheets

ELECTRONIC EGR GAS CONTROL SYSTEM

CLAIM OF PRIORITY

The present application claims priority from Japanese application serial no. 2003-377677, filed on Nov. 7, 2003, the content of which is hereby incorporated by reference into this application.

BACKGROUND OF THE INVENTION

The present invention relates to an EGR gas control system used of an internal combustion engine of diesel motor car, particularly to an electronic EGR gas control system.

A conventional electronic EGR gas control system known as prior art has been so constructed that a simple valve is provided in the EGR gas passage near the connection of suction pipe to the EGR gas passage and the valve is controlled to open and close by motor via a reduction gear as shown in Japanese Laid-open Patent Publication of International Application No. Hei 2002-521610).

A system known as another prior art has been so constructed that a curved pipe for letting in the EGR gas is provided in the suction passage in the downstream of a throttle valve, the curved pipe is made open towards the downstream of the suction passage and a valve is provided in the EGR gas passage connected to the suction pipe, and the valve is controlled to open and close by negative-pressure actuator as shown in Japanese Laid-open Patent Publication No. Hei 10-213019.

SUMMARY OF THE INVENTION

The prior art has not been capable of controlling the system to move the exhaust gas recirculation ratio quickly to a target value. Part of the exhaust gas recirculation passage is projected in the suction passage and a control valve for controlling the exhaust gas flow is installed in the projected passage.

DETAILED DESCRIPTION OF THE PREFERRED EMBODIMENTS

An embodiment of the invention is described in detail hereunder, using FIG. 1 to FIG. 9.

Figure 1:
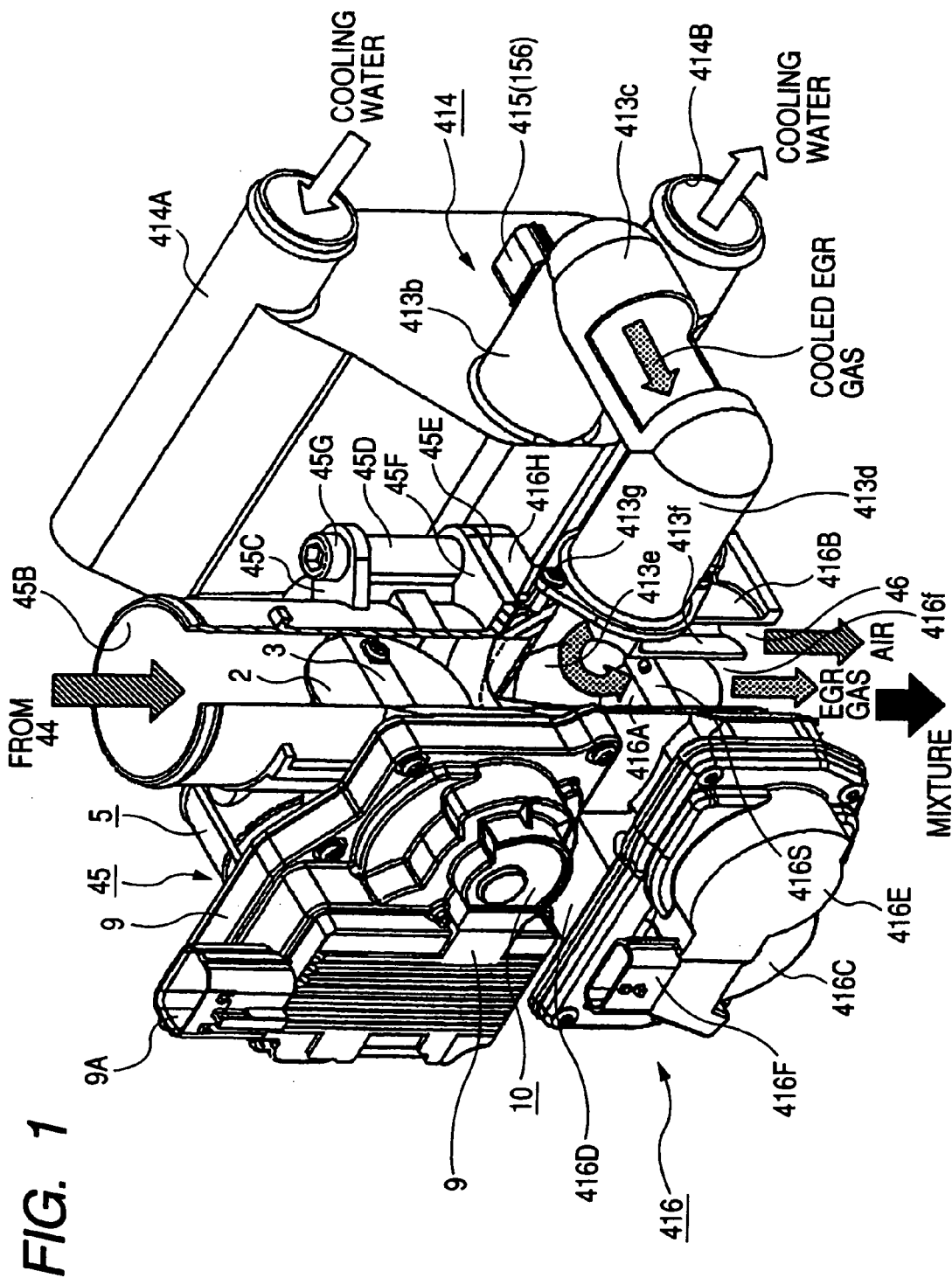
FIG. 1 is an oblique cross-sectional view of part of the exhaust gas recirculation system according to an embodiment of the present invention.

FIG. 1 is an oblique view of the overall exhaust gas recirculation system according to the present invention, part of which suction passage is cut open to show the inside.

Figure 2:
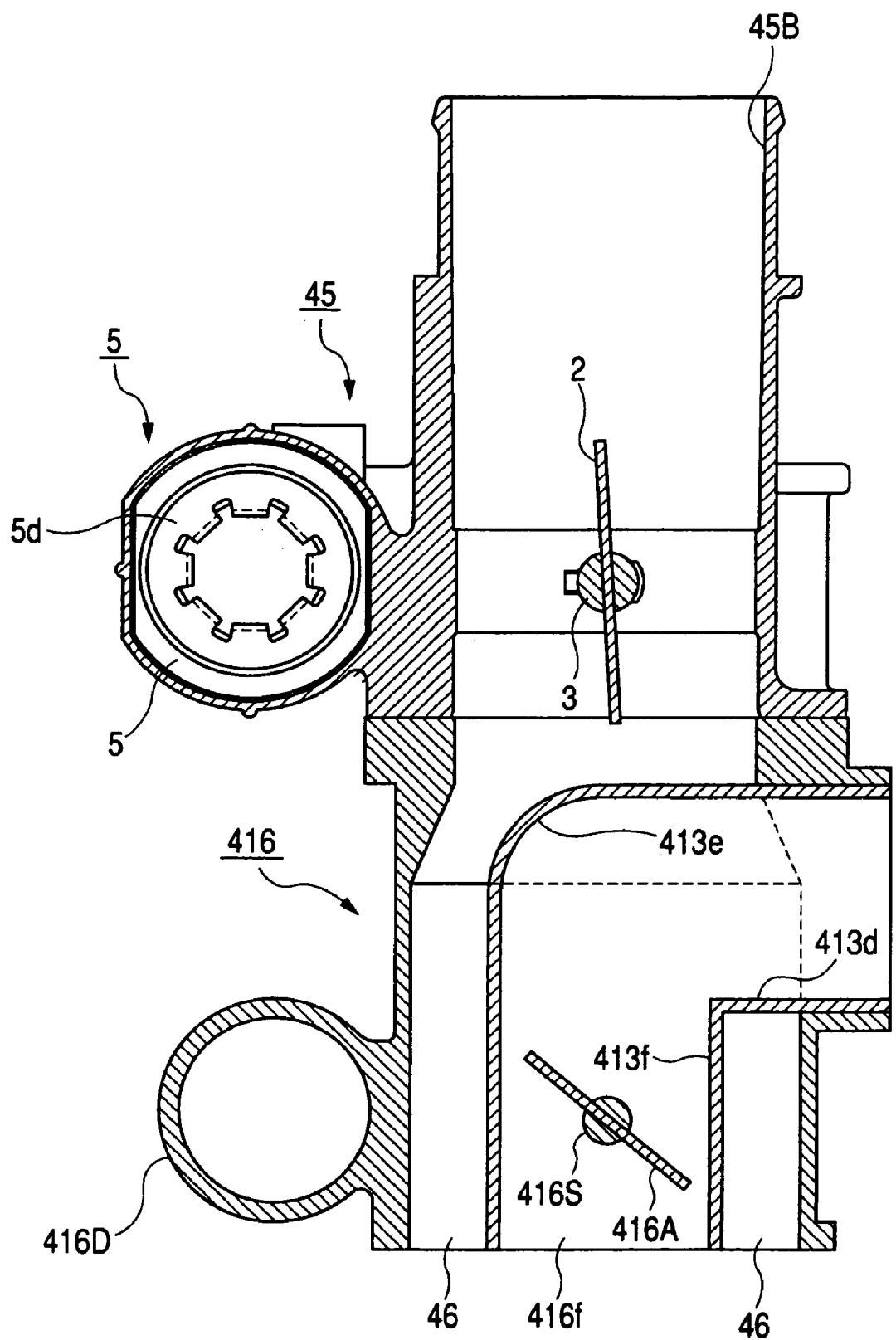
FIG. 2 is a vertical cross-sectional view of the exhaust gas recirculation system according to an embodiment of the present invention.
Figure 3:
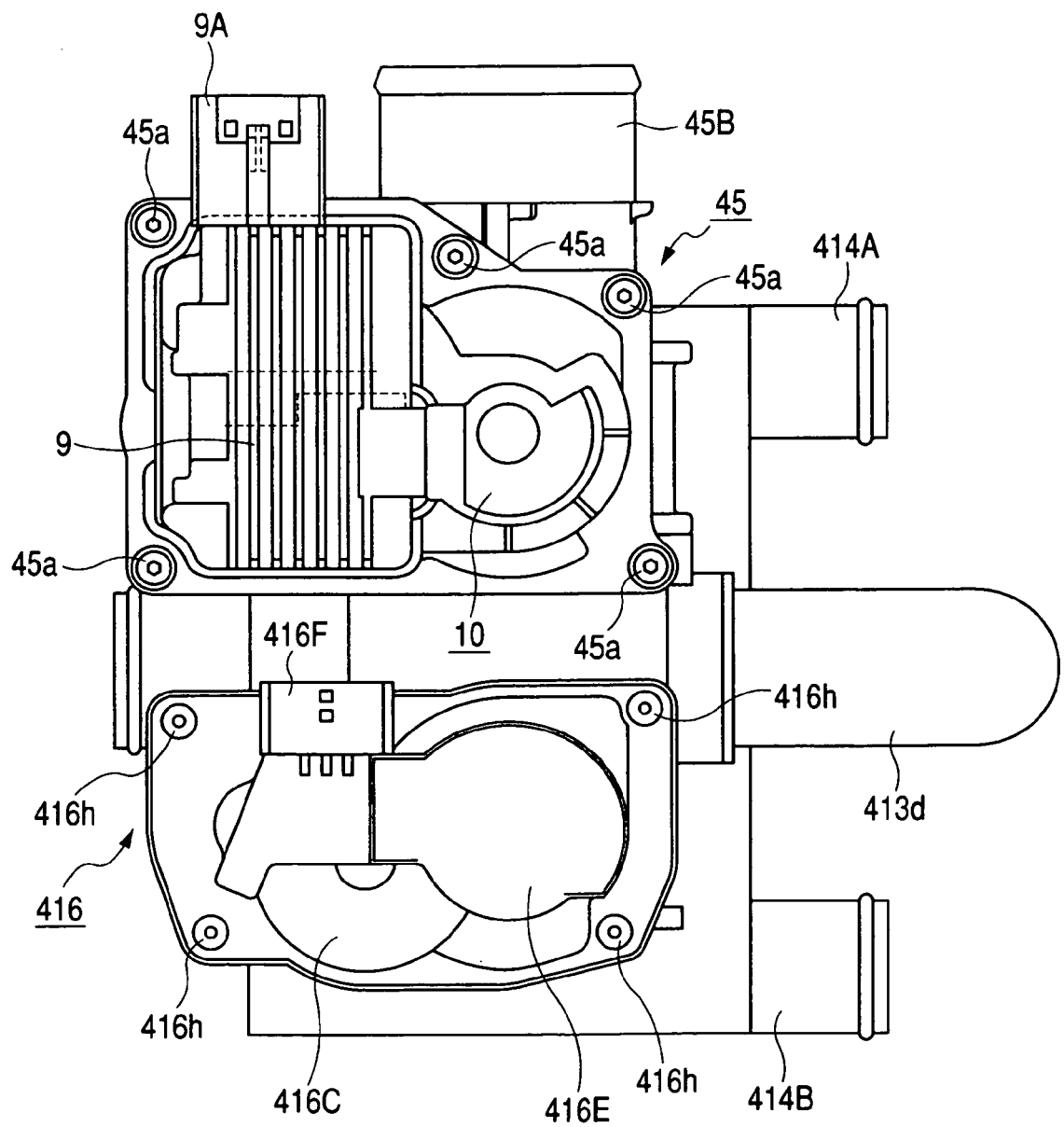
FIG. 3 is a side view of the exhaust gas recirculation system according to an embodiment of the present invention.

FIG. 2 is a vertical cross-sectional view of the exhaust gas recirculation system, and FIG. 3 is a side view.

The overall construction is described hereunder, using FIG. 1 to FIG. 3.

Figure 10:
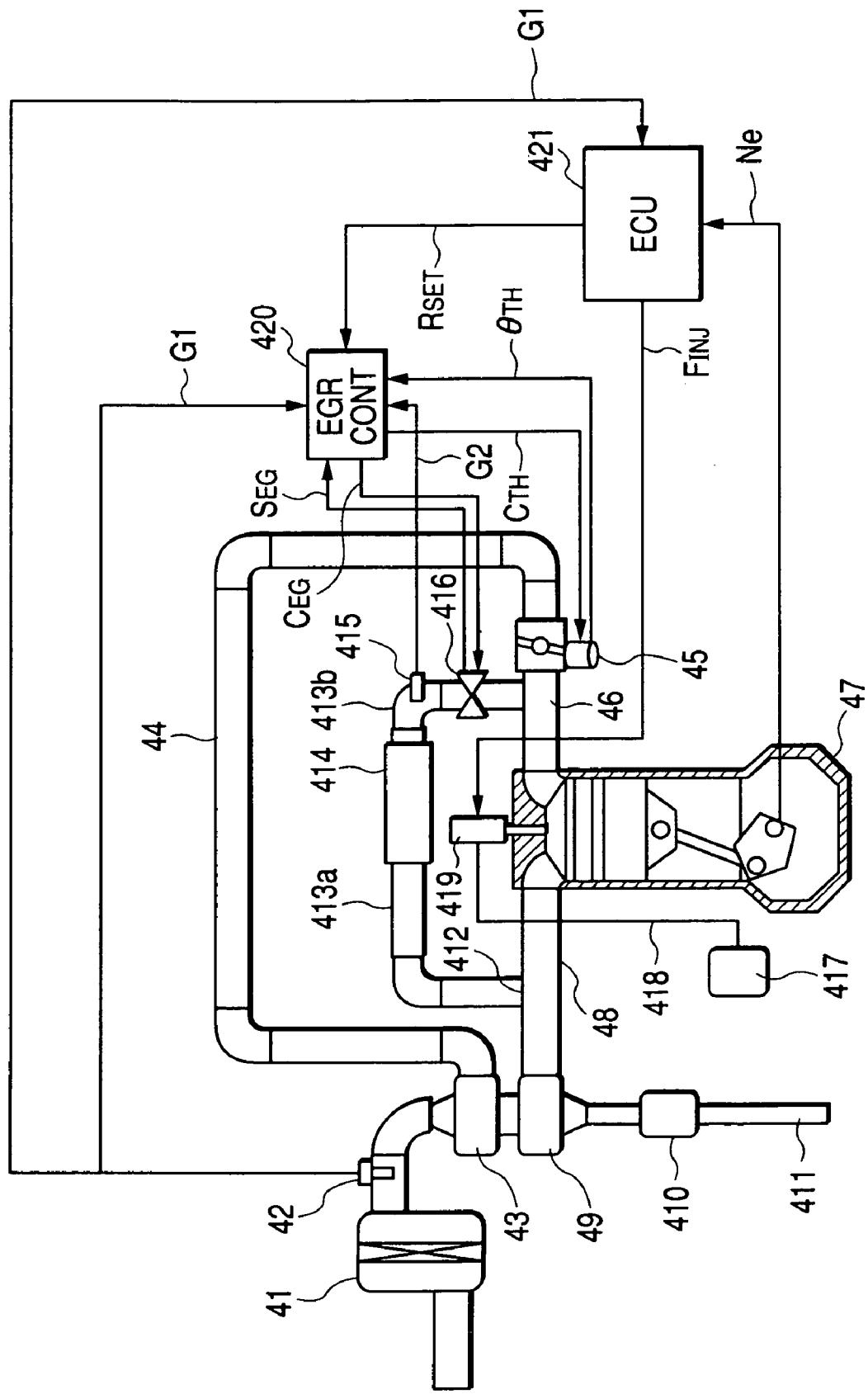
FIG. 10 is a construction of the engine system using the exhaust gas recirculation system of an internal combustion engine to which the present invention applies.

The element 45 corresponds to the suction control unit 45 shown in the exhaust gas recirculation system diagram (FIG. 10).

The element 416 corresponds to the EGR (exhaust gas recirculation) control system 416 (which is referred to as an exhaust gas recirculation control system in this embodiment) in the system diagram (FIG. 10).

The suction control unit 45 comprises suction passage body 45B formed in a cylindrical shape, rotating shaft 3 extending across the center axis of the cylindrical suction passage body 45B and supported by the suction passage body 45B to be able to rotate, and butterfly valve 2 (which may be called the throttle valve or suction control valve) fixed on the rotating shaft (which may be called the throttle shaft).

On the outside wall of the suction passage body 45B, there is provided a motor casing formed in parallel with the rotating shaft 3 and together with the suction passage body 45B. (Detailed description will be given when explaining FIG. 24 and FIG. 25.)

A resin cover 9 contains inside a control circuit board (to be explained later) and a rotation angle sensor 10 (to be explained later) for the rotating shaft 3.

The resin cover 9 is fixed to a specified position on the outside wall of the suction passage body 45B with five screws 45a.

A connector 9A is resin-molded together with the resin cover 9.

The connector 9A has a terminal for sending a signal from the sensor 10 to an engine control unit, power supply terminal for motor, grounding terminal, and terminal for receiving an opening control signal of the suction control valve 2 from the engine control unit.

The exhaust gas recirculation control system 416 comprises a suction passage body made of concentric double pipes. The suction passage body has a hole on the sidewall and an exhaust gas inlet passage portion 413d to be inserted into the hole is continued with a cylindrical portion 413f that extends from a curved portion 413e along the axis of the suction passage body.

To be concrete, an L-shaped curved passage body (comprising 413d, 413e, and 413f) is inserted into the suction passage 46 from under the suction passage body and then the inlet passage portion 413d is inserted into the hole in the sidewall.

In this installation, the curved passage body (comprising 413d, 413e, and 413f) is first inserted into the suction passage 46 allowing an offset from the center of the suction passage 46 so that the cylindrical portion 413f is clear of the hole in the sidewall, and when the end of the inlet passage portion 413d is well positioned to fit in the hole in the sidewall, the curved passage body (comprising 413d, 413e, and 413f) is then moved towards the center of the suction passage and the inlet passage portion 413d is inserted into the hole in the sidewall. In order to realize this installation smoothly, the inside diameter of the suction passage body, outside diameter of the cylindrical portion 413f, and length of the inlet passage portion 413d up to the inside surface of the sidewall are so determined in this embodiment that the above offset can be allowed. In other words, the longest distance from the outside surface of the cylindrical portion 413f to the end of the inlet passage portion 413d is designed to be approximately equal to the inside diameter of the suction passage 46 so that the curved passage body (comprising 413d, 413e, and 413f) can be inserted into the suction passage allowing an offset from the center of the suction passage 46 (in a direction the cylindrical portion 413f becomes clear of the hole in the sidewall). In this installation, the longest distance from the outside surface of the cylindrical portion 413f to the end of the inlet passage portion 413d can be greater than the inside diameter of the suction passage 46. However, when inserting the curved passage body (comprising 413d, 413e, and 413f) into the suction passage 46, it must be tilted and the inlet passage portion 413d must be set into the hole in the sidewall as is.

In order to facilitate smooth installation of the above, the length of the cylindrical portion 413f is made longer than that of the inlet suction passage 413d.

When the inlet passage portion 413*d* is set in the hole in the sidewall of the suction passage 46, the center axis of the cylindrical portion 413*f* is aligned with that of the suction passage 46, thus set as a double-wall construction.

The center axes of the two need not always be in perfect alignment but it may rather be preferable to allow a slight offset from the center of the suction passage 46 (in a direction the cylindrical portion 413*f* becomes clear of the hole in the sidewall) in view of the flow resistance or streamline.

Through holes are provided straight through the sidewall of the suction passage 46 and cylindrical portion 413*f* of the curved passage body (comprising 413*d*, 413*e*, and 413*f*) in series across the center axes.

The offset of the cylindrical portion 413*f* or insertion depth of the inlet passage portion 413*d* into the sidewall is so adjusted that these through holes are aligned straight.

A way for realizing the above is to insert a bar through the holes so as to determine the position of the two portions and then weld them accordingly.

Another way is to position them properly and weld together and then make the through holes.

The rotating shaft 416S is inserted into the through holes well aligned straight and the butterfly valve 416A is fastened with two screws 416*m*.

Figure 4:
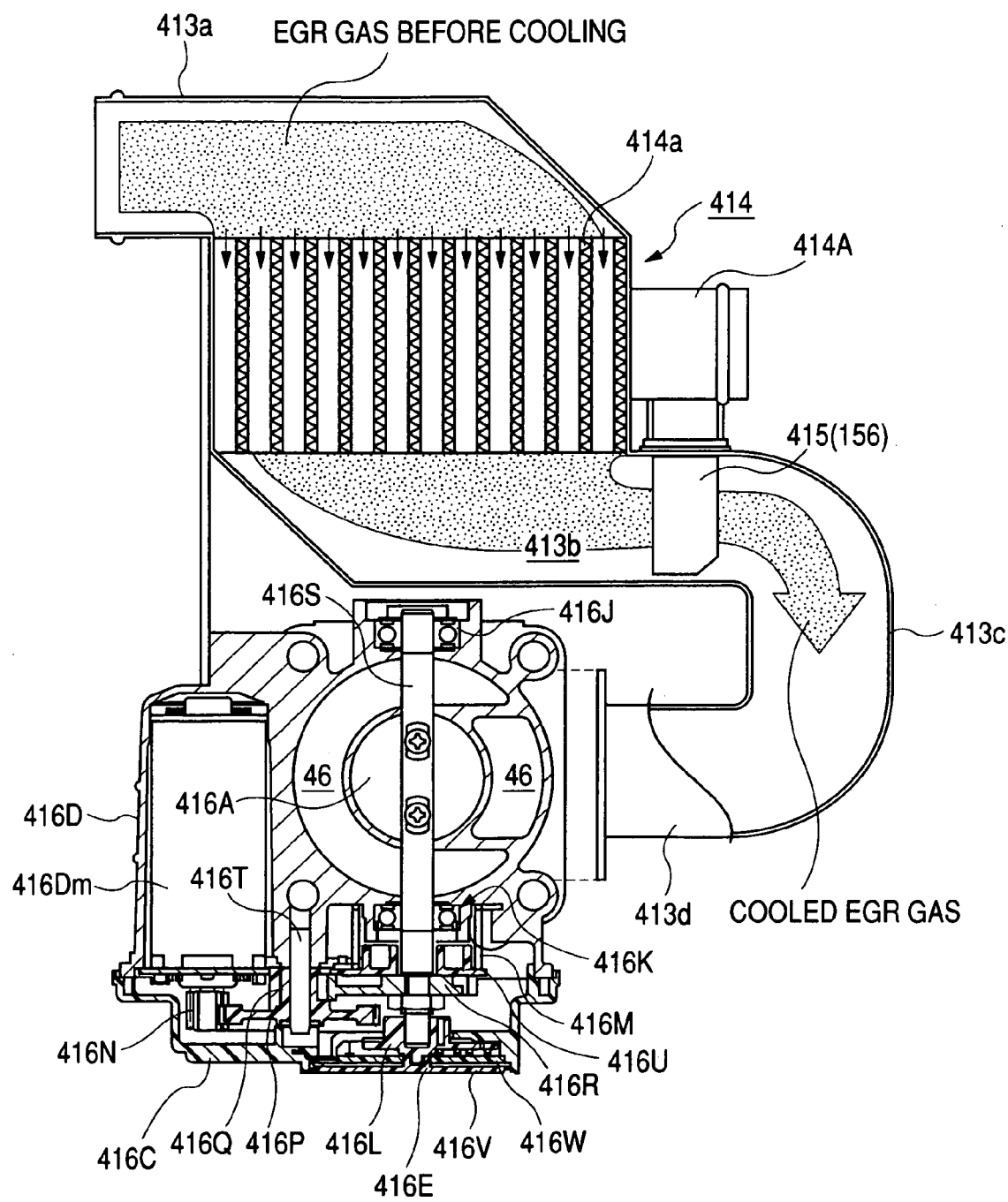
FIG. 4 is a side cross-sectional view of the exhaust gas recirculation system according to an embodiment of the present invention.
Figure 5:
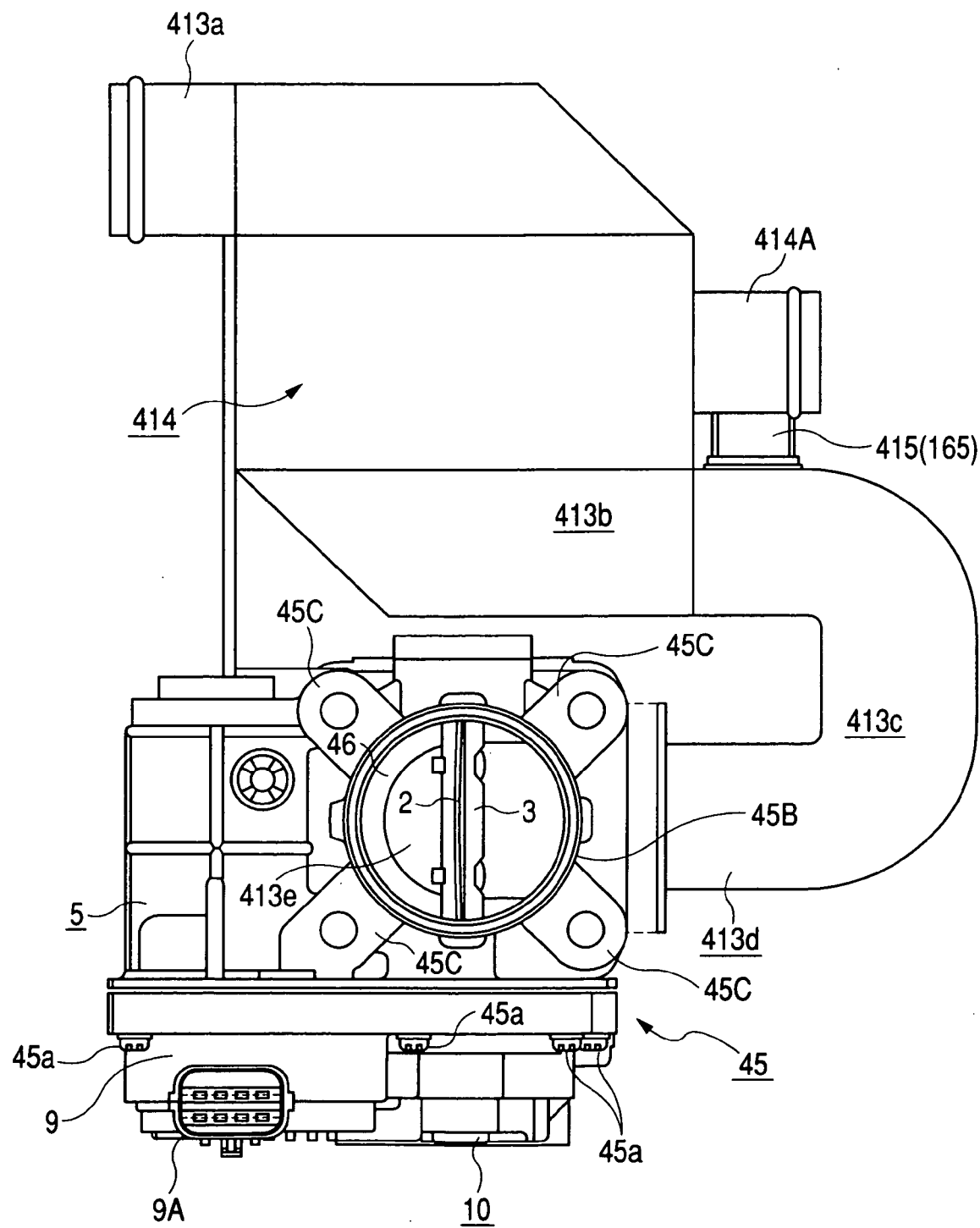
FIG. 5 is a plan view of the exhaust gas recirculation system according to an embodiment of the present invention.
Figure 6:
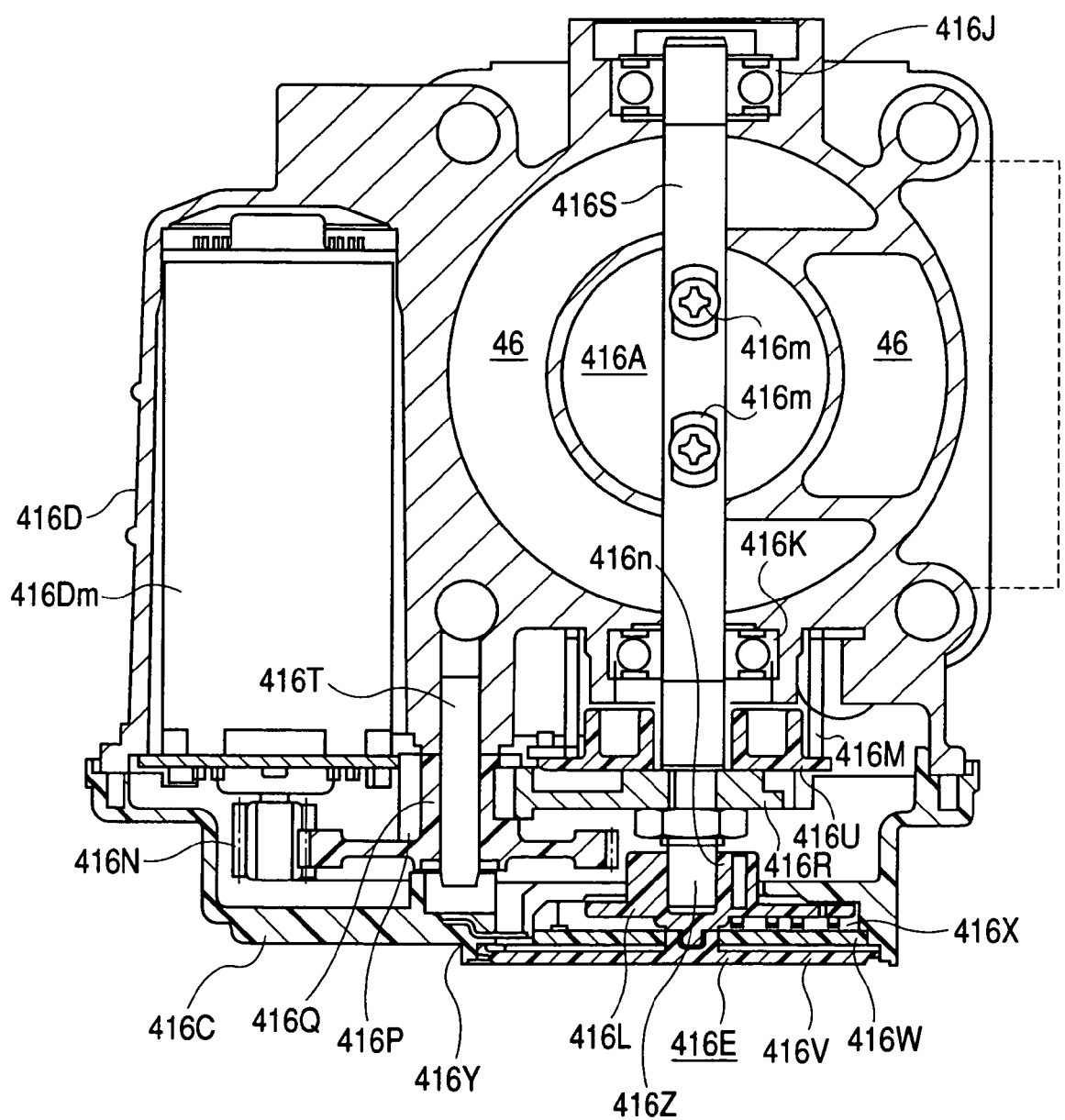
FIG. 6 is an enlarged cross-sectional view of the control valve drive mechanism in the exhaust gas recirculation system according to an embodiment of the present invention.

The rotating shaft 416S is supported to be able to rotate by two ball bearings 416J and 416K fixed on the through holes in the sidewall of the suction passage as shown in FIG. 4 and FIG. 6. One end of the rotating shaft 416S is sealed with a metal cover and the other end further protrudes from the ball bearing 416K. A resin collar 416U and final gear 416R are mounted on this protruded portion and are fastened on the rotating shaft 416S with nuts. Between the resin collar 416U and sidewall of the suction passage, a return spring 416M is placed over the bearing boss on which the bearing 416K is mounted. One end of the return spring 416M is hooked on a step on the outside wall of the suction passage so as not to move in the rotating direction and the other end is hooked on the resin collar 416U.

The resin collar 416U rotates together with the shaft. Accordingly, when the control valve rotates to open, the return spring is wound up and adds a closing direction force to the control valve.

The holes in the cylindrical portion of the exhaust gas passage body not only serve as holes for the rotating shaft to be inserted through but also effectively serve to prevent the ball bearing from being subjected to excessive force due to excessive deflection of the rotating shaft.

A motor casing is formed together with the suction passage body.

A motor 416Dm is enclosed in the motor casing 416D, which is fixed on the suction passage body.

A gear 416N is fixed on the end of the rotating shaft of the motor 416Dm. Between the final gear 416R fixed on the rotating shaft 416S and the gear 416N, an intermediate gear comprising a large gear 416P and small gear 416Q, resin-molded in one piece, is provided on a fixed shaft 416T to be able to rotate. The large gear 416P is engaged with the gear 416N.

The small gear 416Q is engaged with the final gear 416R. The reduction ratio of this reduction gear mechanism is about one-twentieth. Because of this reduction ratio, a big force for rotating the control valve (about 100 kg) can be generated. This is a considerably big force even in taking the return spring force of about 7 kg into account, and accordingly the control valve can be opened even if the valve is seized by unburnt product and/or tar in the exhaust gas.

Since a force of about 20 to 30 kg is generally understood enough to release the tip of the control valve from seizure, sufficient yield strength can be ensured against seizure.

The exhaust gas directed from the curved passage body (comprising 413*d*, 413*e*, and 413*f*) into the suction passage 46 is exhausted into the center of the suction passage 46 from the outlet 416*f* of the cylindrical portion 413*f* and mixed with fresh air flowing there. The diameter of the suction passage body at which the exhaust gas recirculation control valve is located is made greater than the diameter of the suction passage body at which the suction control valve is located by the projected cross-sectional area of the exhaust gas recirculation passage. With this construction, increase of the passage resistance can be prevented.

Since the exhaust gas does not contact the suction passage body directly, temperature increase of the suction passage body can be controlled lower. Accordingly, temperature of the bearings 416J and 416K will not increase and malfunction of the bearings resulting from melting of grease can be reduced.

A resin cover 416C is fixed at a specified position on the outside wall of the double-pipe suction passage body with screws at four mounting holes 416*h*.

This resin cover covers the reduction gear mechanism, and a sensor 416E for sensing the rotation angle of the rotating shaft 416S is mounted on it.

A connector 416F is molded together with the resin cover when the cover is resin-molded. The connector has a terminal for outputting the opening signal of the rotating shaft to external device, terminal for supplying the power from external source to the motor, and grounding terminal.

The side of the resin cover of the rotating shaft 416S extends up to the position the resin cover 416C is located. A rotor 416L of the rotation angle sensor 416E is mounted on the flat portion of the resin cover 416C to be able to rotate. A brush 416X is mounted on the rotor 416L.

A circuit board 416W having a surface perpendicular to the rotating shaft is installed inside a lid 416E of the resin cover 416C. On this circuit board, a resistance conductor (not shown) is mounted at a position facing the brush 416X. The resistance conductor is connected to the connector 416F via the electrically conductive terminal 416Y molded together with the resin cover 416C. As the resin cover 416C is fastened on the outside wall of the suction passage body, the end of the rotating shaft fits in the hole of the rotor 416L and the rotor is locked by a leaf spring 416*n*. Thus, the rotation of the rotating shaft 416S rotates the brush 416X via the rotor 416L and a change in the position of the brush 416X in reference to the resistance conductor is sent out as an electric signal to external device from the connector 416F.

Thus, the real opening of the control valve 416A for controlling the opening of the exhaust gas passage is sensed and utilized in computing the control signal to the motor 416Dm. Accordingly, the response and control accuracy of the control valve improve.

This signal is sent to the engine control unit and used for the calculation of the target opening of the control valve 416A (which consequently serves as the control signal of the motor 416Dm) based on the EGR recirculation ratio.

It is also possible to send this signal to a control circuit 200 in the control unit of the suction control valve so as to make a similar calculation and send out a control signal for the motor 416Dm as a target opening signal.

The suction control unit 45 and exhaust gas recirculation control system 416 explained above are installed side by side.

To explain more concretely, the upper end of the exhaust gas recirculation control system 416 is connected to the downstream end of the suction control unit 45 and they are fixed together with bolts 45G using gasket 45E (or seal rubber) between them. Each bolt 45G is inserted into four bolt holes 45D provided at an interval around the suction control body and fastens the upper flange 45C and lower flange 45F of the suction control valve with the flange 416H of the suction passage body of the exhaust gas recirculation control system 416 to fix them together.

The above assembly is so designed that the rotating shafts 3 and 416S are in parallel and the portion where the incoming exhaust gas flow from the cylindrical portion 413f into the suction passage 46 becomes the largest coincides with the portion where the opening of the suction control valve becomes the largest so that the exhaust air is mixed with fresh air smoothly and that the exhaust gas is distributed evenly to each cylinder.

The above is so designed also that the resin covers 9 and 416C of the two are located on the same side of the suction passage body. Since this design allows an access from the same side for connection with the connector, high workability is expected. In addition, this design is suitable for securing a space for installing a cooling unit (to be described later).

In a system so designed as above, not only the rotating shafts are installed in parallel but also the motor case is installed in parallel, and so the rotating shaft of the motor is also installed in parallel with these rotating shafts.

The element 414 is the cooling unit that cools the exhaust gas by heat exchange between the engine cooling water and exhaust gas. Cooling water enters the cooling unit from an inlet header 414A, flows through the passage in which corrugated fins 414a are installed as shown in FIG. 4, and is discharged from a cooling water outlet header 414B.

The exhaust gas enters from an inlet header 413a and flows through the parallel passage of the heat exchanger in the arrow direction, and then it is collected to an outlet header 413b and directed through a connection passage 413c up to the exhaust gas inlet passage portion 413d installed in the suction passage body.

While the exhaust gas is at 500° C. at the inlet, the temperature goes down to 200° C. after heat exchange with the engine cooling water at 100° C. Accordingly, the exhaust gas can be directly let into the center of the suction passage body.

The element 415 (156) is an exhaust gas flow sensor, which is installed in the connection passage 413d of the cooling unit outlet and senses the cooled exhaust gas flow. Accordingly, because of less change in the gas temperature, measurement accuracy improves.

Lowering the EGR gas temperature allows to increase the gas density (decrease the volume) so as to widen the upper limit of the recirculation ratio and reduce NOx. In addition, lower gas temperature allows to decrease the combustion temperature of the engine.

The element 413G are screws for fastening the exhaust gas passage to the inlet opening 413k of the suction passage body. 413h are mounting holes for the above.

Although the curved passage body of the exhaust gas recirculation control system 416 is designed to be formed separately and then installed inside the suction passage in this embodiment, they can be formed together in the following way by die forming.

In FIG. 2, forming dies for the inside and outside portions of the curved passage of the double-pipe suction passage body of the exhaust gas recirculation control system 416 are so designed that the upstream portion and downstream portion can be formed separately. Then, the third forming die for the right-hand portion of the figure is provided. Thus, this assembly can be formed together.

Figure 7:
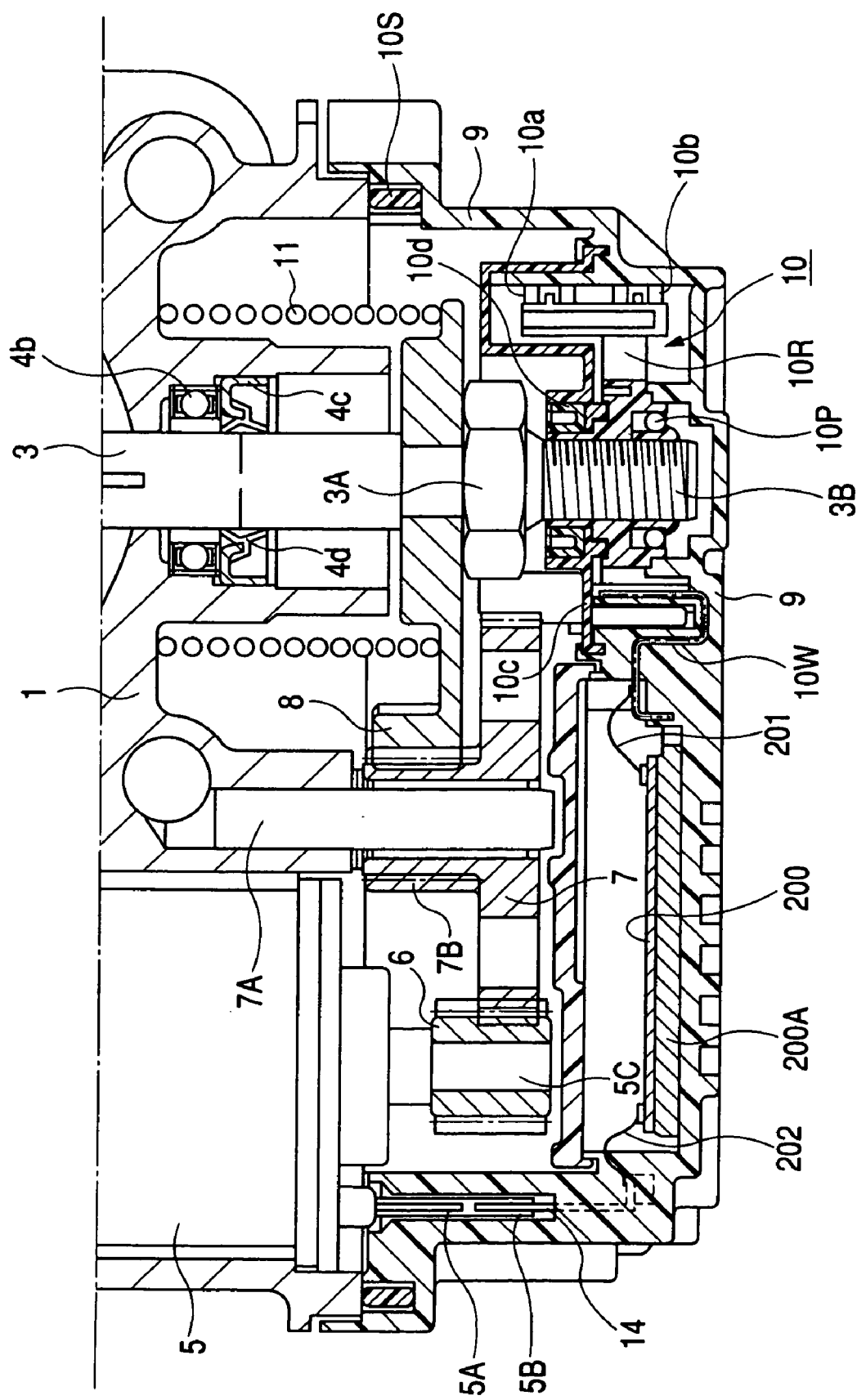
FIG. 7 is a partial enlarged cross-sectional view of the drive mechanism of the suction control unit in the exhaust gas recirculation system according to an embodiment of the present invention.
Figure 8:
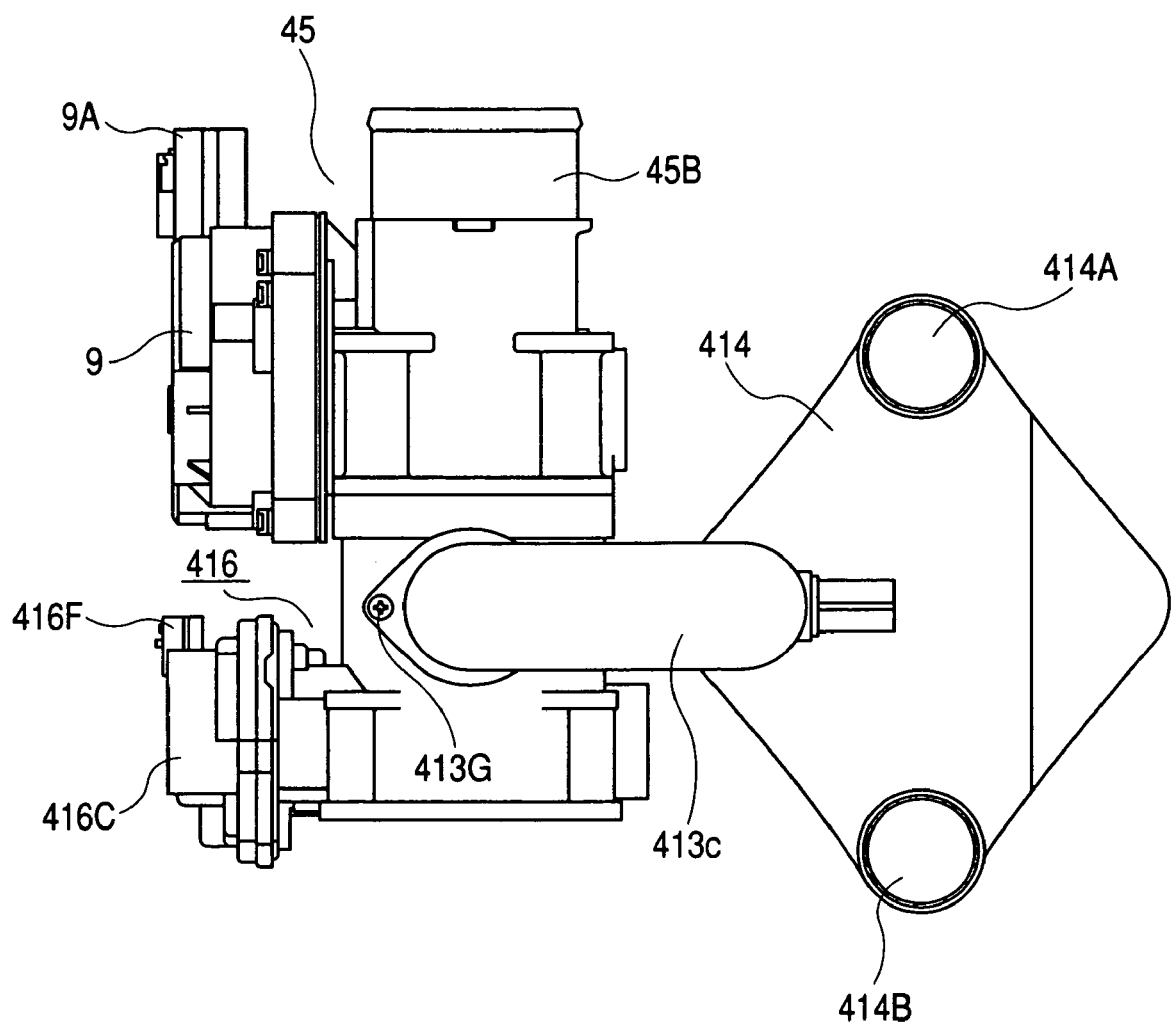
FIG. 8 is a side view of the other side of the exhaust gas recirculation system according to an embodiment of the present invention.
Figure 9:
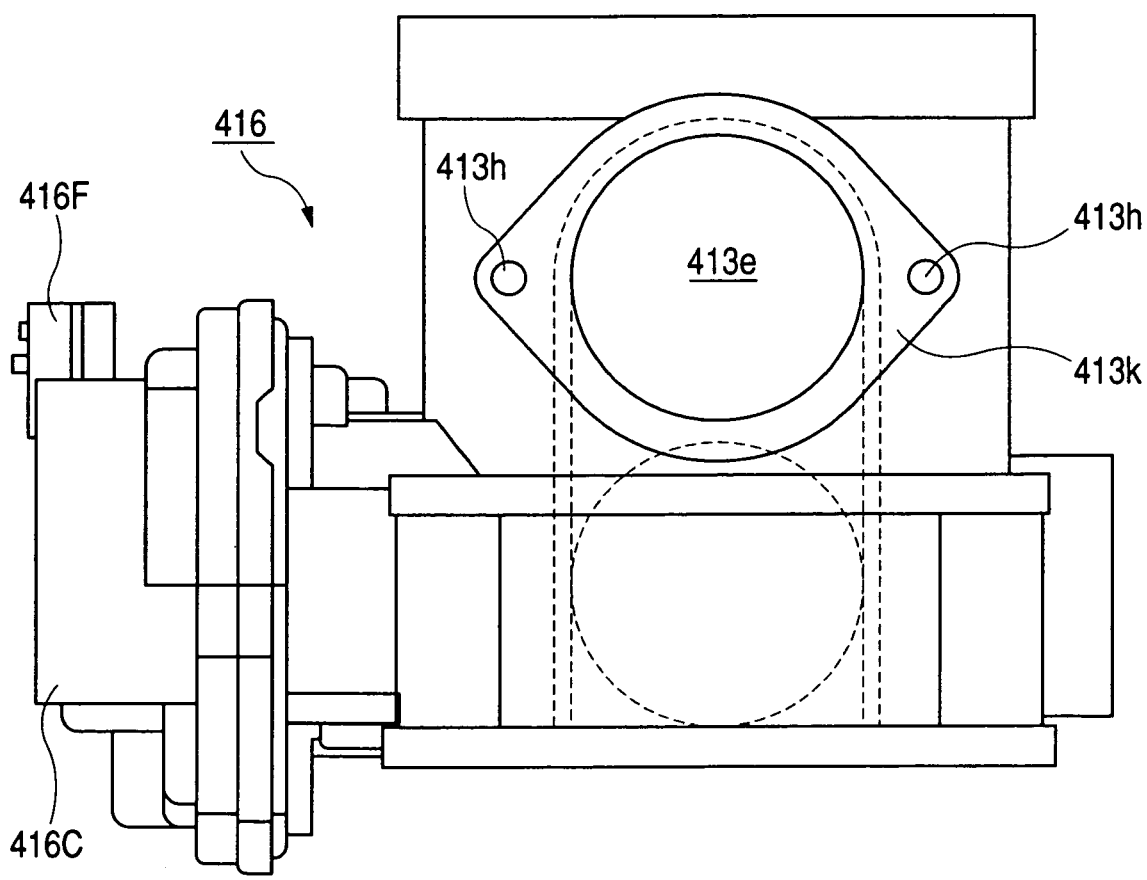
FIG. 9 is a side view of the exhaust gas recirculation system without the cooling unit according to an embodiment of the present invention.

Next, the resin cover portion of the suction control unit is described in detail hereunder, using FIG. 7.

The terminal 5A of the motor 5 is electrically connected with a receiving terminal 14 mounted on the resin cover 9. In this embodiment, the terminal 14 molded together with the resin cover 9 is also a male terminal. Accordingly, a relay terminal 5B having female terminals on both sides is provided between the male terminal 5A on the motor side and male terminal 14 on the cover side.

A conductor extending up to the terminal 14 is electrically connected with a bonding wire 202 of which one end is brazed onto the bonding pad installed on one side of the control circuit board 200. An aluminum radiation plate is sandwiched between the control circuit board 200 and inside wall of the resin cover. A set of terminals to be connected with the opening sensor 10 via a bonding wire 201 of which one end is soldered onto the bonding pad are provided on the other end of the control circuit board. One end of an electric conductor 10w is connected with the resistor board of the sensor and the other end with the bonding wire 201.

12 is a partition for isolating the control circuit board surface from the gear section (it may hereinafter be called the control unit cover). It not only prevents foreign substance from entering the control circuit section but also prevents the intermediate gear 7 from becoming loose in a thrust direction.

On a sensor cover 10c, annular projections for supporting the rotation of the rotor 10R are provided at a portion around the rotating shaft. The tip of the shaft is fit in the center hole of the rotor and the rotor is fixed on the rotating shaft 3 with a C-ring 10P.

The element 10d is a seal rubber that seals between the rotor 10R and sensor cover 10c.

The element 4c is a metal bracket for protecting the seal, and 4d is a lip type seal. This seal prevents exhaust gas component resulting from the back flow of the exhaust gas from entering a sensor chamber and control circuit chamber.

Effects of the above embodiment are summarized as follows.

(1) Since the control valve is opened with a big force, response time can be shorter (about 100 ms from the fully opened state to fully closed state) and the time to reach the target recirculation ratio can be shorter even if the suction rapidly changes under a transient condition in acceleration or deceleration.

(2) According to a prior art in which the EGR gas is let in from the side of the suction passage, the gas is not distributed evenly. According to this embodiment, however, since the EGR gas is let into the center of the suction passage, excellent gas mixture is realized and accordingly smooth distribution into the cylinders is realized.

(3) Because of the cooling effect that the exhaust gas temperature of 500° C. at the inlet is cooled down to 200° C. at the outlet, there is produced an effect that change in the gas temperature is lessened and accordingly measurement accuracy improves. In addition, by lowering the EGR gas temperature so as to increase the gas density (decrease the volume), the upper limit of the recirculation ratio can be widened and accordingly NOx can be reduced. Furthermore, there is another effect that lower gas temperature allows to decrease the combustion temperature of the engine and accordingly reduce NOx.

(4) In addition, while the EGR gas contacts the suction passage body itself when entering into the suction passage in the prior art, the exhaust gas is directed into the suction passage by the exhaust gas passage in this embodiment and so the suction passage body itself is not heated directly by the exhaust gas. Accordingly, bearings of the shaft can no way be heated and so a problem resulting from melted grease can be eliminated.

An electronic control throttle unit of diesel engine to which the present invention applies is described hereunder, using FIG. 21 to FIG. 35.

Figure 21:
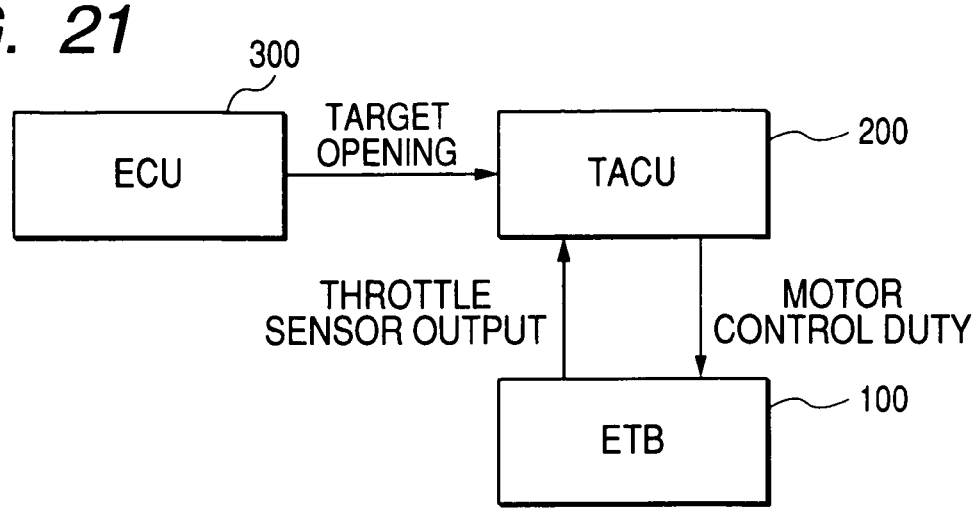
FIG. 21 is block diagram of the electronic control throttle unit according to the first embodiment of the present invention.

To begin with, the system configuration of the electronic control throttle unit of this embodiment is described, using FIG. 21.

FIG. 21 is a block diagram of the electronic control throttle unit according to the first embodiment of the present invention.

The electronic control throttle unit of this embodiment comprises an electronic throttle body (ETB) 100 and throttle actuator control unit (TACU) 200.

The electronic throttle body (ETB) 100 comprises a throttle valve that is supported inside the throttle body to be able to rotate, actuator for the motor that drives the throttle valve, and some others. Detailed construction will be described later, using FIG. 24 to FIG. 31.

The throttle actuator control unit (TACU) 200 so controls that the opening of the throttle valve of the electronic throttle body (ETB) 100 conforms to a throttle valve target opening sent from the engine control unit (ECU) 300. According to the target opening sent from ECU300, TACU 200 outputs to ETB 100 a motor control duty signal for rotating the throttle valve of ETB 100. The opening of the throttle valve that has been rotated according to this duty signal is sensed by a throttle position sensor and supplied as a throttle sensor output to TACU 200. Under a normal control condition, TACU 200 controls the opening of the throttle valve by a feedback control so that the throttle sensor output conforms to the target opening. The construction and operation of TACU 200 will be described later, using FIG. 24 to FIG. 31.

Figure 22A:
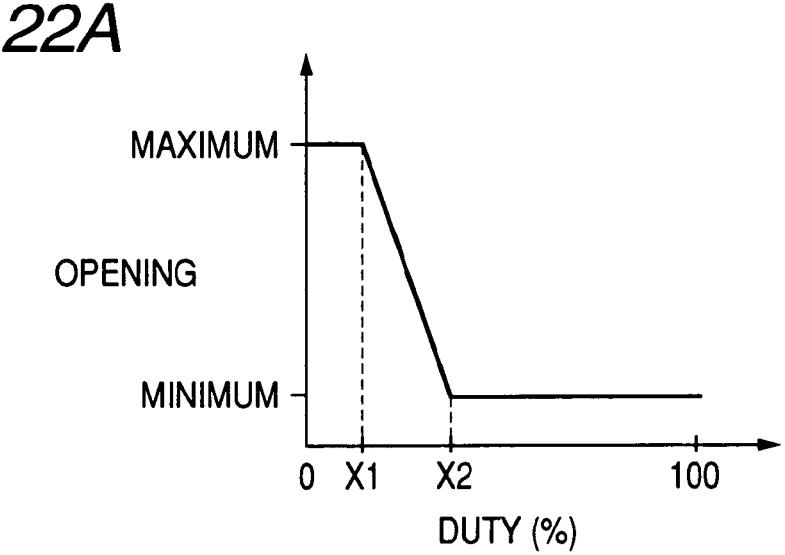
FIG. 22 is a chart explaining the opening characteristic of the throttle valve in the electronic control throttle unit according to the first embodiment of the invention.
Figure 22B:
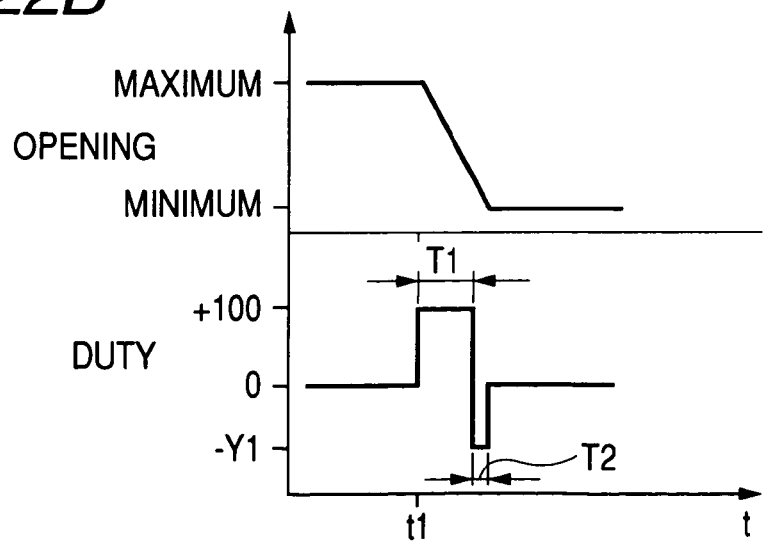
Figure 23:
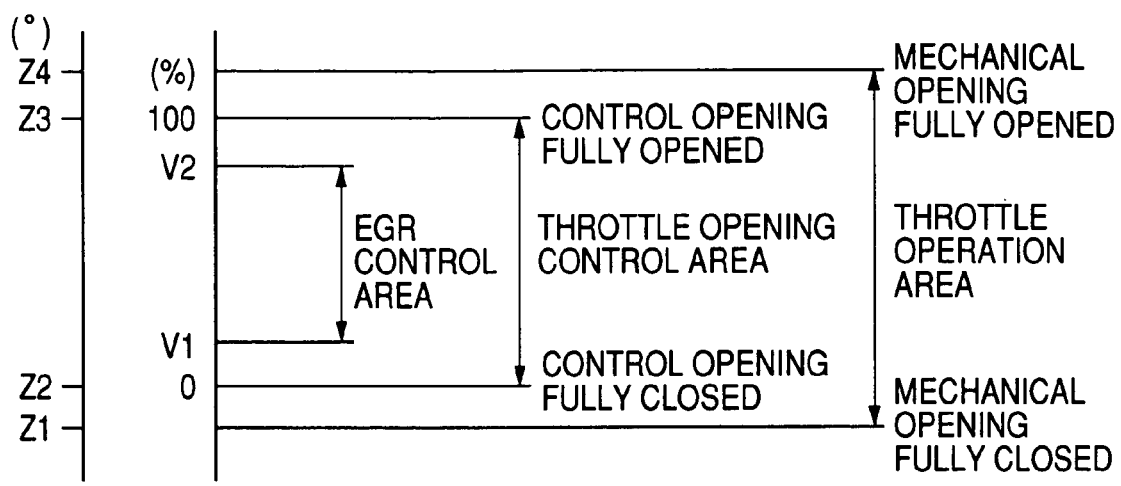
FIG. 23 is a chart explaining the definition of the throttle valve opening in the electronic control throttle unit according to the first embodiment of the invention.

Next, the opening of the throttle valve in the electronic control throttle unit of this embodiment is described hereunder, using FIG. 22 and FIG. 23.

FIG. 22 is a chart explaining the opening characteristic of the throttle valve in the electronic control throttle unit according to the first embodiment of the invention. FIG. 22(A) is a chart explaining the static characteristic of the throttle valve opening and FIG. 22(B) is a chart explaining the dynamic characteristic of the throttle valve opening.

First, the static characteristic of the throttle valve opening is described hereunder, using FIG. 22(A). In FIG. 22(A), the vertical axis represents the duty of the motor control duty signal supplied from TACU 200 to ETB 100 and the horizontal axis represents the throttle valve opening. A force in the opening direction is added to the throttle valve by the return spring, about which description will be given later. Accordingly, when the duty is 0%, that is, when the motor is not energized, the throttle valve is rotated back in the opening direction by the return spring and so the throttle valve opening is at the maximum.

When the duty is in a range of 0% to X1%, a driving force is generated by the motor but, because it is smaller than the force added by the return spring, the throttle valve opening is kept at the maximum. When the duty increases to a range of X1% to X2%, the driving force of the motor becomes greater than the force added by the return spring and accordingly the throttle valve opening decreased gradually towards the minimum and it becomes the minimum at the duty of X2%. When the duty is over X2%, the throttle valve opening is kept at the minimum. Duties of X1% and X2% depend upon the force added by the return spring and driving force generated by the motor, but they can be, for example, X1%=15% and X2%=30%. Accordingly, when a motor control signal for a duty of 22.5% (=(15+30)/2) is sent to the motor, the throttle valve opening is kept at the middle of the maximum and minimum.

The above explains the static relationship between the duty and throttle valve opening. On the other hand, dynamic characteristic shown in FIG. 22(B) is used when the throttle valve opening is changed from one to another. In FIG. 22(B), the vertical axis represents time, upper vertical axis represents opening, and lower vertical axis represents duty. When, for example, the throttle valve opening is changed from the maximum to the minimum as shown at the top in FIG. 22(B), a signal for a duty of 100% is outputted at time t1 and continued for a length of time T1 as shown at the bottom in FIG. 22(B) so as to quickly change the throttle valve opening from the maximum to the minimum. Then, after the length of time T1 has elapsed, a signal for a duty of −Y1% is outputted and continued for the length of time T2. A duty with negative sign means the direction of current applied to the motor is reverse and so the motor rotates in the reverse direction. In short, a signal for a duty of 100% is supplied to dive the throttle valve opening quickly towards the minimum and, after the length of time T1 has elapsed, another signal for rotating the motor in the reverse direction is supplied to brake the motor so that the target opening is reached quickly. Then, a feedback control is applied by changing the duty so that the output opening of the throttle sensor coincides with the target opening. Concrete values of time T1 and T2 and −Y1% depend upon the control system but, in case that the opening is to be changed from the maximum to the minimum within a response time of 100 ms, for example, T1=30 to 50 ms, −Y1=−100%, and T2=3 to 6 ms. These values T1, T2 and −Y1% are obtained from PID calculation and depend upon the control variables of the PID calculation.

Next, the definition of the throttle valve opening in the electronic control throttle unit of this embodiment is described hereunder, using FIG. 23.

FIG. 23 is a chart explaining the definition of the throttle valve opening in the electronic control throttle unit according to the first embodiment of the invention.

Throttle valve has two openings: control opening and mechanical opening. The opening explained in FIG. 22 is a control opening. Control opening is the opening controlled by TACU 200 and the minimum to maximum opening is, for example, 0 to 100%. 0% means the control opening is fully closed and 100% means the control opening is fully opened. A range of 0 to 100% is called the throttle opening control area.

In the mean time, the ETB 100 is equipped with two stoppers for mechanically controlling the throttle valve opening. The position where the throttle valve is stopped by the minimum side stopper and ceases its operation is the mechanical opening fully closed position. The position where the throttle valve is stopped by the maximum side stopper and ceases its operation is the mechanical opening fully opened position. A range of mechanical opening fully closed position to fully opened opening is called the throttle operation area. The throttle operation area is wider than the throttle opening control area as shown in FIG. 23.

Each opening can be expressed in physical angle as follows, for example. When the position at which the throttle valve becomes perpendicular to the air flow is regarded 0°, the mechanical opening fully closed position Z1 is, for example, 6.5° and control opening fully closed position Z2 is, for example, 7°. And the control opening fully opened position Z3 is, for example, 90° and mechanical opening fully opened position Z4 is, for example, 93°.

In addition, as shown in FIG. 23, the EGR control or DPF control area (V1 to V2) lies within the throttle opening control area. That is to say, when the target opening sent from the ECU 300 to the TACU 200 is within a range from V1 to V2, the TACU 200 can judge that the EGR control or DPF control is in operation. In the control area (0 to 100%), V1 10% and V2 is 80% for example.

Next, the construction of the electronic control throttle unit of this embodiment is described hereunder, using FIG. 24 to FIG. 31.

Figure 24:
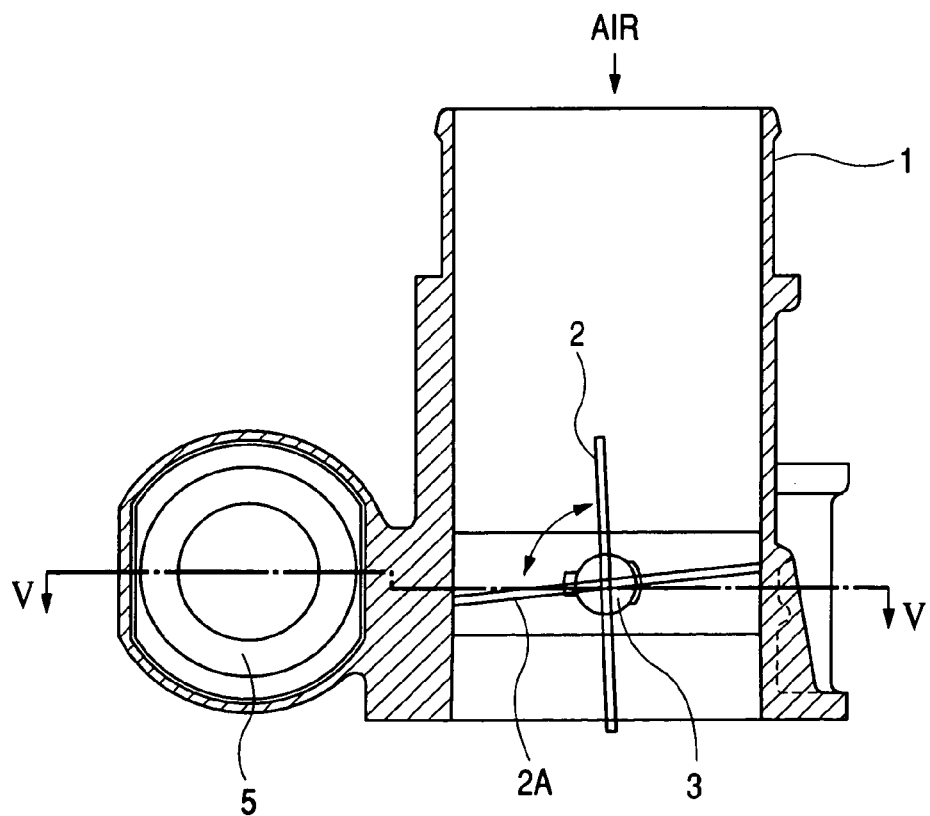
FIG. 24 is a vertical cross section of the electronic control throttle unit according to the first embodiment of the present invention.
Figure 25:
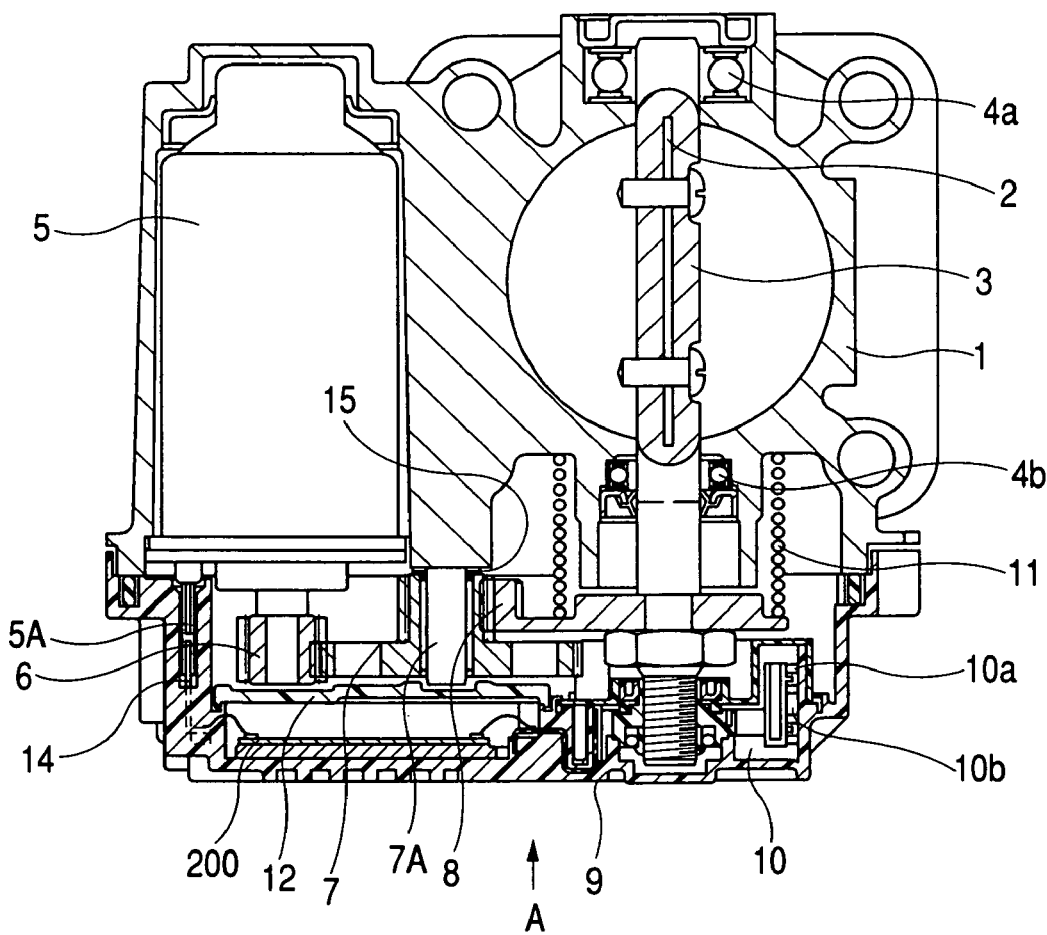
FIG. 25 is a V—V view of FIG. 24.
Figure 26:
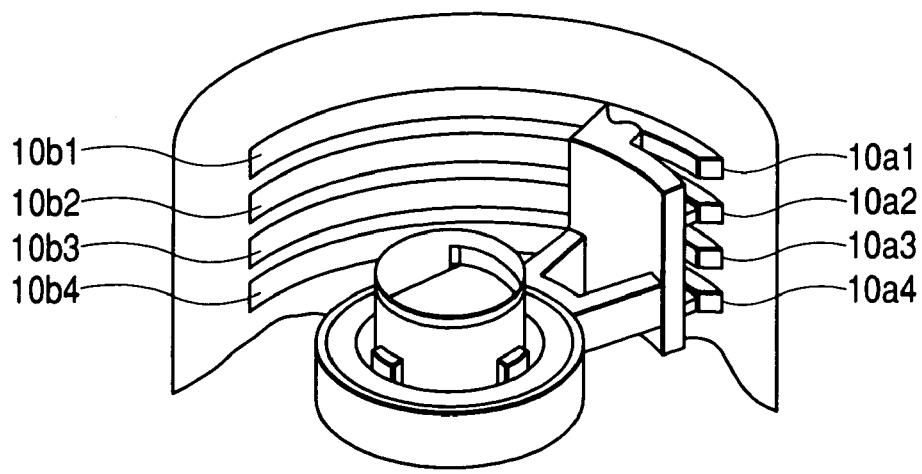
FIG. 26 is an oblique view of the throttle position sensor used in the electronic control throttle unit of the first embodiment of the present invention.
Figure 27:
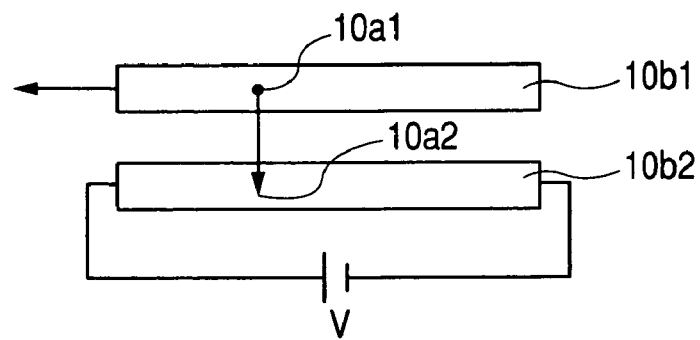
FIG. 27 is a circuit diagram of the throttle position sensor used in the electronic control throttle unit of the first embodiment of the present invention.
Figure 28:
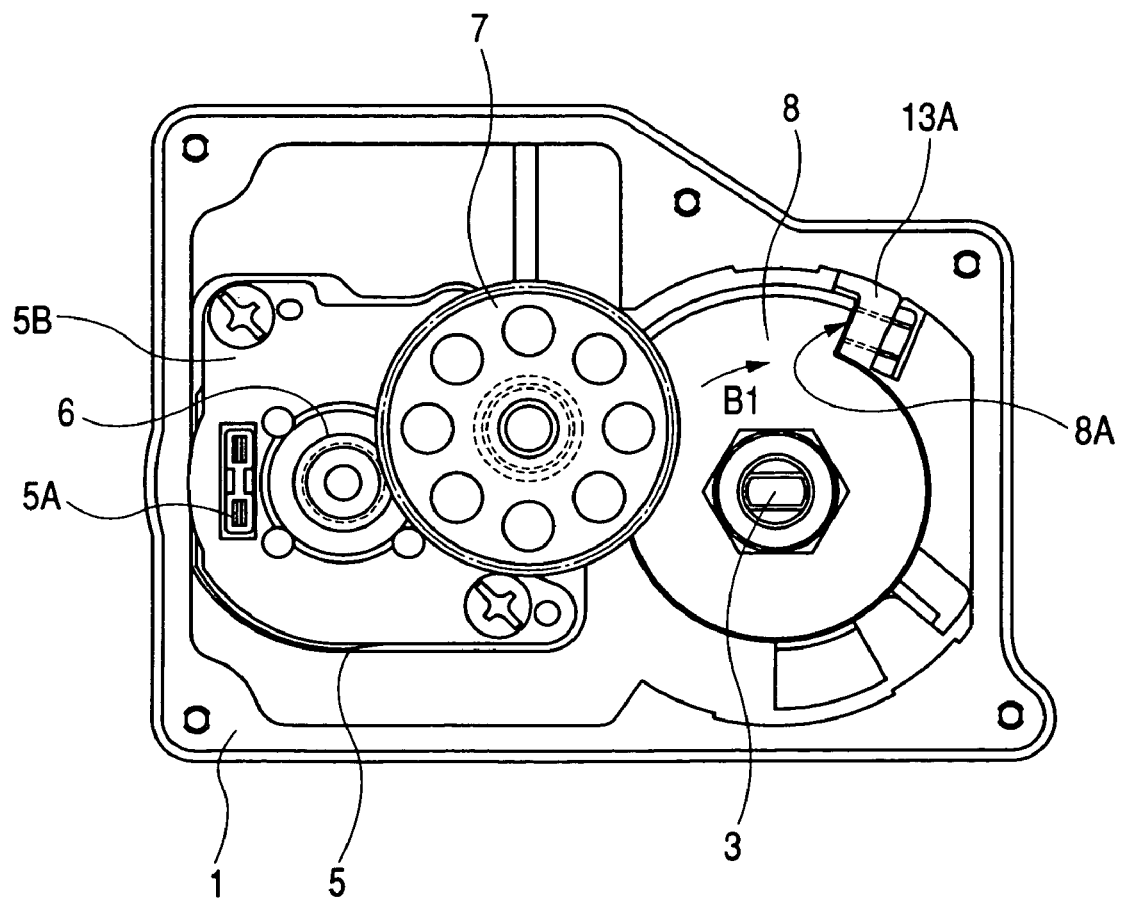
FIG. 28 is a View A of FIG. 24 without the gear cover.
Figure 29:
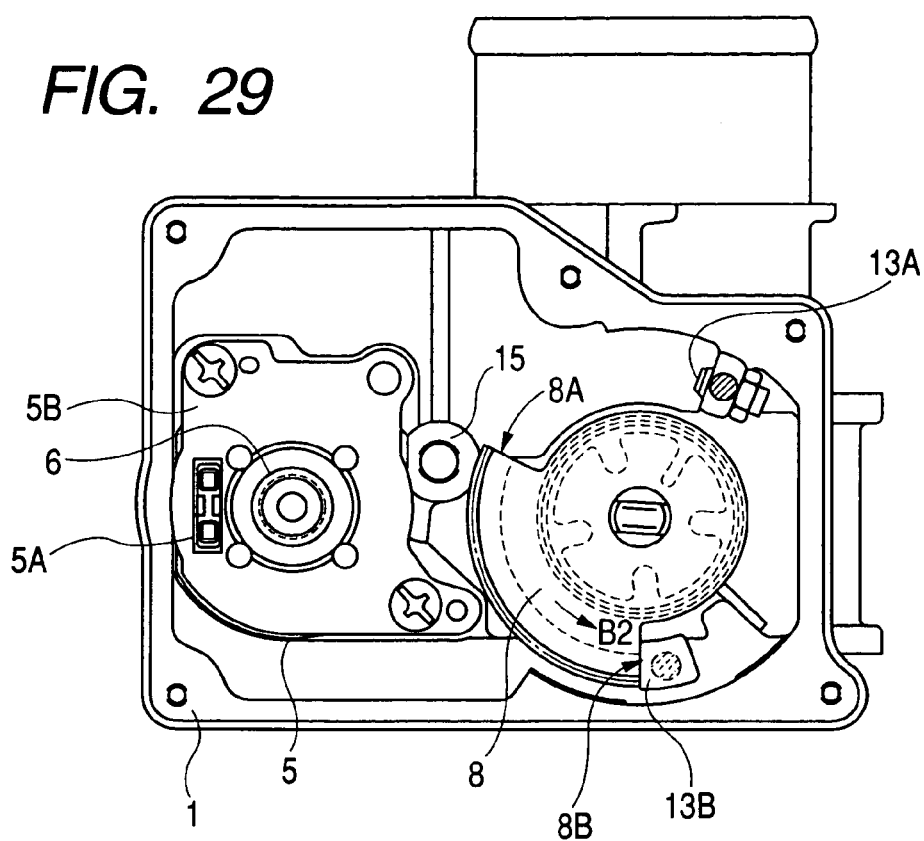
FIG. 29 is a view A of FIG. 24 without the gear cover and also without the intermediate cover.
Figure 30:
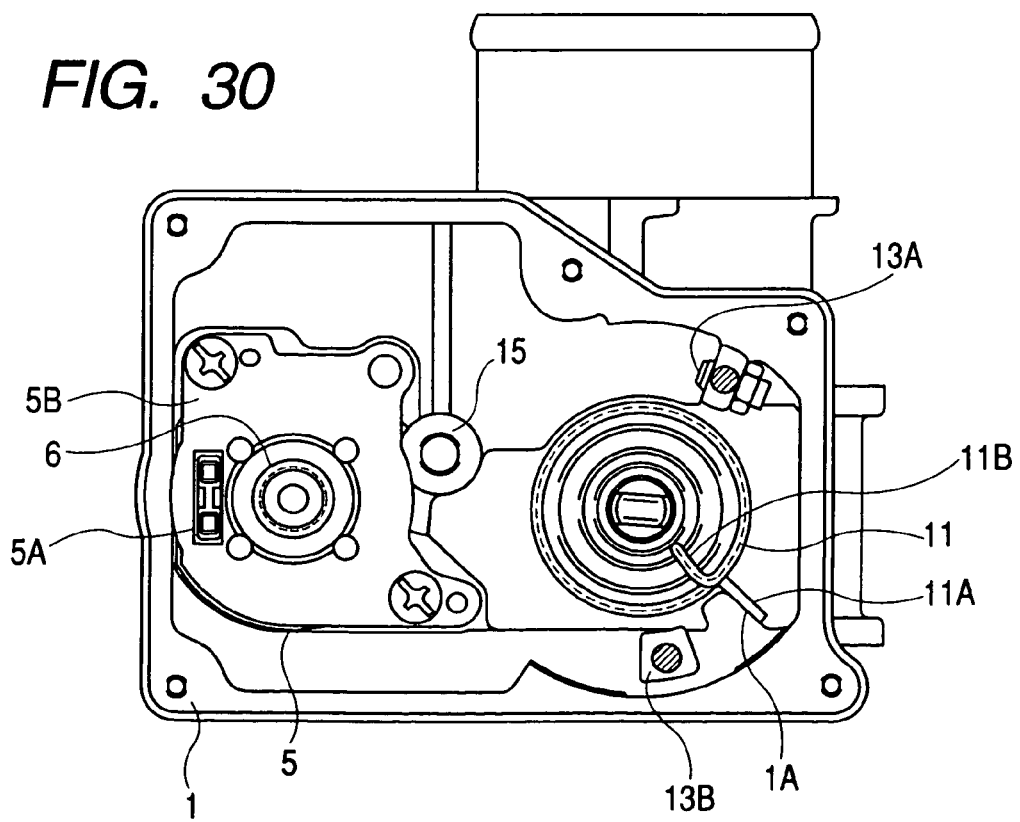
FIG. 30 is a View A of FIG. 24 without the gear cover and also without the intermediate cover and final gear cover.
Figure 31:
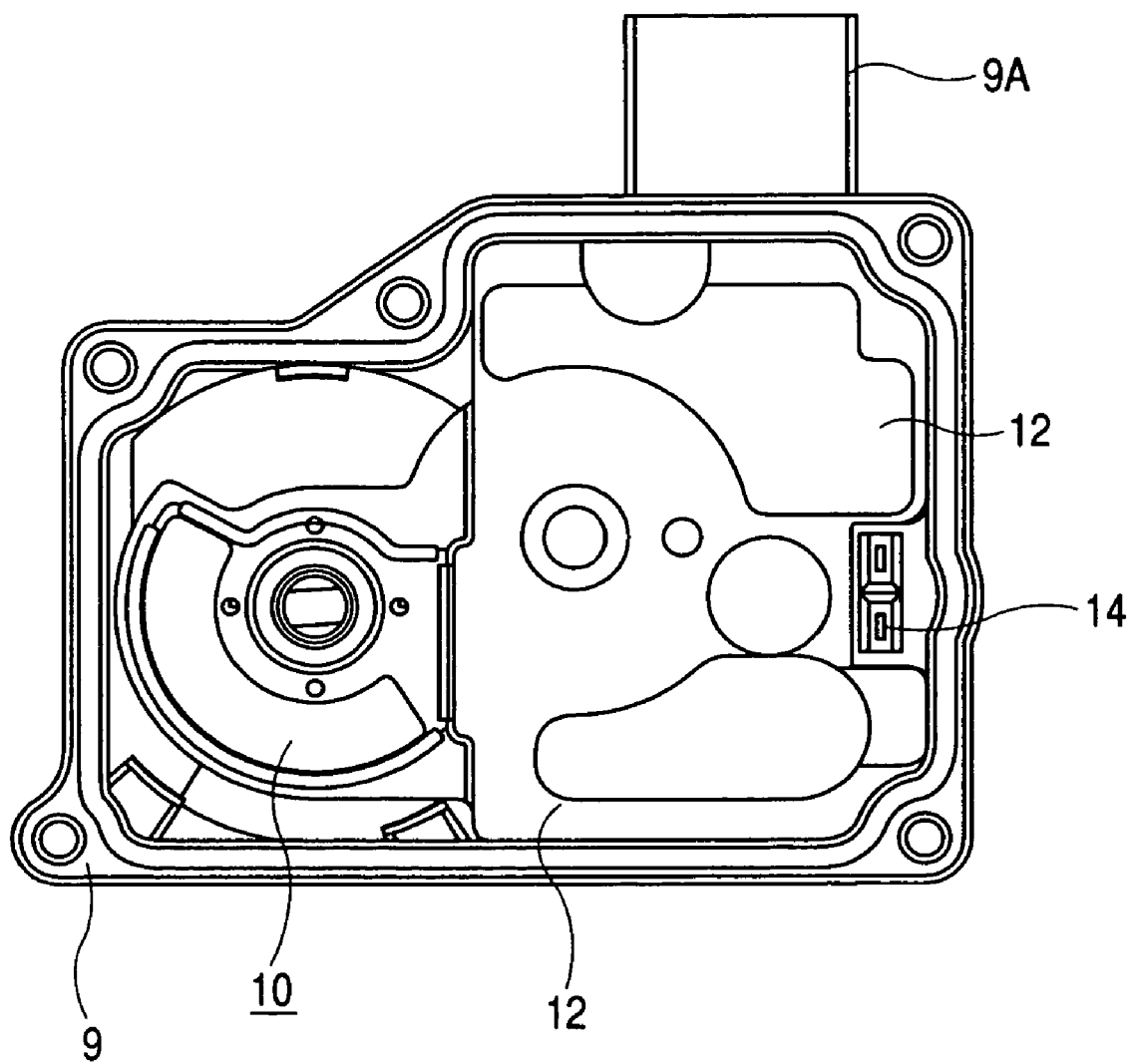
FIG. 31 is a plan view of the gear used in the electronic control throttle unit according to the first embodiment of the present invention.

FIG. 24 is a vertical cross section of the electronic control throttle unit according to the first embodiment of the present invention. FIG. 25 shows a V—V view of FIG. 4. FIG. 26 is an oblique view of the throttle position sensor used in the electronic control throttle unit of the first embodiment of the present invention. FIG. 27 is a circuit diagram of the throttle position sensor used in the electronic control throttle unit of the first embodiment of the present invention. FIG. 28, FIG. 29 and FIG. 30 are view A of FIG. 24 without the gear cover. FIG. 31 is a plan view of the gear used in the electronic control throttle unit in an embodiment. In each figure, the same symbol represents the same part or component.

As shown in FIG. 24, the throttle body 1 forms the air passage and supports various components. In the air passage, suction air flows in the arrow "AIR" direction from the top to the bottom. The throttle body 1 is for example die-cast from aluminum. The throttle valve 2 is fixed on the throttle shaft 3 with screws. The throttle shaft 3 is supported in the throttle body 1 by ball bearings to be able to rotate. No duty is applied to the motor. Under the condition as shown, the throttle valve 2 is held at the mechanical opening fully closed position by the force added by the return spring. A DC motor 5 is enclosed and fixed in a space inside the throttle body 1. The drive force of the DC motor 5 is transmitted to the throttle shaft 3 via a gear (not shown) and rotates the throttle valve 2.

The throttle shaft 3 is supported in the throttle body 1 by the ball bearings 4a and 4b to be able to rotate. A gear 8 is fixed on the throttle shaft 3. A return spring 11 is held between the gear 8 and throttle body 1. The return spring 11 adds a force to the gear 8 and throttle shaft 3 so that the throttle valve 2 moves towards the fully opened direction.

The DC motor 5 is enclosed and fixed in a space inside the throttle body 1. A gear 6 is fixed on the output shaft of the motor 5. A gear 7 is supported to be able to rotate by the throttle shaft 7A fixed in the throttle body 1. The gears 6, 7 and 8 are engaged with each other and the drive force of the motor 5 is transmitted to the throttle shaft via the gears 6, 7 and 8. As the throttle valve 2 is rotated, the suction air into the engine is electronically controlled.

A throttle actuator control unit (TACU) 200 is supported on a gear cover 9. A control unit cover 12 is fastened onto the gear cover 9 so that no water droplet contacts the TACU 200. The gear cover 9 is resin molded and a connector terminal 14 is molded together. One end of the connector terminal 14 is electrically connected with the TACU 200. When the gear cover 9 is mounted on the throttle body 1, the other end of the connector terminal contacts the motor terminal 5A of the motor 5, and so the TACU 200 can be electrically connected with the motor 5. When a duty signal is outputted to the motor 5, the DC motor 5 generates a rotating force.

The throttle position sensor 10 for sensing the position of the throttle valve 2 comprises a moving part, brush 10a and fixed part, resistor 10b. The brush 10a is so constructed that when it is engaged with the throttle shaft 3, it is rigidly fasted onto the throttle valve 2. The resistor is contained in the gear cover 9. It is so designed that when the brush 10a contacts the resistor 10b, the position of the throttle valve 2 is converted into voltage and outputted to the control unit 12.

The construction of the throttle position sensor 10 is described hereunder, using FIG. 26 and FIG. 27. As shown in FIG. 26, the throttle position sensor 10 comprises four brushes 10a1, 10a2, 10a3 and 10a4 and four resistors 10b1, 10b2, 10b3 and 10b4. The brushes 10a1 and 10a2 and resistors 10b1 and 10b2 constitute the first throttle position sensor, and brushes 10a3 and 10a4 and resistors 10b3 and 10b4 constitute the second throttle position sensor. This embodiment employs a throttle position sensor for gasoline engine system, that is, a construction equipped with two sets of the throttle position sensors. For a diesel engine, however, only one of the two sets of the throttle position sensors is employed.

On one set of the throttle position sensor, as shown in FIG. 27, the brushes 10a1 and 10a2 slide on and contact with the resistors 10b1 and 10b2. Direct current voltage is supplied to both ends of the resistor 10b2 from a power supply V. By measuring the voltage at the resistor 10b1, the position of the brush 10a, that is, the position of the throttle valve 2 can be sensed as a voltage signal.

Under a normal control, the TACU 200 controls the valve by a feedback control using the output of the throttle position sensor 10 so that the position of the throttle valve 2 coincides with the target opening.

A washer 15 is installed between the gear 7 and throttle body 1. The washer 15 is made of abrasion resisting plastic material, for example, PA66 nylon containing molybdenum. When the motor 5 is off, the motor 5 does not generate any driving force. Under this condition, the throttle valve 2 is held at the mechanical opening fully opened position by the return spring 11. While the gear 6 and gear 8 are fastened rigidly onto the motor shaft and throttle shaft 3, respectively, the gear 7 is supported freely over the shaft 7A. Since the throttle control unit of this embodiment is installed on a vehicle, if the gear 7 like the above is mounted to be able to move freely, the gear 7 would vibrate in the thrust direction of the shaft 7A due to the vibration of the vehicle and so the edge of the gear 7 would hit the throttle body 1, resulting in generation of abnormal sound and damage or abrasion of the throttle body 1. In the mean time, while the throttle body 1 is made of aluminum die cast, the gear is made of sintered metal which is harder than aluminum. In order to prevent generation of abnormal sound and damage, the washer 15 made of abrasion resisting plastic material is used.

FIG. 28 is the view A of FIG. 25 without the gear cover 9. The motor 5 is fixed as the motor mounting plate 5B is fastened onto the throttle body 1 with screws. A power terminal 5A of the motor 5 protrudes from the opening of the plate 5B.

A mechanical opening fully closed position stopper 13A is mounted near the gear 9 on the throttle body 1. When a signal for a duty of 100% is supplied to the motor 5, the gear 8 rotates in the arrow B1 direction (closing direction of the throttle valve 2) and the stopper end 8A mounted on the gear 8 contacts the mechanical opening fully opened position stopper 13A. Thus, the valve is held at the mechanical opening fully opened position.

The electronic control throttle unit for a diesel engine is so designed that, if any failure of the DC motor 5 or throttle position sensor 10 is sensed by the control unit 12, power supply to the DC motor 5 is immediately shut off or control duty is immediately fixed to 0% so that the valve returns to the mechanical opening fully opened position only by the force added by the return spring 11 in the opening direction.

FIG. 29 shows the same as in FIG. 28 but without the gear 7. The shape of the gear 8 is nearly a trisection. One end of the gear 8 functions as the stopper end 8A and the other end also functions as the stopper end 8B. A mechanical opening fully opened position stopper 13B is mounted near the gear 9 on the throttle body 1. When no duty signal or voltage is supplied to the motor 5, the stopper end 8B is moved by the force added by the return spring 11 in the opening direction to contact the mechanical opening fully opened position stopper 13B. Thus, the throttle valve 2 is held at the mechanical opening fully opened position. In short, so far as no duty is applied to the motor 5, the throttle valve 2 remains at the mechanically opening fully opened position.

FIG. 30 shows the same as in FIG. 29 but without the gear 8. Only one return spring 11 is used. One end 11A of the return spring 11 is hooked on a portion 1A of the throttle body 1 and the other end 11B is hooked on the gear 8, adding a force to the throttle valve 2 in the opening direction.

FIG. 31 is a plan view of the gear cover 9. The gear cover 9 is equipped with a connector terminal 14. The gear cover 9 is also equipped with a connector 9A for connection with the ECU 300 and power supply, and the terminal inside it is connected with the TACU 200.

Figure 32:
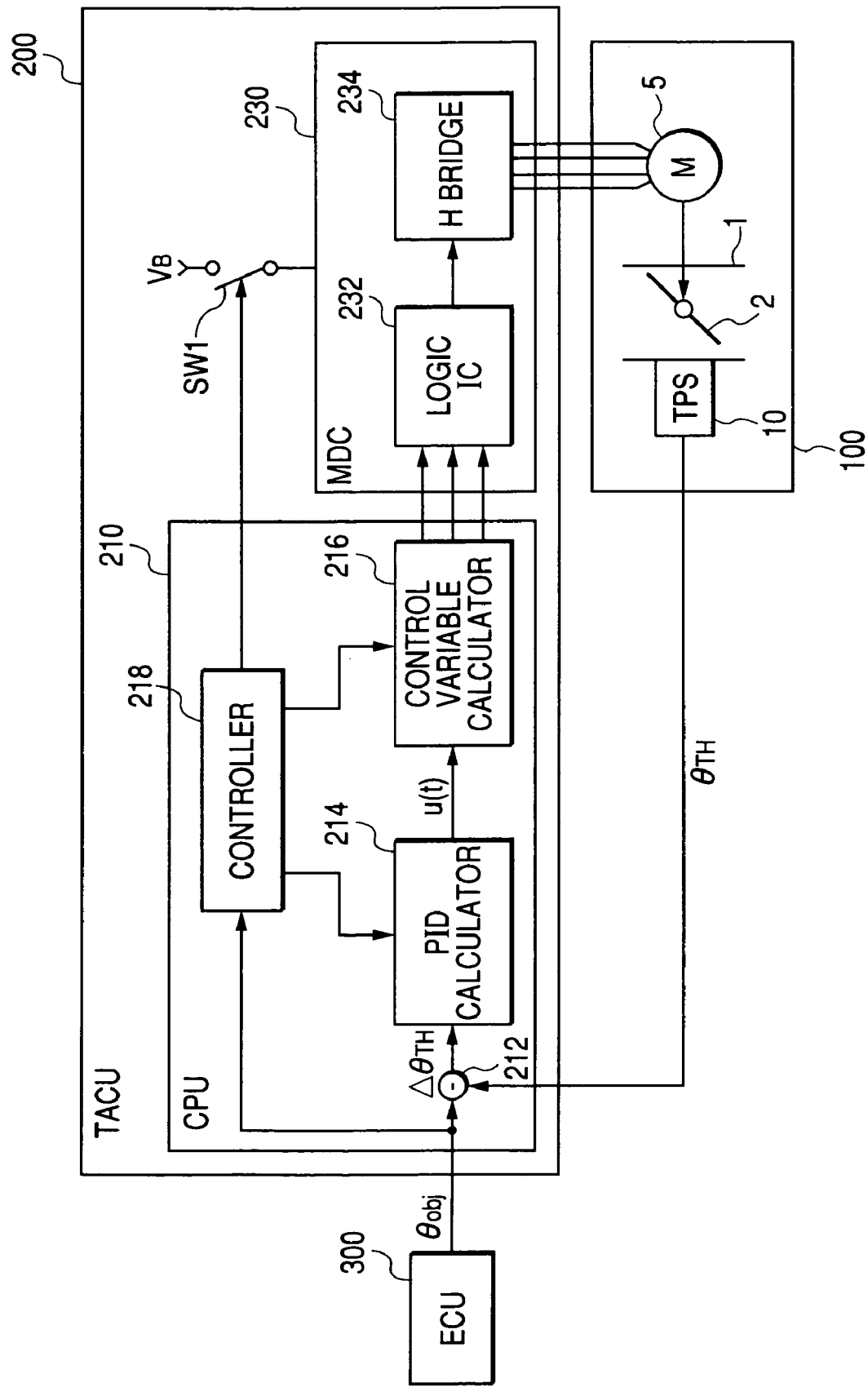
FIG. 32 is a block diagram of the throttle actuator control unit (TACU) in the electronic control throttle unit according to the first embodiment of the present invention.

Next, the system configuration of the throttle actuator control unit (TACU) 200 of this embodiment is described, using FIG. 32.

FIG. 32 is a block diagram of the throttle actuator control unit (TACU) of the electronic control throttle unit according to the first embodiment of the present invention. The same symbol as in FIG. 21, FIG. 24 and FIG. 25 represents the same part or component.

The throttle actuator control unit (TACU) 200 comprises a CPU 210 and motor drive circuit (MDC) 230. The CPU 210 comprises a differential calculator 212, PID calculator 214, control variable calculator 216 and controller 218.

The differential calculator 212 calculates the differential opening $\Delta\theta_{th}$ between the target opening $\theta_{obj}$ outputted from the ECU 300 and real opening $\theta_{th}$ of the throttle valve outputted from the PID sensor 10. The PID calculator 214 calculates the PID control variable u(t) based on the differential opening $\Delta\theta_{th}$ outputted from the differential calculator 212. The PID control variable u(t) obtained from the PID calculation is calculated as $(Kp \cdot \Delta\theta_{th} + Kd \cdot (d\Delta\theta_{th}/dt) + Ki \cdot \Sigma\Delta\theta_{th} \cdot dt)$, wherein Kp is a proportional constant, Kd is a differential constant, and Ki is an integration constant. The control variable calculator 216 turns an on/off selector switch of the H bridge circuit 234 (which will be explained later) and determines the flow direction of current based on the PID control variable u(t), and also determines a duty for turning on/off the switch of the H bridge circuit and outputs a control variable signal. The controller 218, which will be explained in detail later, using FIG. 34, judges whether the EGR control or DPF control is in operation based on the target opening $\theta_{th}$. If neither EGR control nor DPF control is in operation, it accomplishes a necessary control for fully opening the throttle valve and also controls to open or close the switch SW1 for supplying a voltage VB to the PID calculator 214, control variable calculator 216 and MDC 230 as required.

The motor drive circuit (MDC) 230 has a logic IC 232 and H bridge circuit 234. The logic IC 232 outputs an on/off signal to the four switches of the H bridge circuit 234 based on the control variable signal outputted from the control variable calculator 216. The H bridge circuit 234 is switched on or off in accordance with an on/off signal and supplies necessary current to the motor 5 to rotate the motor 5 in the normal direction or reverse direction.

Figure 33:
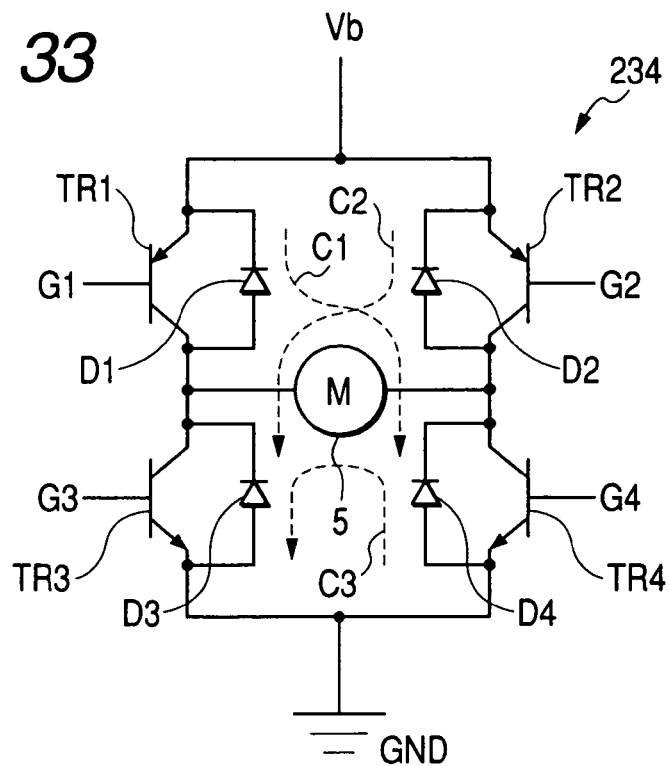
FIG. 33 is a circuit diagram showing the construction of the H bridge circuit in the electronic control throttle unit according to the first embodiment of the present invention.
Figure 34:
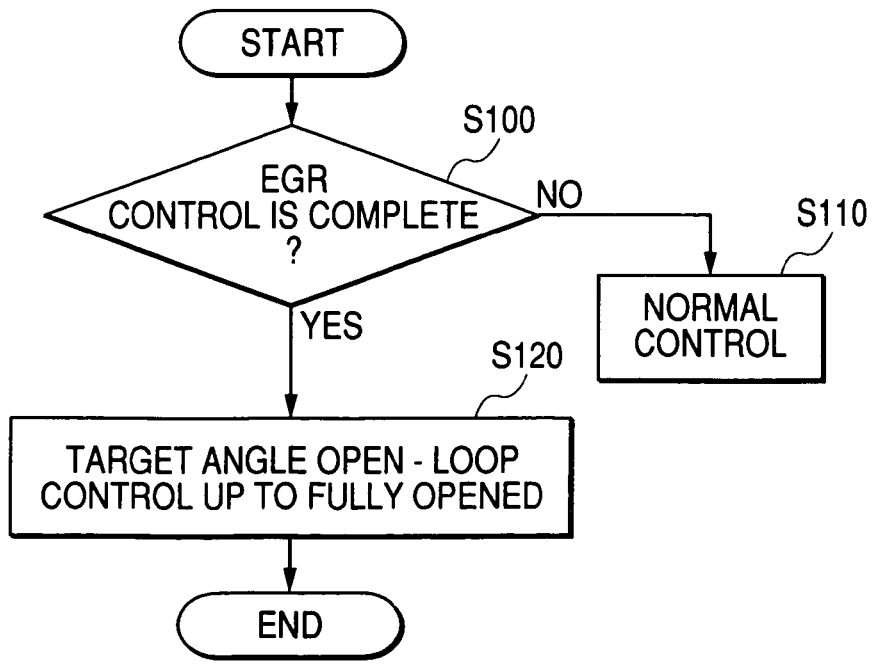
FIG. 34 is a flowchart of the control by the controller in the electronic control throttle unit according to the first embodiment of the present invention.

Next, the construction of the H bridge circuit 234 used in the electronic control throttle unit of this embodiment is described, using FIG. 33.

FIG. 33 is a circuit diagram of the H bridge circuit used in the electronic control throttle unit according to the first embodiment of the present invention.

The H bridge circuit 234 comprises four transistors TR1, TR2, TR3 and TR4 and four diodes D1, D2, D3 and D4, which are connected with each other as shown so as to supply current to the motor 5. For example, when the gate signal G1 and gate signal G4 are high level and so the transistors TR1 and TR4 are turned on, current runs as shown by a broken line C1. When this applies, for example, the motor 5 rotates in the normal direction. When the gate signal G2 and gate signal G3 are high level and so the transistors TR2 and TR3 are turned on, current runs as shown by a broken line C2. When this applies, for example, the motor 5 rotates in the reverse direction. Furthermore, when the gate signal G3 and gate signal G4 are high level and so the transistors TR3 and TR4 are turned on, current runs as shown by a broken line C3. When this applies, an external driving force is transmitted to the drive shaft of the motor 5 and, as the rotor of the motor 5 is rotated, the motor 5 functions as a generator and accordingly regenerative braking can be operated. It is also possible to cause regenerative braking if the transistors TR1 and TR2 are turned on at the same time.

In this embodiment, a one-chip microcomputer containing integrated H bridge circuit is employed and so the transistors can be controlled to be on or off freely by sending a digital signal to the logic IC. However, either an H bridge circuit comprising four transistors or using an integrated one-chip IC will serve the purpose so far as it can control the condition of the motor drive circuit.

Next, the control by the controller 218 of the electronic control throttle unit of this embodiment is described, using FIG. 24 and FIG. 25.

FIG. 24 is a flowchart of the control by the controller of the electronic control throttle unit according to the first embodiment of the present invention. FIG. 25 is a diagram explaining the control by the controller of the electronic control throttle unit according to the first embodiment of the present invention.

On step s100, the controller 218 judges whether the EGR control or DPF control is complete. If it is not complete yet, a normal feedback control is continued on step s110. If it is complete, a target angle control to the fully opened position is performed on step s120.

In making a judgment on step s100, the controller 218 judges whether the EGR control or DPF control is complete from the target opening inputted from the ECU 300. For example, if the throttle opening control area is 0 to 100%, the range from V1 to V2 (10 to 80% for example) is the EGR control or DPF control area as explained in FIG. 23. Accordingly, if the target opening inputted from the ECU 300 is within a range from 10 to 80%, the controller 218 judges that the EGR control or DPF control is in operation. If the target opening is in a range from 0 to 10% or 80 to 100%, the controller 218 judges that the EGR control or DPF control is complete. In addition, it is possible to so construct the system that the completion of the control is judged by whether a flag of EGR control complete or DPF control complete is received from the ECU 300.

Next, the target angle control to the fully opened position on step s120 is described, using FIG. 25. In FIG. 25, the horizontal axis represents time t. The vertical axis represents the throttle opening (control opening) $\theta_{th}$ and motor duty Du. The throttle opening $\theta_{th}$ closer to the origin is towards the fully closed position and farther from the origin is towards the fully opened position. The motor duty Du closer to the origin is towards 100% and farther from the origin is towards 0%.

In the figure, a bold line $\theta_{th}$ shows the change of the throttle opening and broken line Du shows the duty applied to the motor. The figure shows that the EGR control or DPF control is in operation up to time t3 and that the EGR control or DPF control is complete on and after time t3. The bold line $\theta_{th}$ shows the change of the throttle opening where the control according to this embodiment is in operation after time t3 and the dashed line shows the change of the throttle opening where the control according to this embodiment is not operated.

Up to time t3, the EGR control or DPF control is in operation by way of the processing on step s110. The duty Du applied to the motor changes according to the target opening $\theta_{obj}$ inputted from the ECU 300 and the throttle opening $\theta_{th}$ also changes accordingly.

At time t3 when the EGR control or DPF control is judged complete, power to the motor is shut off if the control according to this embodiment is not in operation. That is to say, the motor duty becomes 0%. As a result of this, the throttle valve is moved towards the fully opened position as shown by a dashed line by the force added by the return spring. Then at time t4, the valve contacts the fully opened position stopper and, after repeating bound on the stopper and return by the return spring, it finally stops at the control opening fully opened position. For example, the length of time T4 from time t3 to t4 is 150 ms. When the throttle valve is returned by the return spring at a high speed like the above and impacts with the fully opened position stopper, an impact sound is generated and life of mechanical parts deteriorates due to the impact load.

In the target angle open-loop control up to the fully opened position according to this embodiment, however, the controller 218 outputs a control signal to the control variable calculator 216 so that the duty decreases gradually, starting from the time when the EGR control or DPF control is judged complete (time t3), and comes to 0% at time t5 as shown by the motor duty Du. The control variable calculator 216 outputs a control signal to the logic IC 232 so that the duty decreases gradually, starting from time t3, and comes to 0% at time t5. As a result of the above, the motor is rotated according to the duty signal shown by the dotted line Du in the figure and accordingly the throttle opening $\theta_{th}$ is gradually moved towards the fully opened side, starting from the time when the EGR control or DPF control is judged complete (time t3), and reaches the fully opened position at time t5 as shown by the bold line in the figure. Since the duty signal is gradually decreased in the above operation so that the length of time T5 from time t3 to t5 becomes, for example, 500 ms, the speed of impact of the gear 8 with the fully opened position stopper 13A at the time when the throttle valve is returned to the fully opened position can be decreased and accordingly the generation of impact sound and deterioration of life of mechanical parts due to the impact load can be prevented.

If the motor drive duty to be applied under the open-loop control is set to have slower response (T4<T5) than in case the valve is returned only by the spring force added in the fully opened direction, the sound and energy of the impact of the fully opened position stopper with the motor drive gear can be decreased. In case of a control as disclosed in the Japanese Patent Application Laid-open Publication 2003-214196 where a predetermined duty is applied to the motor for a length of time, it is possible that control for driving the motor is continued even after the throttle valve has returned to the fully opened position because dispersion of response time varying from product to product cannot be completely covered by the control, and accordingly the motor may be damaged due to over-current. In this embodiment, however, there will not be caused any such problem that the control is continued even after the valve has returned to the fully opened position stopper.

The controller 218 controls the throttle opening by an open-loop control by applying a target duty. In this open-loop control, target may be applied by way of either a monotonously decreasing linear expression as shown in FIG. 25 or a parabolical expression or any other so far as the duty is so applied that the time for the valve to return is shorter than in case it is returned only by the force added by the return spring 11. Then, the noise and load of the impact of the gear 8 with the fully opened position stopper 13 can be reduced.

In this embodiment, when the EGR control or DPF control is judged complete and so the throttle valve is moved to the fully opened position, the duty applied to the motor is decreased gradually as explained above. Thus, the speed of the impact of the gear with the fully opened position stopper can be decreased and accordingly the generation of impact sound and deterioration of life of mechanical parts due to the impact load can be prevented.

Next, the control by the controller 218 of the electronic control throttle unit according to the second embodiment of the present invention is described, using FIG. 26 and FIG. 27.

The system configuration of the electronic control throttle unit of this embodiment is similar to that in FIG. 21. The construction of the electronic control throttle unit of this embodiment is similar to that shown in FIG. 24 to FIG. 31. Also, the system configuration of the throttle actuator control unit (TACU) 200 of the electronic control throttle unit of this embodiment is similar to that in FIG. 32. Also, the construction of the H bridge circuit 234 used in the electronic control throttle unit of this embodiment is similar to that in FIG. 33.

Figure 36:
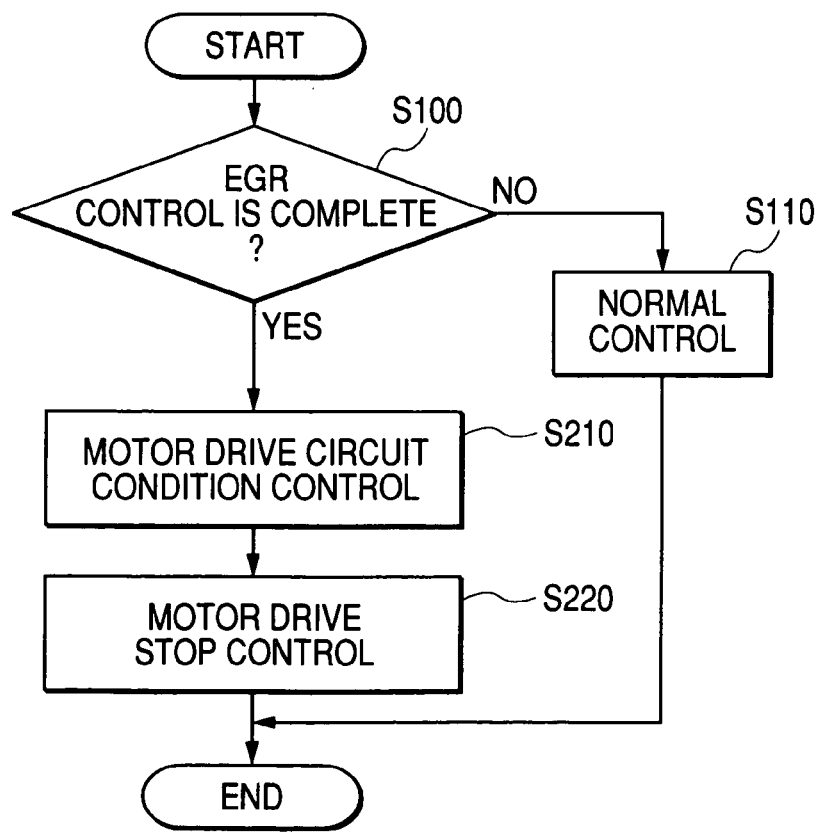
FIG. 36 is a flowchart of the control by the controller in the electronic control throttle unit according to the second embodiment of the present invention.
Figure 37:
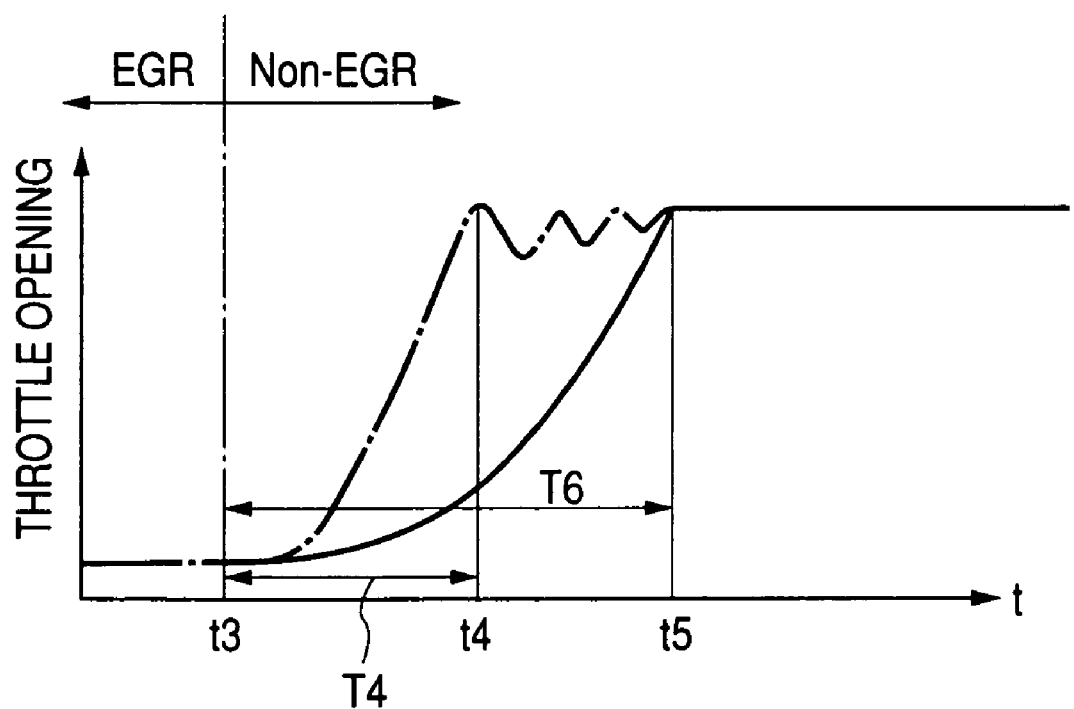
FIG. 37 is a diagram explaining the control by the controller in the electronic control throttle unit according to the first embodiment of the present invention.

FIG. 36 is a flowchart of the control by the controller of the electronic control throttle unit according to the second embodiment of the present invention. FIG. 37 is a diagram explaining the control by the controller of the electronic control throttle unit according to the second embodiment of the present invention. The same step number represents the same control as in FIG. 34.

In FIG. 37, the horizontal axis represents time t. The vertical axis represents the throttle opening (control opening) $\theta_{th}$. The throttle opening $\theta_{th}$ closer to the origin is towards the fully closed position and farther from the origin is towards the fully opened position.

On step s100, the controller 218 judges whether the EGR control or DPF control is complete. If it is not complete yet, a normal feedback control is continued on step s110. If it is complete, a motor drive circuit condition control is performed on step s210, and then a motor drive stop control is performed on step 220. The processing from s100 to s220 is repeated at a cycle of 3 ms for example.

On step s210, the controller 218 outputs a control signal to the control variable calculator 216 so that regenerative braking is caused on the motor. As explained in FIG. 33, when an ON signal is supplied to the gates G3 and G4 of the transistors TR3 and TR4, and if the motor 5 is rotating, current runs in the arrow C3 direction and accordingly the regenerative braking is caused on the motor 5. Then, the controller 218 outputs a control signal to the control variable calculator 216 so that the transistors TR3 and TR4 are turned on. The control variable calculator 216 then outputs a control signal to logic IC 232 so that the transistors TR3 and TR4 are turned on. In this operation, the throttle valve 2 is moved towards the fully opened direction by the return spring 11. Since the movement of the throttle shaft is transmitted to the motor 5 via the gears 8, 7 and 6, regenerative braking is caused on the motor 5. Because of this regenerative braking of the motor 5, the movement of the throttle valve towards the fully opened direction is braked.

An important point in this construction is that, although the motor drive mechanism is rotated in the fully opening direction by the force added by the return spring 11 when the motor is turned off, turning on/off the transistors of the H bridge circuit is so controlled that, by setting the motor circuit active, the rotating force of the DC motor 5 acts opposite to the force added by the return spring 11. With this control, the throttle valve 2 moves slowly as in case the motor drive circuit is connected as shown in FIG. 37 and accordingly sudden impact of the gear 8 with the fully opened position stopper can be prevented.

Then, on step s220, the controller 218 outputs a control signal to the control variable calculator 216 so that the motor drive is stopped. That is, the controller 218 outputs a signal to the control variable calculator 216 so that the motor duty Du becomes 0%. The control variable calculator 216 outputs a control signal to the logic IC 232 so that the motor duty Du becomes 0%. As a result of this, power to the motor is shut off and accordingly the throttle valve 2 is moved towards the fully opened direction by the return spring 11.

The motor drive stop control may be such that power to the motor 5 is shut off. That is, the controller 218 turns off the switch SW1 shown in FIG. 32 so as to stop supplying power to the motor 5 from a power supply VB via the motor drive circuit 230. In the motor drive stop control, as explained above, power to the motor is shut off to stop driving the motor either by setting the motor duty Du to 0% to turn off the transistors in the H bridge circuit or by turning off the switch installed on a power line from the power supply to the motor.

That is to say, the movement of the throttle valve towards the fully opened direction is momentarily braked by the processing on step s210 and then the valve is released from braking and moved towards the fully opened position by the processing on step s220. The processing from step s100 to s220 is repeated at a cycle of 3 ms for example. Accordingly, when the EGR control or DPF control is judged complete, the braking control on step s210 and non-braking control on step s220 are repeated for the above length of time and so the throttle valve is gradually moved towards the fully opened side and reaches the fully opened position for example at time t6.

Figure 35:
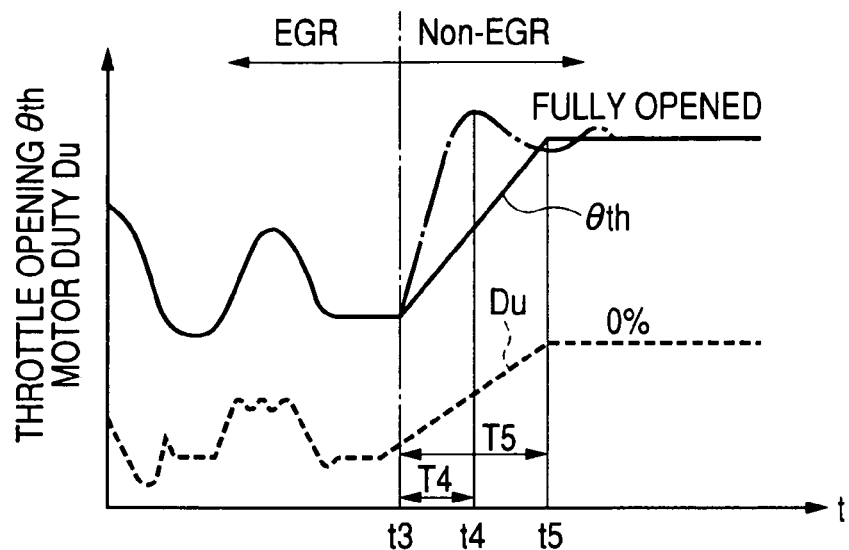
FIG. 35 is a diagram explaining the control by the controller in the electronic control throttle unit according to the first embodiment of the present invention.

The length of time T4 in the figure is the same as shown in FIG. 35, where no braking is applied to the throttle opening. In this embodiment, however, since braking is applied cyclically during the movement, the length of time from time t3 to t6 becomes longer than the time T4 and accordingly the speed of impact of the gear 8 with the fully opened position stopper 13A at the time when the throttle valve is returned to the fully opened position can be decreased and so the generation of impact sound and deterioration of life of mechanical parts due to the impact load can be prevented.

In this embodiment, as explained above, when the EGR control or DPF control is judged complete and so the throttle valve is moved towards the fully opened position, a signal is outputted from the controller of the CPU so that the regenerative braking is caused on the motor, that is, the motor drive circuit in the control unit is kept connected with the motor, and hence a braking force caused by the rotating force of the motor in the opposite direction to the return spring force that is so added as to move the valve towards the fully opened direction. Accordingly, the energy of the impact of the fully opened position stopper with the component parts of the motor drive mechanism such as gear can be decreased and so the generation of impact sound and deterioration of life of mechanical parts due to the impact load can be prevented.

Figure 38:
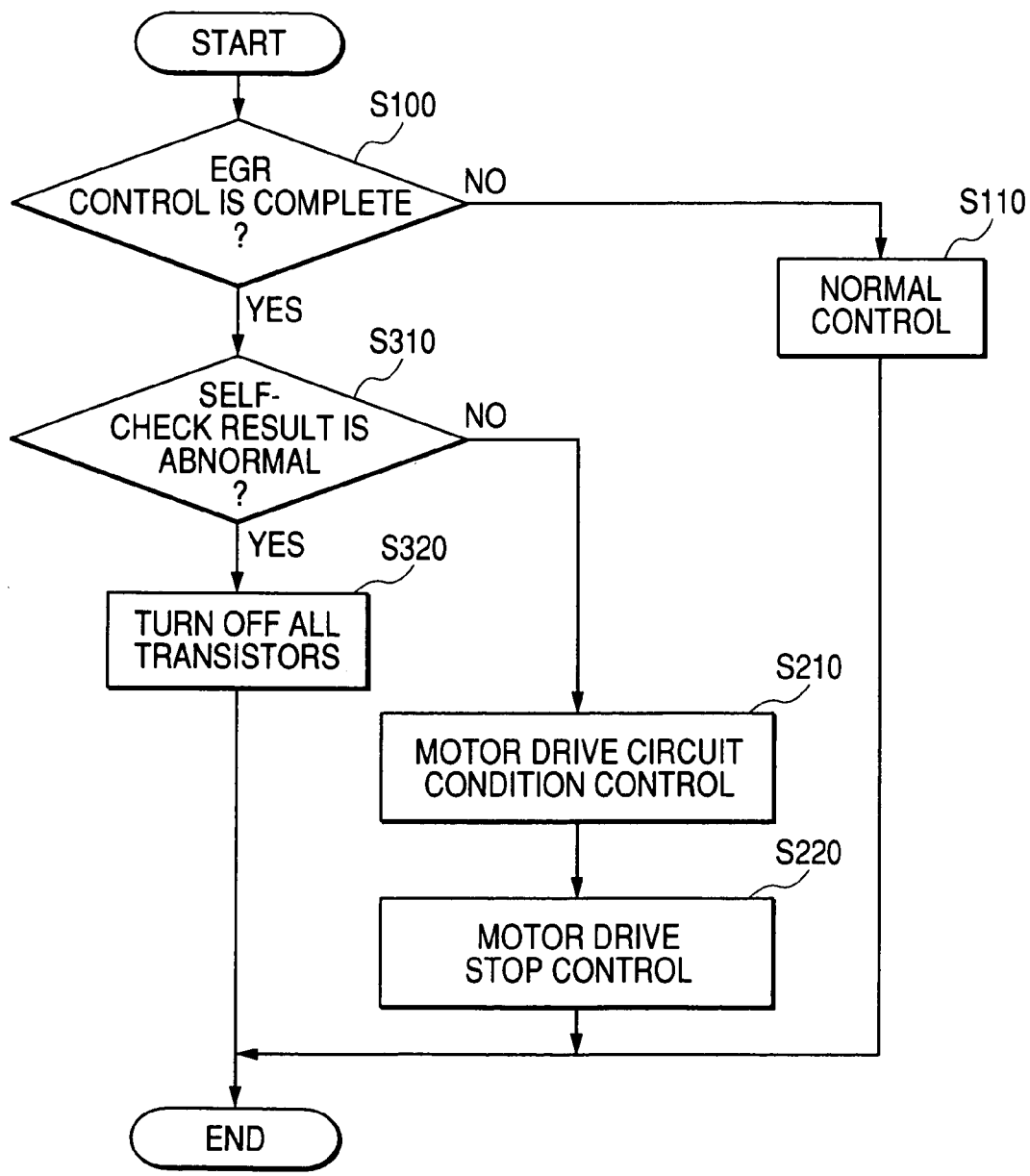
FIG. 38 is a flowchart of the control by the controller in the electronic control throttle unit according to the third embodiment of the present invention.

Next, the control by the controller 218 of the electronic control throttle unit according to the third embodiment of the present invention is described, using FIG. 38.

The system configuration of the electronic control throttle unit of this embodiment is similar to that in FIG. 21. The construction of the electronic control throttle unit of this embodiment is similar to that shown in FIG. 24 to FIG. 31. Also, the system configuration of the throttle actuator control unit (TACU) 200 of the electronic control throttle unit of this embodiment is similar to that in FIG. 32. Also, the construction of the H bridge circuit 234 used in the electronic control throttle unit of this embodiment is similar to that in FIG. 33.

FIG. 38 is a flowchart of the control by the controller of the electronic control throttle unit according to the third embodiment of the present invention. The same step number represents the same control as in FIG. 34 and FIG. 36.

In this embodiment, the processing on steps s310 and s320 is added to the processing in FIG. 36.

When the EGR control or DPF control is judged complete on step s100, step s310 checks a self-check flag. The self-check result is checked on this step and, if no failure is sensed, regenerative braking and motor drive stop control are performed on steps s210 and s220 similarly as in case the motor circuit is connected and accordingly the throttle valve contacts slowly with the fully opened position stopper.

If any failure is sensed as a result of the self-check, on step s320 the controller 218 turns off all the transistors in the H bridge circuit and accordingly the throttle valve is moved quickly towards the fully opened position as shown by the dashed line in FIG. 35.

If any failure is sensed as a result of the self-check, braking is releases as quickly as possible as explained above and accordingly abnormal behavior of the vehicle can be prevented.

Figure 39:
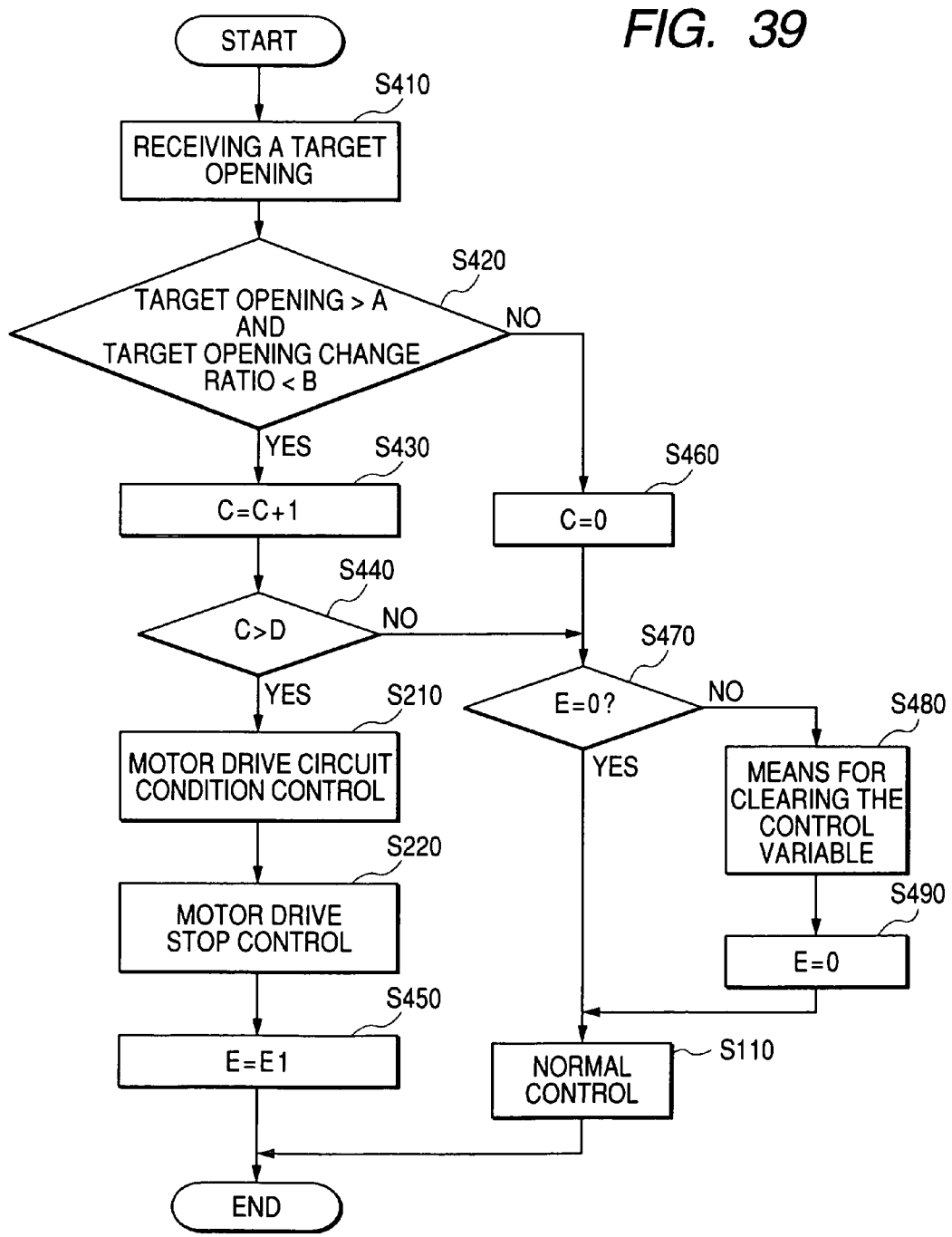
FIG. 39 is a flowchart of the control by the controller in the electronic control throttle unit according to the fourth embodiment of the present invention.
Figure 40:
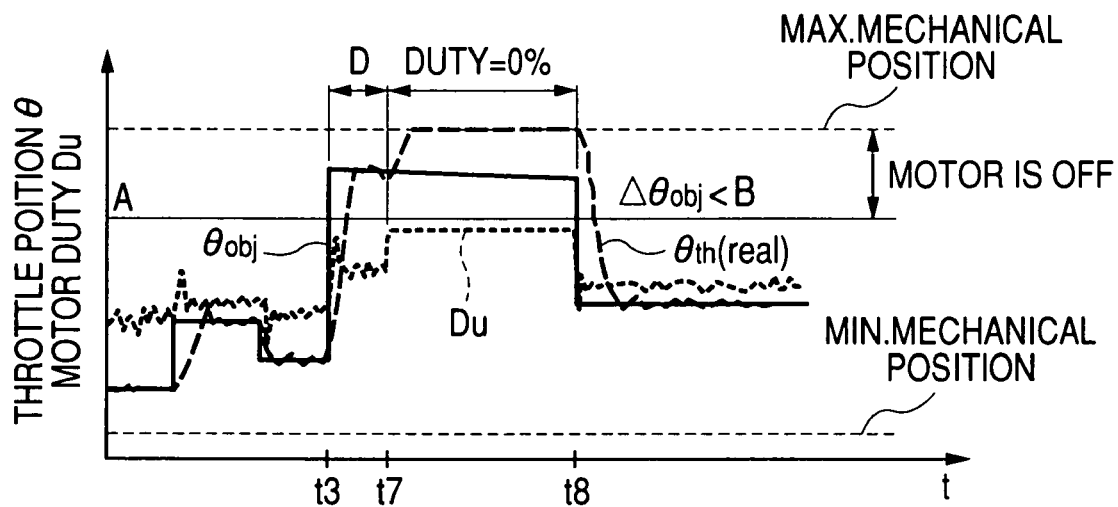
FIG. 40 is a diagram explaining the control by the controller in the electronic control throttle unit according to the fourth embodiment of the present invention.

Next, the control by the controller 218 of the electronic control throttle unit according to the fourth embodiment of the present invention is described, using FIG. 39 and FIG. 40.

The system configuration of the electronic control throttle unit of this embodiment is similar to that in FIG. 21. The construction of the electronic control throttle unit of this embodiment is similar to that shown in FIG. 24 to FIG. 31. Also, the system configuration of the throttle actuator control unit (TACU) 200 of the electronic control throttle unit of this embodiment is similar to that in FIG. 32. Also, the construction of the H bridge circuit 234 used in the electronic control throttle unit of this embodiment is similar to that in FIG. 33.

FIG. 39 is a flowchart of the control by the controller of the electronic control throttle unit according to the fourth embodiment of the present invention. FIG. 40 is a diagram explaining the control by the controller of the electronic control throttle unit according to the fourth embodiment of the present invention. The same step number represents the same control as in FIG. 34 and FIG. 36.

In FIG. 40, the horizontal axis represents time t. The vertical axis represents the throttle opening (control opening) $\theta_{th}$ and motor duty Du. The throttle opening $\theta_{th}$ closer to the origin is towards the fully closed position and farther from the origin is towards the fully opened position. Bold line represents the target opening $\theta_{obj}$ and broken like represents the real opening $\theta_{th}$ (real). The motor duty Du is shown by dotted line, where closer to the origin is towards 100% and farther from the origin is towards 0%.

On step s410, the controller 218 receives the target opening $\theta_{obj}$ outputted from the ECU 300 and uses it as the criterion for position control.

Next, on step s420, the controller judges whether the target opening $\theta_{obj}$ received on step is greater than a specified value A and also the change ratio $\Delta\theta_{obj}$ of the target opening $\theta_{obj}$ is smaller than a specified value B. The specified value A is, for example, 80% and the controller judges whether the EGR control or DPF control is complete as on step s100 in FIG. 24. The change ratio $\Delta\theta_{obj}$ of the target opening $\theta_{obj}$ is used as the criterion of judgment so that the controller can judge whether the target opening $\theta_{obj}$ is steadily greater than the specified value A excluding a case where the target opening $\theta_{obj}$ becomes greater than the specified value momentarily. The change ratio $\Delta\theta_{obj}$ is 0.25% for example. That is, when the target opening $\theta_{obj}$ is greater than the specified value (80% for example) and also the change ratio $\Delta\theta_{obj}$ of the target opening $\theta_{obj}$ is smaller than the specified value (0.25% for example), the controller judges that the EGR control or DPF control is complete and the processing proceeds to step s430. If not, the processing proceeds to step s460.

On step s460, a count C is initialized and cleared to 0. That is, the count C is 0 under normal EGR control or DPF control. On the next step s470, the controller judges whether a variable E is 0. The variable E can be either 0 or 1. When the variable E is 0, it means that the control is in operation and, when the variable E is 1, it means that the control is not in operation. When the control is in operation and so the variable E is 1, the processing proceeds to step s110 and a feedback control is performed so that the throttle opening becomes the target opening. In FIG. 40, the throttle valve opening is controlled by a normal feedback control through to time t3. Since the EGR control or DPF control has been complete by this time, any position near the fully opened position is set as the throttle valve position and the target angle control is performed according to this target opening and the opening is held for a length of time (time until C>D is met on step s440).

On the other hand, when the EGR control or DPF control is complete, "1" is added to the count C on step s430. Then, on step s440, the controller judges whether the count C has exceeded a specified value D. This judgment on step s440 is to judge whether a specified length of time has elapsed since the EGR control of DPF control was judged complete on step s430. The specified value D shall be equivalent to the length of time from t3 to t7 in FIG. 40, which is for example the length of time needed for counting 200 ms. This length of time is set longer than the time needed for the throttle valve to be moved towards the fully opened position by the force added by the return spring as shown by the dashed line in FIG. 35 (taking FIG. 35 for example, longer than the length of time T4 (150 ms for example)).

If the condition on step s440 is not met, for example, if 200 ms have not yet elapsed since the completion of the EGR control or DPF control, the controller judges whether a variable E is 0 or not. Since the control is in operation and so the variable E is "0", the processing proceeds to step s110, where a feedback control is performed so that the throttle opening coincides with the target opening. That is to say, the throttle valve opening is controlled by a normal feedback control even for the length of time from time t3 to t6 in FIG. 40.

With this control, abrasion of the sliding resistance of the throttle sensor can be reduced. In case of an electronic control throttle unit using contact type throttle sensor, if the length of time for holding a constant opening (for example, the length of time it is held at the fully opened position) is longer, the resistor may be partly abraded due to vibration. This partial abrasion may result in abnormal output from the contact type throttle position sensor. With this embodiment, however, where the control is maintained until the length of time equivalent to the specified value D has elapsed even after the EGR control or DPF control has been complete, the valve is held at a position for the length of time from time t3 to t7 and accordingly the length of time the valve is held at the mechanical fully opened position can be as short as the time from time t7 to t8. Because of this short holding time, the life of the throttle position sensor can be prolonged.

Next, if the count C is judged to have exceeded the specified value D on step s440, that is, if the elapsed time is time t7 in FIG. 40, the braking control by the regenerative braking explained in FIG. 36 and non-braking control are repeated on steps s210 and s220 and so the gear 9 contacts slowly with the fully opened position stopper 13. In this processing on steps s210 and s220, the processing on step s210 can be omitted. That is to say, since the throttle valve has been held at a specified position near the fully opened position for a specified length of time by the processing on step s110, even if power to the motor is shut off on step s220 and so the valve is moved immediately from the specified position to the fully opened position, energy of the impact of the gear 8 with the fully opened position stopper 13A is small in most cases because the distance of movement is shorter.

Then, on step s450, the control condition flag (E) is set to "1" and the loop control is ended.

In this embodiment, after time t7 by which time the valve opening is in the EGR area (after time t3) and also the length of time where the condition (C>D) is met has elapsed, braking and powering off the motor are repeated and the throttle valve condition is switched from controlled to non-controlled as explained above so that the gear 8 contacts slowly with the fully opened position stopper 13.

In order to go back to the EGR control or DPF control after the EGR control or DPF control is complete, any one of the "target opening>A", "target opening change ratio<B" or "C>D" shall be met. In this operation, since the throttle valve has already come into non-controlled condition, the control condition flag is E=1. Accordingly, based on the judgment on step s470, the processing proceeds to step s480 and the control variables are cleared.

The PID controller 214 repeats the PID calculation for obtaining the duty under the EGR control or DPF control is in operation and also under the EGR control not in operation as explained in FIG. 32. That is, the PID control variable $u(t)=(Kp \cdot \Delta\theta_{th}+Kd \cdot (d\Delta\theta_{th}/dt)+Ki \cdot \Sigma\Delta\theta_{th} \cdot dt)$ is calculated. When the motor is off, the deviation between the target opening and real opening lies more on the closing side and so a portion that functions as integration term has excessive control duty in the closing direction. Normally, in a throttle position control, braking is applied near the target opening so as to achieve better convergence. However, if a value equivalent to the integration term has excessively accumulated in the closing direction as explained above, properly braking cannot be applied but excessive overshoot may possibly be caused, resulting in poor convergence.

To solve the above, in this embodiment, the control variables are cleared to 0 on step s480. The variables to be cleared may be those concerning the integration terms or all relating to the duty to be applied. With this operation, the control performance including the response time can improve. Then, on step s490, the control condition flag is set to E=0 to go into a normal operation and the loop control is ended.

Also in this embodiment, the energy of the impact of the fully opened position stopper with the component parts of the motor drive mechanism such as gear can be decreased and so the generation of impact sound and deterioration of life of mechanical parts due to the impact load can be prevented. In addition, the length of time to hold the valve at the fully opening position can be made shorter and accordingly the life of the contact type throttle sensor can be prolonged. Furthermore, since the control variables are cleared to zero when the valve condition is switched from controlled to non-controlled, the control performance including the response time can improve.

Figure 41:
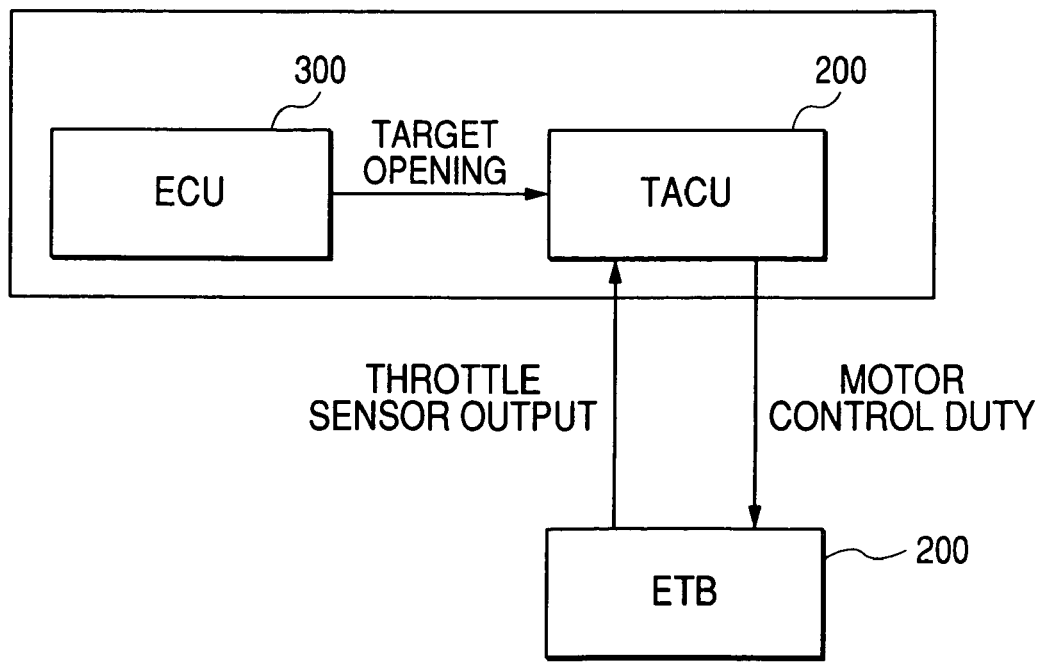
FIG. 41 is a block diagram of the electronic control throttle unit according to another embodiment of the present invention.

Next, the system configuration of the electronic control throttle unit according to another embodiment of the present invention is described, using FIG. 41.

FIG. 41 is a block diagram of the electronic control throttle unit according to another embodiment of the present invention.

Although the TACU 200 and ECU 300 are constructed separately in each embodiment above, the TACU 200 and ECU 300 can be constructed into one unit as shown in FIG. 41.

The characteristic and control of the throttle valve unit used as a throttle valve for the motor control in each embodiment above are summarized as follows:

A known electronic position control of a throttle valve is such that, as disclosed in the Japanese Application Patent Laid-Open Publication No. Hei 07-332136, a control variable according to the deviation between the real opening and target opening of the throttle valve is calculated by a method such as the PID control, the calculated control variable is converted into a duty ratio which is the ratio of the on-time pulse drive to off-time, a PWM signal is supplied to a direct-current motor via the H bridge circuit, the motor generates torque, and then the throttle valve is driven by the generated torque via gears and throttle shaft.

Although the electronic control throttle units like the above are all for gasoline engine, an electronic control throttle unit is about to be employed for diesel engine nowadays in order to improve the EGR efficiency and improve dieseling. Since the electronic control throttle unit for diesel engine, differently from that for gasoline engine, performs control mainly to improve the EGR efficiency and to burn soot in the DPF (diesel particular filter) by throttling the suction and increasing the exhaust temperature, the motor control is not in operation when the EGR control or DPF control is not in operation and so the throttle valve is positioned at the fully opened position. Accordingly, significant differences are 1) the throttle valve is held at the fully opened position for a long time, 2) there exists a condition where the motor control in operation is switched to not in operation or vise versa, and 3) a default mechanism that supplies a certain amount of air at an optional valve opening when the motor is off is not necessary because the unit has no out-of-control mode.

On the electronic control throttle unit for diesel engine, control on the air flow is no longer needed when the EGR control or DPF control is complete, and so power to the motor is shut off and the throttle valve is returned by the return spring to the fully opened position where the pressure loss becomes the minimum. That is, differently from the electronic control throttle unit for gasoline engine that continues controlling the throttle valve all the time, there always exists a condition where the control in operation is switched to not in operation or where the control not in operation is switched to start operation.

When considering a condition where the control in operation is switched to not in operation and assuming that, when the control is ceased, power to the motor is simply tuned off or the duty to be applies is set to 0% so as to move the throttle valve position towards the fully opened position only by the force added in the opening direction by the return spring, there arises a problem that the fully opened position stopper impacts heavily with the drive mechanism components and accordingly impact sound is generated and the life of mechanical parts deteriorates due to the impact load.

In order to solve the above problem, there is a known electronic control throttle unit as disclosed in the Japanese Application Patent Laid-Open Publication No. 2002-256892, wherein a cushion mechanism is installed between the fully opened position stopper and gear so as to eliminate the mechanical impact.

There is another known electronic control throttle unit as disclosed in the Japanese Application Patent Laid-Open Publication No. 2003-214196, for example, where a predetermined duty is applied to the motor for some time to move the motor slower than in a normal control and accordingly so control to avoid the impact.

With the prior art disclosed in the Japanese Application Patent Laid-Open Publication No. 2002-256892, however, there arises a problem of increased cost for the cushion mechanism, lowered effect due to the deterioration of the cushion mechanism and lowered reliability due to the increase in the number of parts.

With the prior art disclosed in the Japanese Application Patent Laid-Open Publication No. 2003-214196, where a predetermined duty is applied to the motor for some time, it is possible that control for driving the motor is continued even after the throttle valve has returned to the fully opened position because dispersion of response time varying from product to product cannot be completely covered by the control, and accordingly there arises a problem that the motor may be damaged due to over-current and mechanical parts may be subjected to overload resulting from the damage and may also be damaged.

The embodiment of the present invention offers an electronic control throttle unit with which the above problems are solved, reliability improves, no damage is given to the motor or mechanical parts, and sound and energy of the impact with mechanical parts can be decreased.

According to this embodiment:

(1) In order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the throttle actuator control unit is equipped with a controller that controls the actuator so that, when the EGR control or DPF control is complete, the throttle valve is moved towards the fully opened direction taking longer time than when the throttle valve is moved towards the fully opened direction simply by the return spring.

With the above construction, reliability improves, no damage is given to the motor or mechanical parts, and sound and energy of the impact with mechanical parts can be decreased.

(2) In (1) above, it is preferable that the controller performs an open-loop control by outputting to the actuator a control signal that can be used as a target angle for the throttle valve to be moved gradually towards the fully opened direction.

(3) In (2) above, it is preferable that the controller gradually decreases the duty in the duty signal to be outputted to the actuator.

(4) In (1) above, it is preferable that, when the EGR control or DPF control is complete, the controller repeats setting the actuator to a controlled condition and non-controlled condition.

(5) In (4) above, it is preferable that, in the controlled condition, the controller operates the actuator as a brake.

(6) In (4) above, it is preferable that, in the controlled condition, the controller controls the actuator to cause regenerative braking.

(7) In (4) above, it is preferable that, in the non-controlled condition, the controller shuts off power to the actuator.

(8) In (7) above, it is preferable that the controller sets the duty in the duty signal to be outputted to the actuator to 0%.

(9) In (4) above, it is preferable that, if the self-check of the throttle position sensor results in a failure, the controller shuts off power to the actuator.

(10) In (4) above, it is preferable that the controller first controls the throttle valve opening so that it is held near the fully opened position for a specified length of time after the EGR control or DPF control is judged complete and then repeats setting the actuator in the controlled condition and non-controlled condition.

(11) In (1) above, it is preferable that, after the EGR control or DPF control is judged complete, the controller controls the throttle valve opening so that it is held near the fully opened position for a specified length of time and then sets the actuator to a non-controlled condition.

(12) In (11) above, it is preferable that, after the EGR control or DPF control is judged complete, the controller controls the throttle valve opening so that it is held near the fully opened position for a specified length of time and then repeats setting the actuator to a controlled condition and to the non-controlled condition.

(13) In (11) above, it is preferable that the controller judges the EGR control or DPF control is complete if such a condition continues longer than a specified length of time that the target opening of the throttle valve exceeds a specified target opening, and also the change of the target opening is less than a specified change of the opening, and also the target opening is less than a specified opening and the change is less than a specified change of the opening.

(14) In (12) above, it is preferable that, after the EGR control or DPF control is judged complete, the controller starts controlling the actuator if at least any one of the above three conditions is not met.

(15) In (13) above, it is preferable that, when the controller starts controlling the actuator, the controller first initializes the value in a calculator of the actuator drive duty to be applied to the actuator and then starts control.

(16) In (15) above, it is preferable that, in initializing the value in a calculator of the actuator drive duty to be applied to the actuator, the controller initializes at least the integration terms or variables equivalent to them.

(17) In (a) above, it is preferable that the electronic throttle body is equipped with the first gear fixed on the output shaft of the actuator, second gear fixed on the throttle shaft that supports the throttle valve, and intermediate gear that transmits drive force from the first gear to the second gear, and further equipped with washer made of abrasion resisting material mounted between the intermediate gear and throttle body that supports the intermediate gear.

(18) In addition, in order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the throttle actuator control unit is equipped with a controller that performs an open-loop control by outputting to the actuator a control signal that can be used as a target angle for the throttle valve to be moved gradually towards the fully opened direction so that the throttle valve is moved towards the fully opened direction when the EGR control or DPF control is complete, taking longer time than when the throttle valve is moved towards the fully opened direction simply by the return spring.

With the above construction, reliability improves, no damage is given to the motor or mechanical parts, and sound and energy of the impact with mechanical parts can be decreased.

(19) In addition, in order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the throttle actuator control unit is equipped with a controller that repeats setting the actuator to a controlled condition and non-controlled condition after the EGR control of DPF control is complete so that the throttle valve is moved towards the fully opened direction when the EGR control or DPF control is complete, taking longer time than when the throttle valve is moved towards the fully opened direction simply by the return spring.

With the above construction, reliability improves, no damage is given to the motor or mechanical parts, and sound and energy of the impact with mechanical parts can be decreased.

(20) In addition, in order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the throttle actuator control unit is equipped with a controller that first controls the throttle valve opening so that it is held near the fully opened position for a specified length of time after the EGR control or DPF control is judged complete and then repeats setting the actuator to the controlled condition and non-controlled condition so that the throttle valve is moved towards the fully opened direction when the EGR control or DPF control is complete, taking longer time than when the throttle valve is moved towards the fully opened direction simply by the return spring.

With the above construction, reliability improves, no damage is given to the motor or mechanical parts, and sound and energy of the impact with mechanical parts can be decreased.

(21) In addition, in order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the throttle actuator control unit is equipped with a controller that first controls the throttle valve opening so that it is held near the fully opened position for a specified length of time after the EGR control or DPF control is judged complete and then sets the actuator to a non-controlled condition so that the throttle valve is moved towards the fully opened direction when the EGR control or DPF control is complete, taking longer time than when the throttle valve is moved towards the fully opened direction simply by the return spring.

With the above construction, reliability improves, no damage is given to the motor or mechanical parts, and sound and energy of the impact with mechanical parts can be decreased.

(22) In addition, in order to achieve the above object, there is provided an electronic control throttle unit equipped with an electronic throttle body comprising an actuator that drives a throttle valve supported by a throttle body to be able to rotate, single return spring that adds a force so that the throttle valve returns in the fully opened direction, and throttle position sensor that senses the opening of the throttle body, and with a throttle actuator control unit that drives the actuator according to the throttle valve opening sensed by the throttle position sensor and target opening; wherein the electronic throttle body is equipped with the first gear fixed on the output shaft of the actuator, second gear fixed on the throttle shaft that supports the throttle valve, and intermediate gear that transmits drive force from the first gear to the second gear, and further equipped with washer made of abrasion resisting material mounted between the intermediate gear and throttle body that supports the intermediate gear.

An EGR gas control system to which the present invention applied is described hereunder.

FIG. 10 shows the construction of an embodiment of an exhaust gas recirculation system of an internal combustion engine to which the present invention applies.

Dust in the air to be sucked into the engine is removed by an air cleaner 41, and a suction flow G1 is sensed by a suction flow sensor 42. The signal of the sensed suction flow G1 is inputted into the engine control unit (ECU) 421 and exhaust gas recirculation controller (EGRCONT) 420. The suction air pressurized by a compressor 43 of turbo charger flows through a suction pipe 44 and the flow or pressure is controlled by a suction flow control valve 5. The suction air further flows into a suction manifold 6 and then distributed to each cylinder of the engine 47.

The opening of the suction flow control valve 45 is controlled according to a suction flow control signal CTH outputted from the exhaust gas recirculation controller 420. The suction flow control valve 45 is, for example, a motor-driven butterfly type valve, and an opening signal of the butterfly valve is sensed and inputted into the exhaust gas recirculation controller 420 as an opening signal $\theta_{TH}$.

Fuel for combustion is supplied into the cylinders of the engine 47 from a fuel injection valve 419 installed on the engine 47. Fuel supply to the fuel injection valve 419 is done by a fuel pump 17 via a fuel pipe 418. The injection volume from the fuel injection valve 419 is controlled by the ECU 421, that is, the ECU 421 outputs a fuel injection volume signal FINJ to the fuel injection valve 419.

Exhaust gas after the combustion in the engine is collected into an exhaust manifold 48 and, after passing through a turbine 49 of the turbo charger, exhausted into air via a catalyst 410 and exhaust pipe 411. The exhaust manifold 48 has a branch 412, where part of the exhaust gas from the engine is branched. The branched exhaust gas is then directed into a recirculation pipe 413a as the recirculation gas. A recirculation gas cooler 414 is installed on the recirculation pipe 413a. The recirculation gas cooled down by the recirculation gas cooler 414 is then recirculated into the suction manifold 46 via a recirculation pipe 413b and recirculation gas control valve 416.

The opening of the recirculation control valve 416 is controlled according to an opening control signal CEG of the recirculation gas control valve 416 outputted from the exhaust gas recirculation controller 420. The recirculation control valve 416 is for example a seat type valve, and a stroke of the seat valve is sensed and inputted into the exhaust gas recirculation controller 420 as a stroke signal STEG. If, for example, a butterfly type valve is used as the recirculation gas control valve 416, an opening signal of the butterfly valve is inputted into the exhaust gas recirculation controller 420.

A recirculation gas flow sensor 415 is installed on the recirculation pipe 413b to measure the recirculation gas flow G2 inside the recirculation pipe. The measured recirculation gas flow G2 is inputted into the exhaust gas recirculation controller 420. In this construction, the exhaust gas cooler 414 is installed to cool down the exhaust gas temperature, but it can be omitted.

Not only a rotation speed signal NE of the engine 7 and suction flow signal G1 from the suction flow sensor 2 but other signals (not shown in the figure) showing the condition of the engine and vehicle are also inputted into the ECU 421. The ECU 21 runs calculations based on these signals and sends a control command value to each device. The ECU 421 judges the operating condition of the engine 7 based on signals including the rotation speed signal NE of the engine 47 and suction flow signal G1. The ECU 421 outputs a recirculation gas recirculation ratio command value RSET to the exhaust gas recirculation controller 420.

The exhaust gas recirculation controller 420 calculates the exhaust gas recirculation ratio R from the suction flow T1 and recirculation gas flow G2. The opening of the suction flow control valve 45 and/or recirculation gas control valve 16 is controlled by a feedback control so that the obtained recirculation ratio R coincides with the recirculation gas recirculation ratio command value RSET. That is, it is a characteristic of this embodiment that not only the recirculation gas control valve 416 but also the suction flow control valve 45 is controlled so that the recirculation volume of the exhaust gas coincides with the target value.

Figure 11:
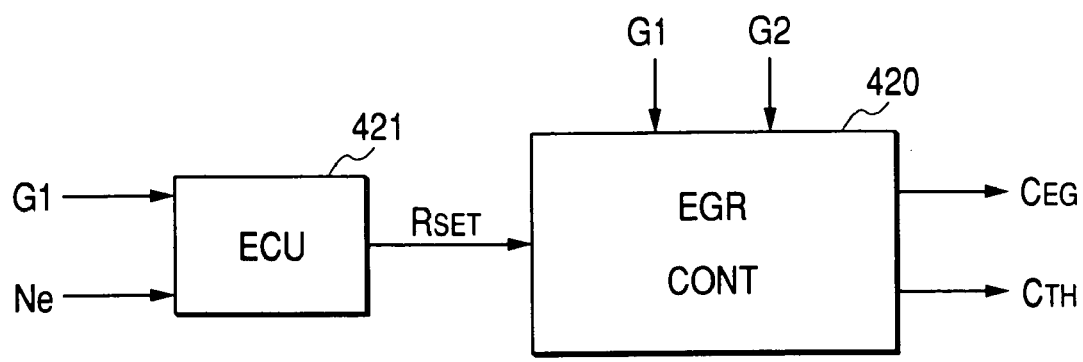
FIG. 11 is a block diagram of the control system of the exhaust gas recirculation system of an internal combustion engine to which the present invention applies.
Figure 12:
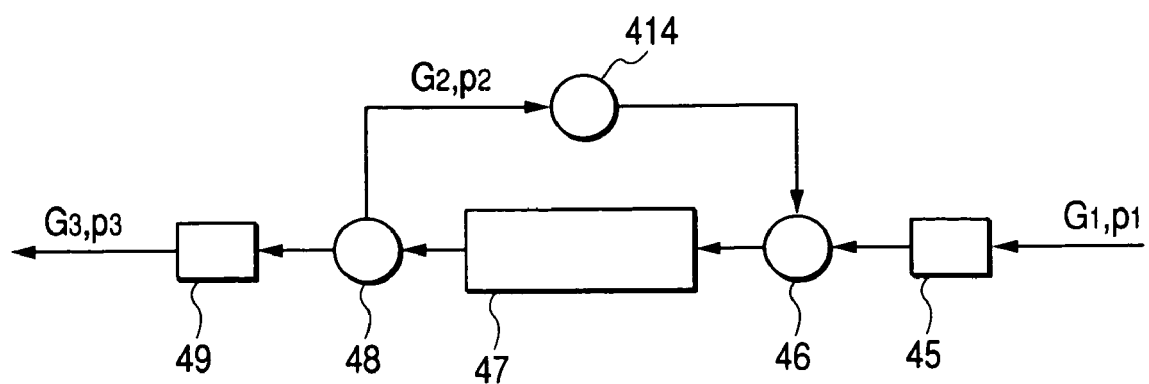
FIG. 12 is a flowchart of the control of the exhaust gas recirculation controller in the exhaust gas recirculation system of an internal combustion engine to which the present invention applies.

Next, the control of the exhaust gas recirculation controller in the exhaust gas recirculation system of this embodiment of an internal combustion engine is described, using FIG. 11 and FIG. 12.

FIG. 11 is a block diagram of the control system of the exhaust gas recirculation system of an internal combustion engine to which the present invention applies. FIG. 12 is a flowchart showing the control of the exhaust gas recirculation controller in the exhaust gas recirculation system of an internal combustion engine to which the present invention applies. The same symbol represents the same part or component as in FIG. 10.

As shown in FIG. 11, the recirculation gas recirculation ratio command value RSET outputted from the ECU 421, suction flow signal G1 sensed by the suction flow sensor 42, and recirculation gas flow G2 sensed by the recirculation gas flow sensor 415 are inputted into the exhaust gas recirculation controller 420. The exhaust gas recirculation controller 420 outputs an opening control signal CEG to the recirculation gas control valve 416 and a suction flow control signal CTH to the suction flow control valve 5 and controls these valves 416 and 45 so that the recirculation ratio R of the exhaust gas coincides with the target value RSET. The exhaust gas recirculation controller 420 calculates the exhaust gas recirculation ratio R from the suction flow signal G1 and recirculation gas flow G2 by a formula (G2/(G1+G2)).

In the description below, it is assumed that the response of the suction flow control valve 45 is faster than that of the recirculation gas control valve 416. To be concrete, provided that the suction flow control valve 45 is a butterfly valve having a bore of 50 mm and the recirculation gas control valve 416 is a seat valve having a seat diameter of 30 mm, the response of the suction flow control valve 45 is faster than that of the recirculation gas control valve 416.

Next, the control of the exhaust gas recirculation controller is described, using FIG. 12. The controls described below are all performed by the exhaust gas recirculation controller 420.

On step s500 in FIG. 12, the exhaust gas recirculation controller 420 calculates the exhaust gas recirculation ratio R from the suction flow signal G1 and recirculation gas flow G2 by a formula (G2/(G1+G2)).

Next, on step s510, the controller judges whether a variation ΔRSET in the target value RSET of the exhaust gas recirculation ratio R inputted from the ECU 421 is greater than a predetermined reference value ΔR0. If the variation ΔRSET is greater than the reference value ΔR0, the processing proceeds to step s520 and, if not, to step s550. That is, step s510 judges whether the target value RSET of the exhaust gas recirculation ratio R has significantly changed or not. When the operating condition of the internal combustion engine has temporarily varied, whether it becomes necessary to quickly change the exhaust gas recirculation ratio so as to decrease toxic material content in the exhaust gas is judged here.

If the variation ΔRSET is greater than the reference value ΔR0, that is, if it becomes necessary to quickly change the exhaust gas recirculation ratio, the controller judges whether the exhaust gas recirculation ratio R calculated on step s510 is equal to the target value RSET of the exhaust gas recirculation ratio R on step s520.

If the recirculation ratio R is greater than the target value RSET, on step s530, the controller decreases the opening control signal CTH to be outputted to the suction flow control valve 45 so as to narrow the opening of the suction flow control valve 5. And then, the processing returns to step s520 and the above processing is repeated until the recirculation ratio R becomes equal to the target value RSET.

On the other hand, if the recirculation ratio R is smaller than the target value RSET, on step s540, the controller increases the opening control signal CTH to be outputted to the suction flow control valve 45 so as to widen the opening of the suction flow control valve 45. And then, the processing returns to step s520 and the above processing is repeated until the recirculation ratio R becomes equal to the target value RSET.

A feedback control is performed by repeating the processing of steps s520, s530 and s540 as explained above until the recirculation ratio R becomes equal to the target value RSET. In this operation, since the response of the suction flow control valve 5 is assumed to be faster than that of the recirculation gas control valve 416, the exhaust gas recirculation ratio can be changed quickly to a specified target value even if quick change of the exhaust gas recirculation ratio is needed.

On the other hand, if the variation ΔRSET is judged less than the reference value ΔR0 on step s510, that is, if the change in the exhaust gas recirculation ratio is not so big, the controller judges whether the exhaust gas recirculation ratio R calculated on step s510 is equal to the target value RSET of the exhaust gas recirculation ratio R on step s550.

If the recirculation ratio R is greater than the target value RSET, on step s560, the controller decreases the opening control signal CEG to be outputted to the recirculation gas control valve 416 so as to narrow the opening of the recirculation gas control valve 416. And then, the processing returns to step s550 and the above processing is repeated until the recirculation ratio R becomes equal to the target value RSET.

On the other hand, if the recirculation ratio R is smaller than the target value RSET, on step s570, the controller increases the opening control signal CEG to be outputted to the recirculation gas control valve 416 so as to widen the opening of the recirculation gas control valve 416. And then, the processing returns to step s550 and the above processing is repeated until the recirculation ratio R becomes equal to the target value RSET.

A feedback control is performed by repeating the processing of steps s550, s560 and s570 as explained above until the recirculation ratio R becomes equal to the target value RSET. In this operation, since the response of the recirculation gas control valve 416 is slower than that of the suction flow control valve 45, much more sensitive opening control is available and so the exhaust gas recirculation ratio can be changed to a specified target value accurately.

In the description above, it is assumed that the response of the suction flow control valve 45 is faster than that of the recirculation gas control valve 416 but there may be a case where the response of the recirculation gas control valve 416 is faster than that of the suction flow control valve 45. To be concrete, provided that the suction flow control valve 45 is a butterfly valve having a bore of 30 mm and the recirculation gas control valve 416 is a seat valve having a seat diameter of 50 mm, the response of the recirculation gas control valve 416 becomes faster than that of the suction flow control valve 45. In a case like the above, the recirculation gas control valve 416 having faster response shall be controlled if quick change of the exhaust gas recirculation ratio is needed and, if no quick change is needed, the suction flow control valve 45 having slower response shall be controlled to improve the control accuracy.

As explained above, if quick change of the exhaust gas recirculation ratio is needed, controlling a control valve having faster response enables to cope with the quick change. If no quick change is needed, controlling a control valve having slower response enables to improve the control accuracy.

The relationship between the response of the suction flow control valve 45 and that of the recirculation gas control valve 416 as explained above in connection with the need for quick change of the exhaust gas recirculation ratio applies to the constructions where the recirculation gas control valve 416 is a butterfly valve as in a previous embodiment or it is installed inside the suction passage as in a previous embodiment.

Figure 13:
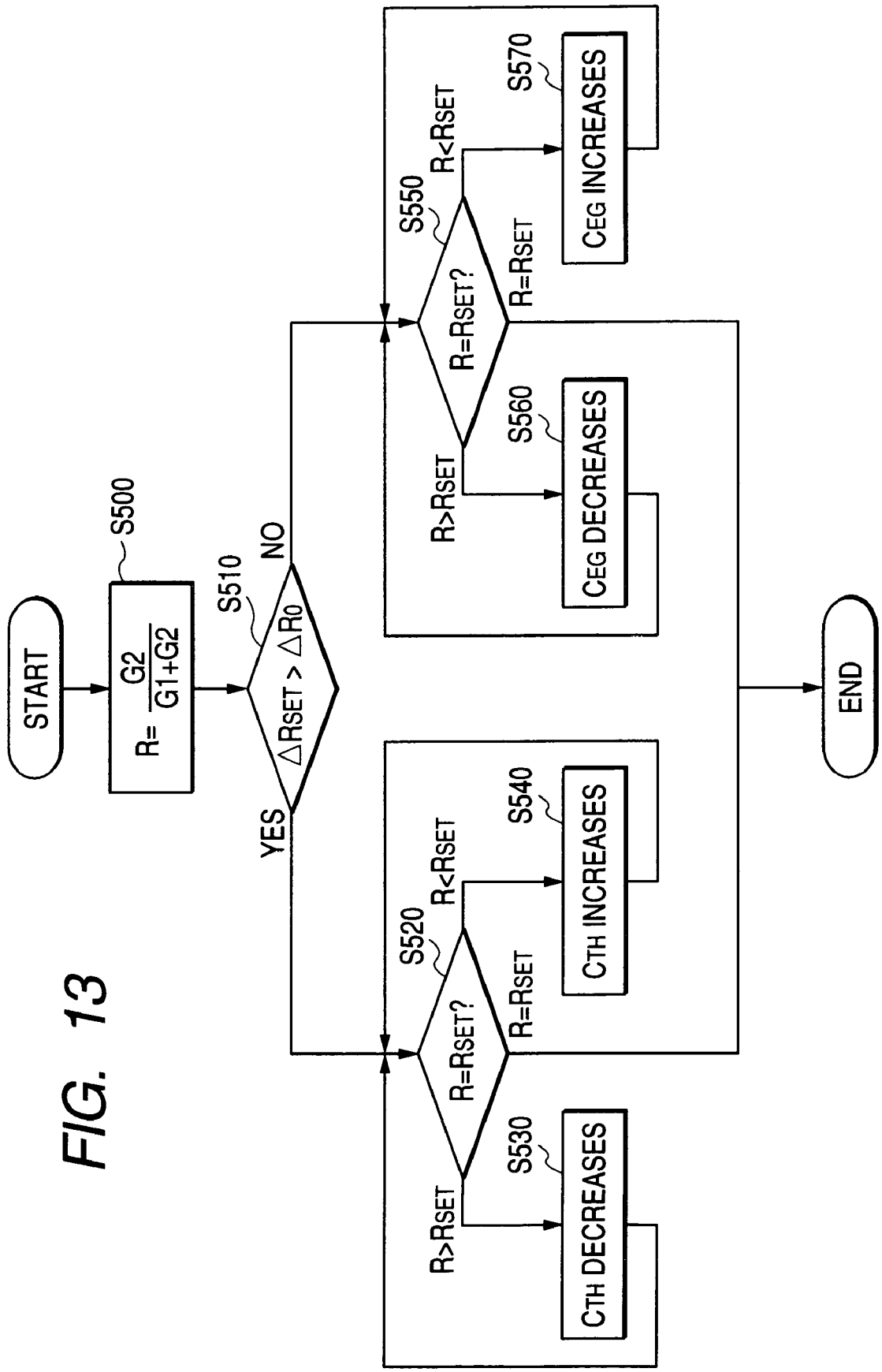
FIG. 13 is a model covering from the suction flow control valve on the suction side of the engine to the turbine of the turbo charger on the exhaust side in the exhaust gas recirculation system of an internal combustion engine to which the present invention applies.

Next, the feedback control by the exhaust gas recirculation controller in the exhaust gas recirculation system of this embodiment of an internal combustion engine is described, using FIG. 13.

FIG. 13 shows a model covering from the suction flow control valve 45 on the suction side of the engine 7 to the turbine 49 of the turbo charger on the exhaust side in the exhaust gas recirculation system of an internal combustion engine according to an embodiment of the present invention. The same symbol represents the same part or component as in FIG. 10.

In FIG. 13, when the flow and pressure through the suction flow control valve is defined as G1 and p1, the flow and pressure through the turbine 9 of the turbo charger is defined as G3 and p3, and the flow and pressure through the recirculation pipe 413*a* of the recirculation gas control valve 416, located on the exhaust side of the engine 47 viewing from the engine 7, is defined as G2 and p2, respectively, relationship in this system can be expressed by a simultaneous equation comprising expressions (1), (2) and (3) below.

$$G1+G2=G3=f3(ne, \eta v, p2) \quad (1)$$

$$G1=f1(p1, p2, \zeta) \quad (2)$$

$$G2=f2(p2, p3, \zeta') \quad (3)$$

where:

ne: engine speed, η: volumetric efficiency of the engine, v: displacement of the engine, p1: suction pressure, p2: back pressure of the engine, p3: back pressure of the turbine of the turbo charger, ζ: loss factor of the suction flow control valve, ζ': loss factor of the recirculation gas control valve, f1: flow characteristic of the suction flow control valve, f2: flow characteristic of the recirculation gas control valve.

On the other hand, the recirculation gas recirculation ratio R is defined as R=G2/(G1+G2) as explained above. That is, if the flow G1 through the suction flow control valve 5 and flow G2 through the recirculation gas control valve are defined, this ratio is determined univocally.

As expressed by the expression (2), the flow G1 through the suction flow control valve 5 can be controlled using the loss factor ζ, that is, opening of the suction flow control valve 45. Similarly, as expressed by the expression (3), the flow through the recirculation gas control valve 416 can be controlled using the loss factor ζ', that is, opening of the recirculation gas control valve 416. In short, combining a feedback system with the command system of the valve openings of the suction flow control valve 45 and recirculation gas control valve 416 based on the flow G1 and G2 enables to control the recirculation gas recirculation ratio R.

In addition, if the flow characteristics of the suction flow control valve 45 and recirculation gas control valve 416 are known in advance, control speed can improve. That is, for example, be aware of a flow change per unit time in case the suction flow control valve 45 is operated to change the suction flow and a flow change per unit time in case the recirculation gas control valve 416 is operated to change the suction flow in advance. Then, if the flow change per unit time in case the suction flow control valve 45 is operated to change the suction flow is faster than the flow change per unit time in case the recirculation gas control valve 416 is operated to change the suction flow, that is, if the response of the suction flow control valve 45 is faster than that of the recirculation gas control valve 416, controlling the suction flow control valve 45 enables to change the exhaust gas recirculation ratio quickly to a specified target value when quick change of the exhaust gas recirculation ratio is needed, and accordingly the control speed improves.

Figure 14:
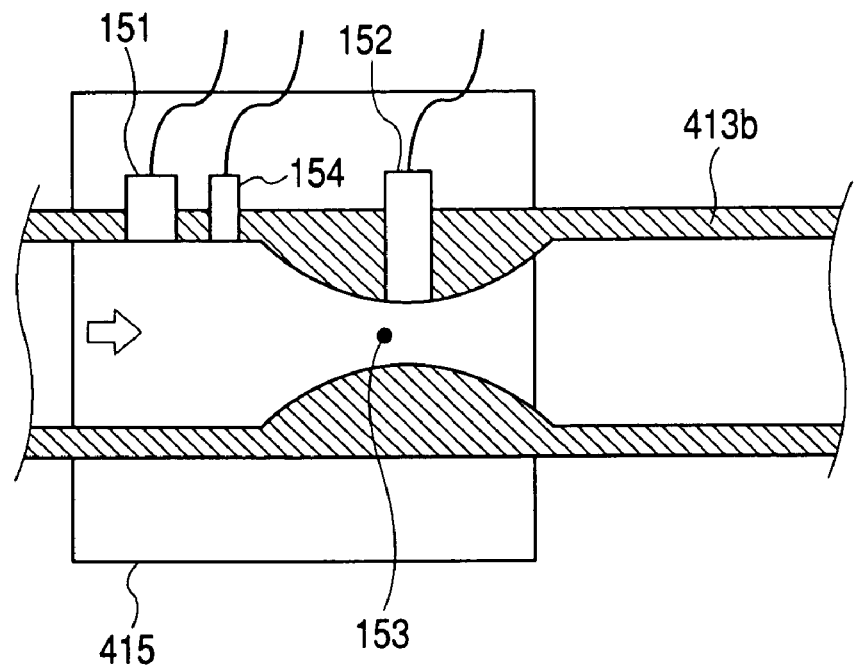
FIG. 14 is a partial cross-sectional view of the first construction of the recirculation gas flow sensor used in the exhaust gas recirculation system of an internal combustion engine to which the present invention applies.
Figure 15:
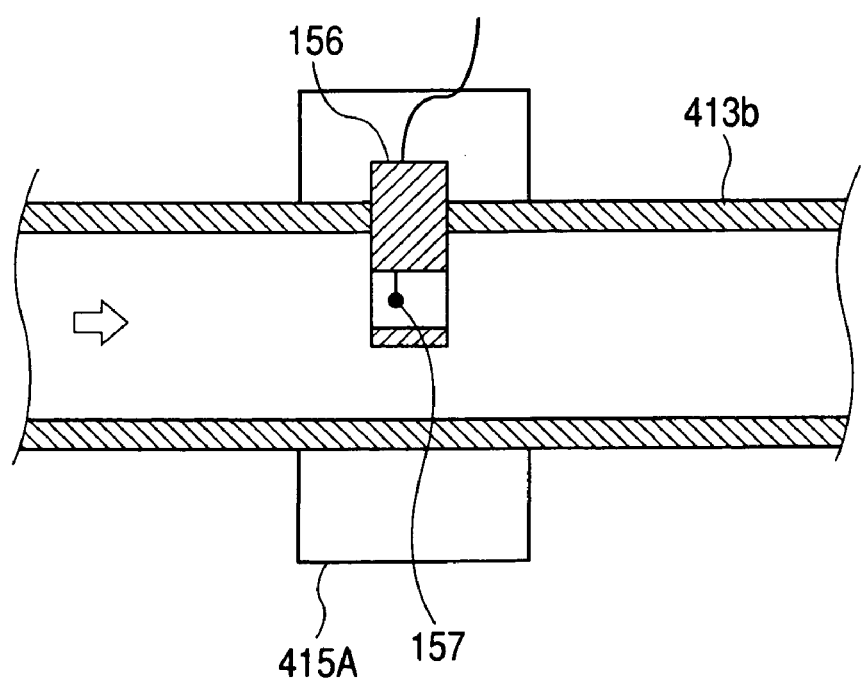
FIG. 15 is a partial cross-sectional view showing the second construction of the recirculation gas flow sensor used in the exhaust gas recirculation system of an internal combustion engine to which the present invention applies.

Next, the construction of the recirculation gas flow sensor 415 used in the exhaust gas recirculation system of this embodiment of an internal combustion engine is described, using FIG. 14 and FIG. 15.

FIG. 14 is a partial cross-sectional view showing the first construction of the recirculation gas flow sensor used in the exhaust gas recirculation system of an internal combustion engine to which the present invention applies. FIG. 15 is a partial cross-sectional view showing the second construction of the recirculation gas flow sensor used in the exhaust gas recirculation system of an internal combustion engine to which the present invention applies.

The recirculation gas flow sensor 415 shown in FIG. 14 measures the recirculation gas flow based on the pressure inside the recirculation pipe. A throat is formed on part of the inside wall of the recirculation pipe 13*b*. A low-pressure side pressure sensor 152 is so installed that the probe is made open at the throat 153. A high-pressure side pressure sensor 151 is so installed that the probe is made open at a position of the recirculation pipe 413*b* where throat 153 is not formed. The inside pressure of the recirculation pipe 413*b* is measured by the low-pressure side pressure sensor 152 and high-pressure side pressure sensor 151. Since the low-pressure side pressure sensor 152 is installed at the throat 153, a ventury effect based on the Bernoulli's theorem can be employed. The exhaust gas recirculation controller 420 can sense the recirculation gas flow G2 inside the recirculation pipe 413*b* from the pressure difference between the two pressure sensors 151 and 152. In addition, there is provided a temperature sensor 154 for sensing the recirculation gas temperature inside the recirculation pipe 413*b*. The exhaust gas recirculation controller 420 corrects the recirculation gas flow G2 obtained from the pressure difference between the pressure sensors 151 and 152, using the recirculation gas temperature sensed by the temperature sensor 4154. It is permissible that the recirculation gas flow sensor 415 contains inside a circuit element for obtaining the recirculation gas flow G2 from the pressure difference between the sensors 151 and 152 and then correcting it using the recirculation gas temperature sensed by the temperature sensor 154 and that the recirculation gas flow sensor 15 itself outputs a sensor signal of the recirculation gas flow G2 to the exhaust gas recirculation controller 420.

The recirculation gas flow sensor 415A shown in FIG. 15 measures the recirculation gas flow by a hot-wire type sensor. A recirculation gas flow sensor 416 is installed on the wall of the recirculation pipe 413b. The recirculation gas flow sensor 416 has a sensing element 157 for sensing the recirculation gas flow inside the recirculation pipe 413B. Current is applied to the sensing element 157 so that it is heated to a constant temperature. Heating value removed from the sensing element varies in accordance with the recirculation gas flow. If a control is performed so that the temperature of the sensing element 157 remains constant, then the current through the sensing element 157 turns to be a signal representing the recirculation gas flow. Since a hot-wire type sensor is employed in the above method, the mass flow, i.e. G2 can be measured directly.

The above has explained the construction of the recirculation gas flow sensor 415. For the suction flow sensor 2, either a sensor type for sensing the pressure as shown in FIG. 14 or a hot-wire type as shown in FIG. 15 can be employed.

Figure 16:
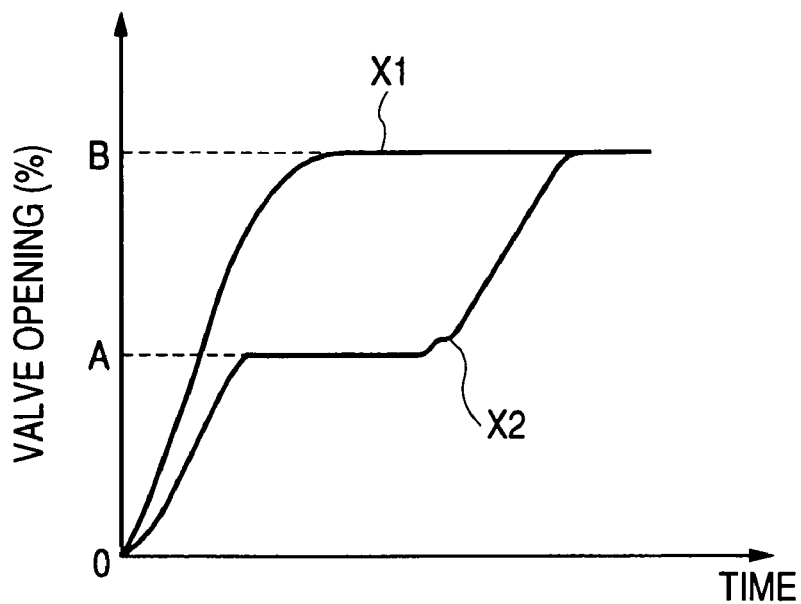
FIG. 16 is a chart showing the characteristic of different drive method of the suction flow control valve used in the exhaust gas recirculation system of an internal combustion engine to which the present invention applies.
Figure 17:
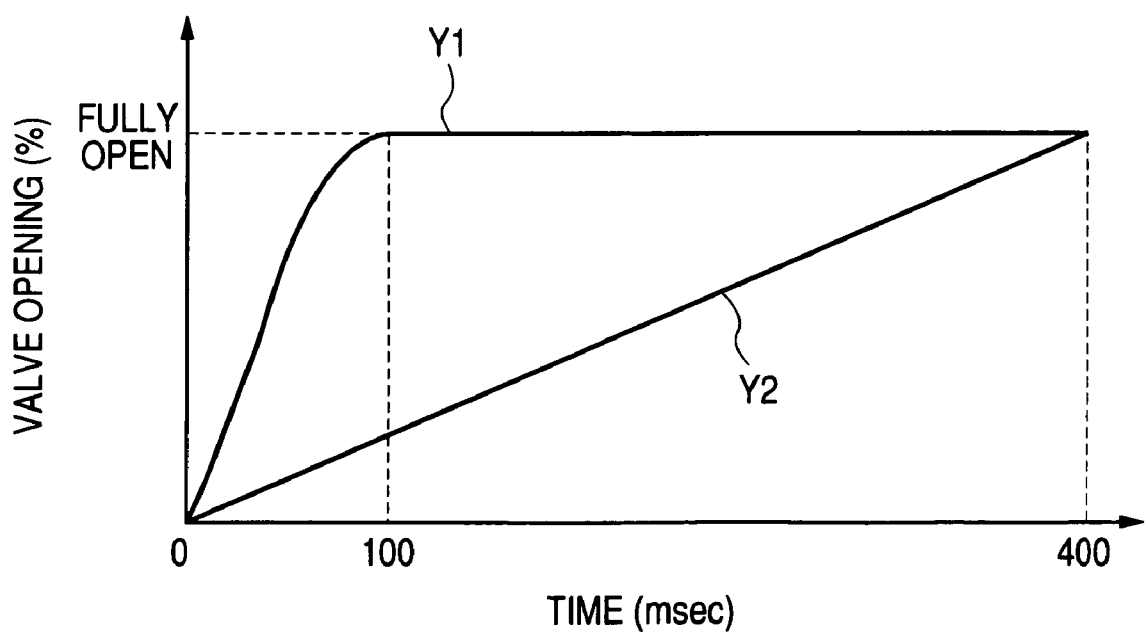
FIG. 17 is a chart showing the characteristic of different drive method of the suction flow control valve used in the exhaust gas recirculation system of an internal combustion engine to which the present invention applies.

Next, the characteristic of the suction flow control valve 45 used in the exhaust gas recirculation system of this embodiment of an internal combustion engine is described, using FIG. 16 and FIG. 17.

FIG. 16 and FIG. 17 shows the characteristic of different drive method of the suction flow control valve used in the exhaust gas recirculation system of an internal combustion engine according to an embodiment of the present invention. In FIG. 16 and FIG. 17, the horizontal axis represents the time and vertical axis represents the opening of the suction flow control valve. The valve opening on the vertical axis is shown in percentage, where the maximum opening is 100%.

In FIG. 16, bold line X1 shows the characteristic of the valve opening in case an electronic control type throttle actuator is employed as the suction flow control valve 45. Bold line X2 shows the characteristic of the valve opening in case a negative-pressure type throttle actuator is employed as the suction flow control valve 45.

Because no more than two openings, i.e. the valve opening A and fully opened position B can be controlled with the negative-pressure type throttle actuator shown by the bold line X2, it is difficult to control the recirculation gas recirculation ratio by the afore-mentioned feedback control.

On the other hand, when the electronic control type throttle actuator shown by the bold line X1 is employed, the valve opening can be controlled steplessly from the opening 0 to the fully opened position B and accordingly a feedback control can be realized easily. For this reason, it is suitable to employ an electronic control type throttle actuator as the suction flow control valve 45 used in this embodiment.

Next, FIG. 17 shows the characteristic of different drive method of an electronic control type throttle actuator. Bold line Y1 represents the response of a throttle actuator in which the throttle valve is driven by a direct-current motor. Bold line Y2 represents the response of a throttle actuator in which the throttle valve is driven by a step motor.

Since step motor rotates in accordance with the drive pulse, it can be controlled by an open-loop control. As shown by the bold line Y2, however, the response speed is slower than that of direct-current motor. Generally, the speed of step motor cannot be made faster because of a limitation such as for avoiding an out-of-step operation, and pursuing for higher speed results in larger size of the step motor and consequently higher cost.

On the other hand, a high-speed type small direct-current motor is available. In addition, with the aid of a feedback control of the position, it is very much suitable as a small and high-speed drive source.

In view of the control resolution, the control resolution of a step motor is nothing but the drive step itself, which opposes to the need of higher speed. On the other hand, that of a direct-current motor depends upon the resolution of the position sensor used for the feedback control and so, if a continuous output type sensor like potentiometer is employed, a feedback system having high resolution can easily be constructed.

Accordingly, a direct-current motor is suitable as a drive source of an electronic control type throttle actuator. In case a brushless motor is employed, a similar result as for the direct-current motor is found.

As explained above, according to this embodiment, even if quick change of the exhaust gas recirculation ratio is needed, controlling a control valve having faster response enables to cope with the quick change. On the other hand, if no quick change is needed, controlling a control valve having slower response enables to improve the control accuracy.

Figure 18:
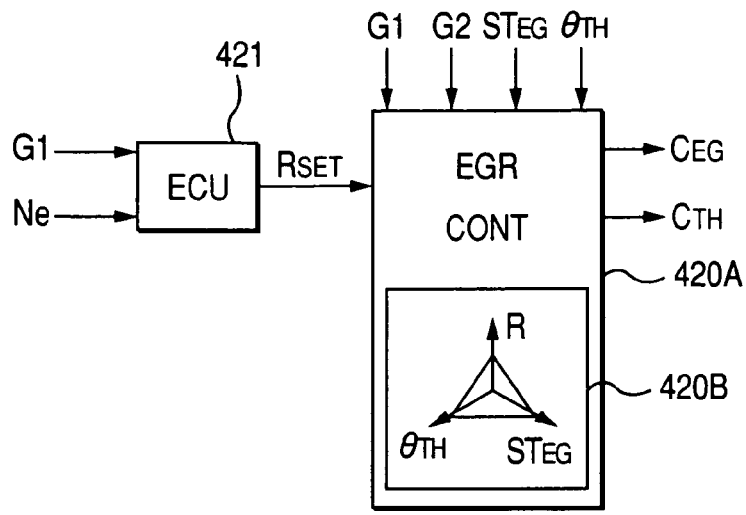
FIG. 18 is a block diagram of the control system of the exhaust gas recirculation system of an internal combustion engine according to another embodiment to which the present invention applies.
Figure 19:
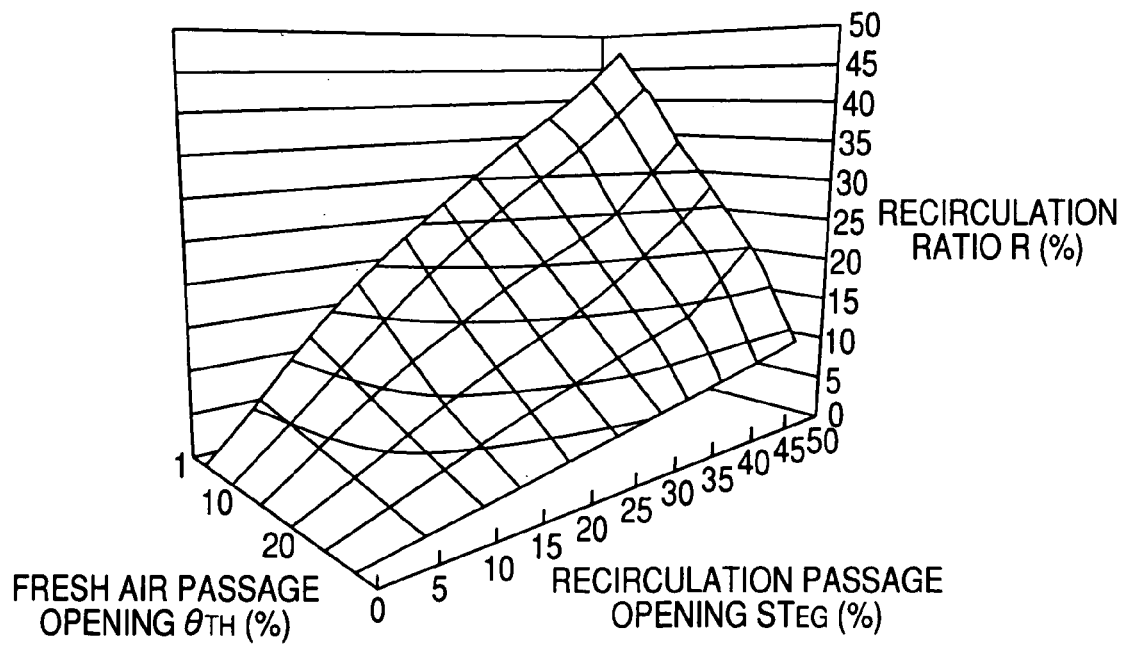
FIG. 19 is a diagram showing the construction of the map used in another embodiment of the exhaust gas recirculation system of an internal combustion engine to which the present invention applies.
Figure 20:
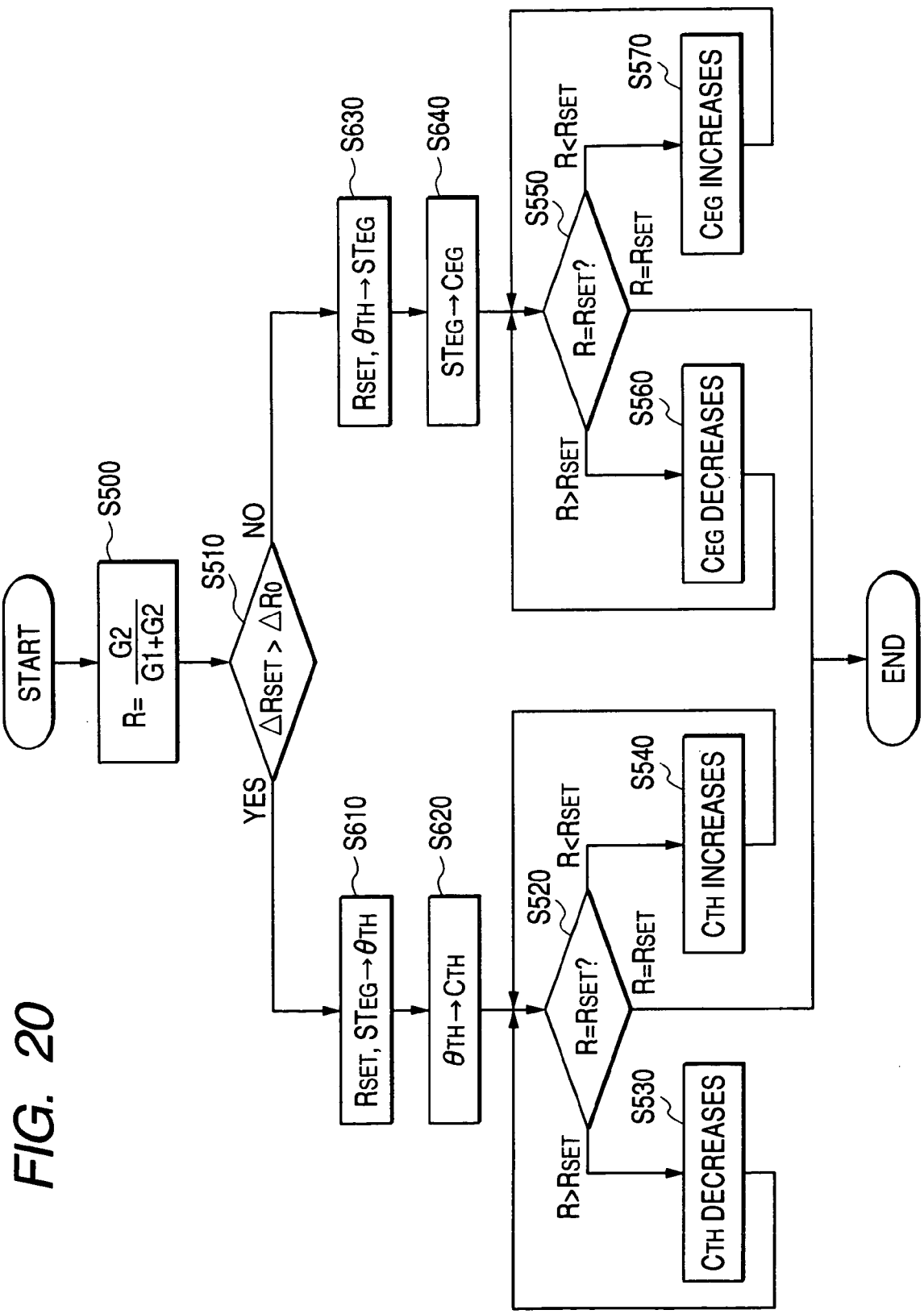
FIG. 20 is a flowchart of the control of the exhaust gas recirculation controller in the exhaust gas recirculation system of an internal combustion engine according to another embodiment of the present invention.

Next, the construction and operation of the exhaust gas recirculation system of an internal combustion engine according to another embodiment of the present invention is described, using FIG. 18 to FIG. 20. The construction of an engine system using the exhaust gas recirculation system of this embodiment of an internal combustion engine is the same as shown in FIG. 10.

FIG. 18 is a block diagram of the control system of the exhaust gas recirculation system of an internal combustion engine according to another embodiment of the present invention. The same symbol represents the same part or component as in FIG. 10. FIG. 19 shows a map of the exhaust gas recirculation system of an internal combustion engine according to another embodiment of the present invention. FIG. 20 is a flowchart of the control of the exhaust gas recirculation controller in the exhaust gas recirculation system of an internal combustion engine according to another embodiment of the present invention. The same symbol represent the same part or component in FIG. 12.

As shown in FIG. 18, in this embodiment, a exhaust gas recirculation controller 420A is equipped inside with a three-dimensional map 420B. The recirculation gas recirculation ratio command value RSET outputted from the ECU 421, suction flow signal G1 sensed by the suction flow sensor 42, recirculation gas flow G2 sensed by the recirculation gas flow sensor 415, opening signal $\theta_{TH}$ from the suction flow control valve 45, and stroke signal STEG from the recirculation gas control valve 416 are inputted into the exhaust gas recirculation controller 420A.

The exhaust gas recirculation controller 420A calculates the exhaust gas recirculation ratio R from the suction flow signal G1 and recirculation gas flow G2 by a formula (G2/(G1+G2)). The exhaust gas recirculation controller 420A first outputs an opening control signal CEG to the recirculation gas control valve 416 and suction flow control signal CTH to the suction flow control valve 45, using the map 420B, and then outputs an opening control signal CEG to the recirculation gas control valve 416 and suction flow control signal CTH to the suction flow control valve 45, using a feedback control, to control these valves 416 and 45 so that the recirculation ratio R of the exhaust gas coincides with the target value RSET.

Next, the content of the three-dimensional map 420B is explained, using FIG. 19. The map 420B is a three-dimensional map containing a fresh air passage opening $\theta_{TH}$ (%), recirculation passage opening STEG (%) and recirculation ratio (%). The fresh air passage opening $\theta_{TH}$ (%) represents the opening signal $\theta_{TH}$ in percentage, where the maximum opening is 100% in case the suction flow control valve 45 is a butterfly type valve and the circulation passage opening STEG (%) represents the stroke signal in percentage, where the maximum stroke of the seat valve is 100% in case the recirculation gas control valve 416 is a seat type valve.

If the recirculation gas control valve 416 is a butterfly type valve as in a previous embodiment, the opening signal $\theta_{TH}$ is shown in percentage, where the maximum opening is 100%, similarly as for the suction flow control valve 45.

FIG. 19 shows the answer of the afore-mentioned equations (1), (2) and (3) under some operating condition of the engine. In this figure, because of a limitation to indication in the figure, the range of the opening of the suction flow control valve 45 is 5% to 25% and that of the recirculation gas control valve 414 is 0% to 60%. The grid points on the three-dimensional map show the relationship between the suction flow control valve 45 and recirculation gas control valve 416 that satisfies the recirculation gas recirculation ratio. The three-dimensional map 420B has multiple three-dimensional maps corresponding to different operating conditions of the engine. By using one of the maps suitable for the operating condition of the engine, the controller selects a grid point on the map and can control the recirculation gas recirculation ratio by a feedback control.

When the change in the gas recirculation ratio in accordance with the change of the opening of the suction flow control valve 5 and recirculation gas control valve 416 shown in FIG. 19 is examined, the change ratio of the gas recirculation ratio in accordance with the change of the opening of the suction flow control valve 45 is greater than that of the suction flow control valve 5. In addition, an electronic control type throttle actuator that can operate from the valve opening 0% up to 100% within a length of time of 100 mses or less had been put into practice, and so it can operate in the range from 5% to 25% shown in FIG. 19 in about 20 msec. Accordingly, in an embodiment shown in FIG. 19, the response of the suction flow control valve 45 is faster than that of the recirculation gas control valve 416 and so, even in case the recirculation gas recirculation ratio command value RSET suddenly changes in pulses, the controller can cope with the change of the command value in pulses if the electronic control type throttle actuator as the suction flow control valve 5 is mainly operated. That is, it can cope with a temporary variation of the operating condition of the engine.

Next, the control of the exhaust gas recirculation controller 420B is described, using FIG. 20. The controls described below are all performed by the exhaust gas recirculation controller 420B. The same step number represents the same processing as in FIG. 12. In this embodiment, the processing in steps s610 to s640 are added to that in FIG. 12.

On step s500 in FIG. 20, the exhaust gas recirculation controller 420B calculates the exhaust gas recirculation ratio R from the suction flow signal G1 and recirculation gas flow G2 by a formula (G2/(G1+G2)).

Next, on step s510, the controller judges whether a variation ΔRSET in the target value RSET of the exhaust gas recirculation ratio R inputted from the ECU 421 is greater than a predetermined reference value ΔR0. If the variation ΔRSET is greater than the reference value ΔR0, the processing proceeds to step s610 and, if not, to step s630. That is, step s510 judges whether the target value RSET of the exhaust gas recirculation ratio R has significantly changed or not. When the operating condition of the internal combustion engine has temporarily varied, whether it becomes necessary to quickly change the exhaust gas recirculation ratio so as to decrease toxic material content in the exhaust gas is judged here.

If the variation ΔRSET is greater than the reference value ΔR0, that is, if it becomes necessary to quickly change the exhaust gas recirculation ratio, a target fresh air passage opening $\theta_{TH}$ (%) is obtained on step s610 from the recirculation ratio R corresponding to the recirculation gas recirculation ratio command value RSET and recirculation passage opening STEG (%), using a three-dimensional map 420B suitable for the operating condition of the engine at that time.

Then, on step s620, the controller outputs an opening control signal CTH to be used as the target fresh air passage opening $\theta_{TH}$ (%) to the suction flow control valve 5 and controls it by an open-loop control so that the opening of the suction flow control valve 45 coincides with the target fresh air passage opening $\theta_{TH}$ (%). By controlling the suction flow control valve 45 to reach the fresh air passage opening $\theta_{TH}$ (%) by an open-loop control as above, it becomes possible to control it to quickly reach near the target fresh air passage opening $\theta_{TH}$ (%).

Next, the controller judges whether the exhaust gas recirculation ratio R calculated on step s510 is equal to the target value RSET of the exhaust gas recirculation ratio R on step s520.

If the recirculation ratio R is greater than the target value RSET, on step s530, the controller decreases the opening control signal CTH to be outputted to the suction flow control valve 45 so as to narrow the opening of the suction flow control valve 45. And then, the processing returns to step s520 and the above processing is repeated until the recirculation ratio R becomes equal to the target value RSET.

On the other hand, if the recirculation ratio R is smaller than the target value RSET, on step s540, the controller increases the opening control signal CTH to be outputted to the suction flow control valve 45 so as to widen the opening of the suction flow control valve 45. And then, the processing returns to step s520 and the above processing is repeated until the recirculation ratio R becomes equal to the target value RSET.

A feedback control is performed by repeating the processing of steps s520, s530 and s540 as explained above until the recirculation ratio R becomes equal to the target value RSET. Since the response of the suction flow control valve 45 is faster than that of the recirculation gas control valve 416 as explained above, the exhaust gas recirculation ratio can be changed quickly to a specified target value even if quick change of the exhaust gas recirculation ratio is needed.

On the other hand, if the variation ΔRSET is judged less than the reference value ΔR0 on step s510, that is, if the change in the exhaust gas recirculation ratio is not so big, a target fresh air passage opening $\theta_{TH}$ (%) is obtained on step s630 from the recirculation ratio R corresponding to the recirculation gas recirculation ratio command value RSET and recirculation passage opening STEG (%), using a three-dimensional map 420B suitable for the operating condition of the engine at that time.

Then, on step s240, the controller outputs an opening control signal CEG to be used as the target recirculation passage opening STEG (%) to the recirculation gas control valve 416 and controls it by an open-loop control so that the opening of the recirculation gas control valve 416 coincides with the target recirculation passage opening STEG (%).

Next, the controller judges whether the exhaust gas recirculation ratio R calculated on step s510 is equal to the target value RSET of the exhaust gas recirculation ratio R on step s550.

If the recirculation ratio R is greater than the target value RSET, on step s560, the controller decreases the opening control signal CEG to be outputted to the recirculation gas control valve 416 so as to narrow the opening of the recirculation gas control valve 416. And then, the processing returns to step s550 and the above processing is repeated until the recirculation ratio R becomes equal to the target value RSET.

On the other hand, if the recirculation ratio R is smaller than the target value RSET, on step s570, the controller increases the opening control signal CEG to be outputted to the recirculation gas control valve 416 so as to widen the opening of the recirculation gas control valve 416. And then, the processing returns to step s550 and the above processing is repeated until the recirculation ratio R becomes equal to the target value RSET.

A feedback control is performed by repeating the processing of steps s550, s560 and s570 as explained above until the recirculation ratio R becomes equal to the target value RSET. In this operation, since the response of the recirculation gas control valve 416 is slower than that of the suction flow control valve 45, much more sensitive opening control is available and so the exhaust gas recirculation ratio can be changed to a specified target value accurately.

In the description above, it is assumed that the response of the suction flow control valve 45 is faster than that of the recirculation gas control valve 416 but there may be a case where the response of the recirculation gas control valve 416 is faster than that of the suction flow control valve 45. In a case like the above, the recirculation gas control valve 416 having faster response shall be controlled first by an open-loop control and then by a feedback control if quick change of the exhaust gas recirculation ratio is needed and, if no quick change is needed, the suction flow control valve 5 having slower response shall be controlled to improve the control accuracy.

As explained above, according to this embodiment, even if quick change of the exhaust gas recirculation ratio is needed, a control valve having faster response is first controlled by an open-loop control to move the valve quickly near the target opening position and then by a feedback control to converge to the target opening so as to be able to cope with the quick change. On the other hand, if no quick change is needed, controlling a control valve having slower response enables to improve the control accuracy.

The characteristics of the EGR control system of this embodiment as explained above can be summarized as follows:

For an internal combustion engine such as diesel engine, exhaust gas recirculation control is important for purification of the exhaust gas, particularly for reducing the emission of nitrogen oxides. In a conventional exhaust gas recirculation system as disclosed in the Japanese Application Patent Laid-Open Publication Nos. 2003-83034, Japanese Patent 3329711, and Japanese Application Patent Laid-Open Announcement No. 2003-516496, the opening of the exhaust gas recirculation valve is controlled to achieve a specified exhaust gas recirculation ratio.

With a conventional method that control the opening of the exhaust gas recirculation valve, however, there arises a problem that an appropriate control is difficult throughout the operation area of the internal combustion engine particularly when there is a need for quickly changing the exhaust gas recirculation ratio so as to cope with temporary variation of the operating condition and reduce hazardous material content in the exhaust gas.

An object of the present invention is to offer an exhaust gas recirculation system having improved response and accuracy in controlling the exhaust gas recirculation flow of the internal combustion engine.

(1) In order to achieve the above object, according to the present embodiment, there is provided an exhaust gas recirculation system of an internal combustion engine equipped with a recirculation gas control valve that controls the recirculation flow in the exhaust gas recirculation passage of the internal combustion engine and suction control valve that controls the flow in the suction passage of the internal combustion engine; further equipped with a suction flow sensor that senses the flow in the suction passage, recirculation flow sensor that senses the exhaust gas recirculation flow in the exhaust gas recirculation passage, and a controller that controls the suction control valve and/or circulation gas control valve by a feedback control so that the exhaust gas circulation ratio obtained based on the outputs from the suction flow sensor and recirculation flow sensor coincides with a target recirculation ratio.

With the above construction, the response speed and accuracy in controlling the exhaust gas recirculation flow of the internal combustion engine.

(2) In (1) above, it is preferable that the controller controls either the suction control valve or the recirculation gas control valve, whichever having faster response, by a feedback control in case the target recirculation ratio varies suddenly.

(3) In (1) above, it is preferable that the system is equipped with multiple three-dimensional maps to be defined by a combination of the opening of the recirculation gas control valve, that of the suction control valve and recirculation ratio and that the controller selects the three-dimensional map suitable for the operating condition of the internal combustion engine and controls the suction control valve and/or circulation gas control valve so that the exhaust gas circulation ratio obtained based on the outputs from the suction flow sensor and recirculation flow sensor coincides with a target recirculation ratio.

(4) In (2) above, it is preferable that the controller controls either the suction control valve or the recirculation gas control valve, whichever having faster response, in case the target recirculation ratio varies suddenly.

(5) In (1) above, it is preferable that the exhaust gas recirculation flow sensor is a sensor that senses the recirculation flow based on the pressure difference between two or more points in the exhaust gas recirculation passage or a sensor that senses mass flow in the exhaust gas recirculation passage, and the suction flow sensor is a sensor that senses the suction flow based on the pressure difference between two or more points in the suction passage or a sensor that senses mass flow in the suction passage.

(6) In (1) above, it is preferable that the suction control valve is an electronic control type throttle actuator.

According to the present invention, control response increases because the recirculation flow of the exhaust gas is controlled inside the suction passage.

What is claimed is:

1. An exhaust gas recirculation system for an internal combustion engine having a throttle valve unit provided in a suction passage to control a cross-sectional passage opening of the suction passage and an exhaust gas circulation passage to recirculate a part of the exhaust gas from the internal combustion engine into the suction passage, wherein a part of the exhaust gas recirculation passage is projected in the suction passage downstream of the throttle valve unit and a control valve for controlling the exhaust gas flow is installed in the projected part of the exhaust gas recirculation passage, wherein a portion of the exhaust gas recirculation passage in which the control valve is installed is formed in a cylindrical shape extending in the axial direction in the suction passage.

2. An exhaust gas recirculation apparatus for an internal combustion engine in which an exhaust gas recirculation passage is made open in a suction passage body of the internal combustion engine and a control valve for controlling the cross section of the exhaust gas recirculation passage is installed in the exhaust gas recirculation passage and a portion of the exhaust gas recirculation passage installing the control valve is installed in the suction passage body, wherein a cooling unit for cooling the exhaust gas is installed together with the suction passage body, and wherein the cooling unit is provided with a heat exchange region comprising a plurality of cooling medium passages and a plurality of exhaust gas passages alternately adjoining with each other and provided in the exhaust gas recirculation passage.

3. An exhaust gas recirculation system for an internal combustion engine that is equipped with a control valve for circulating the exhaust gas into a suction passage of the internal combustion engine and controls the opening of the control valve based on an output of an exhaust gas flow sensor for sensing the exhaust gas flow, wherein there is provided a sensor for sensing an opening of the control valve, and the opening of the control valve is controlled based on the output of the sensor provided with the control valve and the output of the exhaust gas flow sensor.

4. An exhaust gas recirculation system for an internal combustion engine having a throttle valve unit provided in a suction passage to control a cross-sectional passage opening of the suction passage and an exhaust gas circulation passage to recirculate a part of the exhaust gas from the internal combustion engine into the suction passage, wherein a part of the exhaust gas recirculation passage is projected in the suction passage downstream of the throttle valve unit and a control valve for controlling the exhaust gas flow is installed in the projected part of the exhaust gas recirculation passage, wherein there is provided an opening sensor that senses the opening of the control valve.

5. An exhaust gas recirculation system according to claim 4, wherein the opening sensor that senses the opening of the control valve in the exhaust gas recirculation passage is installed on a cover of a gear mechanism mounted on an outside wall of the suction passage.

6. An exhaust gas cooling unit of an exhaust gas recirculation system, equipped with a heat exchanger which is so constructed that a wall with high thermal conductivity is sandwiched between a passage for engine cooling water flow and that for exhaust gas flow, wherein an exhaust gas inlet, an exhaust gas outlet, a cooling water inlet, and a cooling water outlet are provided around the heat exchanger and all of these are put together as a unit and the heat exchanger is located in the passage for exhaust gas flow between the exhaust gas inlet and the exhaust gas outlet.

7. An exhaust gas cooling unit of an exhaust gas recirculation system according to claim 6, wherein corrugated fins are installed in the passage of the engine cooling water flow.

8. An exhaust gas cooling unit of an exhaust gas recirculation system according to claim 6, wherein an exhaust gas flow sensor is so installed on the unit as to be positioned in the passage at the exhaust gas outlet.

9. An exhaust gas recirculation system for an internal combustion engine having a throttle valve unit provided in a suction passage to control a cross-sectional passage opening of the suction passage and an exhaust gas circulation passage to recirculate a part of the exhaust gas from the internal combustion engine into the suction passage, wherein a part of the exhaust gas recirculation passage is projected in the suction passage downstream of the throttle valve unit and a control valve for controlling the exhaust gas flow is installed in the projected cart of the exhaust gas recirculation passage, wherein the control valve is a butterfly valve type.

10. An exhaust gas recirculation system according to claim 9, wherein the control valve is driven by a motor.

11. An exhaust gas recirculation system according to claim 9, wherein the throttle valve unit is kept fully open under an initial condition, in the upstream of the portion of the exhaust gas recirculation passage in which the control valve is installed.

12. An exhaust gas recirculation system according to claim 11, wherein the rotating shaft of the valve of the throttle valve unit is driven by another motor via another reduction gear mechanism.

13. An exhaust gas recirculation system according to claim 11, wherein a diameter of the suction passage, at which the portion of the exhaust gas recirculation passage in which the control valve is installed is located, is larger than a diameter of the portion of the suction passage in which the throttle valve unit is installed.

14. An exhaust gas recirculation system for an internal combustion engine having a throttle valve unit provided in a suction passage to control a cross-sectional passage opening of the suction passage and an exhaust gas circulation passage to recirculate a part of the exhaust gas from the internal combustion engine into the suction passage, wherein a part of the exhaust gas recirculation passage is projected in the suction passage downstream of the throttle valve unit and a control valve for controlling the exhaust gas flow is installed in the projected part of the exhaust gas recirculation passage, wherein there is provided a rotating shaft extending across airflow and through both the suction passage and the exhaust gas recirculation passage, the control valve is fixed on the rotating shaft, the rotating shaft is supported by a pair of bearings fixed on a sidewall member constituting the suction passage, and the rotating shaft is driven by a motor via a reduction gear mechanism.

15. An exhaust gas recirculation system according to claim 14, wherein the throttle valve unit is kept fully open under an initial condition, in the upstream of the portion of the exhaust gas recirculation passage in which the control valve is installed, a rotating shaft of the throttle valve unit extends across the airflow in the suction passage and through the suction passage wall, and the rotating shaft is driven by another motor via another reduction gear.

16. An exhaust gas recirculation system according to claim 15, wherein the rotating shaft of the control valve and that of the throttle valve unit are installed in parallel with each other.

17. An exhaust gas recirculation system according to claim 15, wherein the motor for driving the control valve and that for driving the throttle valve unit are installed in parallel with each other.

* * * * *